(12) United States Patent
Withers et al.

(10) Patent No.: US 7,376,277 B2
(45) Date of Patent: May 20, 2008

(54) DATA TRANSFORM FOR IMPROVED COMPRESSION OF MULTICOMPONENT IMAGES

(75) Inventors: William Douglas Withers, Crofton, MD (US); Irina Popovici, Severna Park, MD (US)

(73) Assignee: Pegasus Imaging Corporation, Tampa, FL (US)

( * ) Notice: Subject to any disclaimer, the term of this patent is extended or adjusted under 35 U.S.C. 154(b) by 858 days.

(21) Appl. No.: 10/868,269

(22) Filed: Jun. 15, 2004

(65) Prior Publication Data

US 2005/0276486 A1    Dec. 15, 2005

(51) Int. Cl.
   *G06K 9/00*      (2006.01)
   *G06K 9/36*      (2006.01)
   *G06K 9/46*      (2006.01)
   *G09G 5/02*      (2006.01)
   *H04N 9/43*      (2006.01)
   *H04N 9/65*      (2006.01)
   *H04B 1/66*      (2006.01)
   *G03F 3/08*      (2006.01)

(52) U.S. Cl. ............... 382/232; 382/162; 382/276; 345/589; 345/72; 348/32; 348/384.1; 348/642; 348/708; 375/240; 358/518; 358/520

(58) Field of Classification Search ........ 382/162–167, 382/232–253, 276–283; 345/589–600, 72, 345/83; 348/32–34, 384.1–395.1, 560, 642–645, 348/662–663, 708–713; 375/240–250; 358/518–520
See application file for complete search history.

(56) References Cited

U.S. PATENT DOCUMENTS 3,331,447 A * 7/1967 Simak ........................ 172/9
4,472,733 A * 9/1984 Bolger ....................... 348/618
4,644,389 A * 2/1987 Nakagawa et al. ......... 348/640
4,764,805 A * 8/1988 Rabbani et al. ........ 375/240.01

(Continued)

OTHER PUBLICATIONS

Laris Goffman-Vinopal and Moshe Porat, "Color Image Compression using Inter-color Correlation", (2002), pp. II-353-II-356, IEEE ICIP, (Department of Electrical Engineering, Technion—Israel Institute of Technology, Haifa 32000, Israel).

(Continued)

*Primary Examiner*—Bhavesh M. Mehta
*Assistant Examiner*—Manav Seth
(74) *Attorney, Agent, or Firm*—Straub & Pokotylo; Michael P. Straub

(57) ABSTRACT

Color image transform coding methods and apparatus which take advantage of redundant information which is normally present in the luminance and chrominance components of a color image are described. The transform coding method of the present invention, can normally provide increased compression and/or better image quality at a given coding data rate than conventional JPEG or JPEG 2000 coding which does not use the transform of the present invention as part of the color component coding process. These benefits are normally achieved without generating more coefficients than would be generated in the case of more conventional coding such as JPEG or JPEG 2000 coding. In fact, the transform of the present invention can be applied to increase the coding efficiency of coding systems which perform spatial transforms and modeling and entropy coding operations of the type normally used in JPEG and/or JPEG 2000 coding systems.

39 Claims, 53 Drawing Sheets

U.S. PATENT DOCUMENTS

| | | | | |
|---|---|---|---|---|
| 4,992,856 | A | * | 2/1991 | Robinson .................... 348/667 |
| 5,032,910 | A | * | 7/1991 | Cok ......................... 348/392.1 |
| 5,189,530 | A | * | 2/1993 | Fujii ......................... 382/166 |
| 5,214,502 | A | * | 5/1993 | Stone et al. ................ 348/472 |
| 5,260,808 | A | * | 11/1993 | Fujii ......................... 382/166 |
| 5,323,232 | A | * | 6/1994 | Otaka et al. ................ 348/472 |
| 5,489,942 | A | * | 2/1996 | Kawahara ............. 375/240.12 |
| 5,510,835 | A | * | 4/1996 | Nishizawa et al. ......... 348/242 |
| 5,515,112 | A | * | 5/1996 | Penney ....................... 348/630 |
| 5,561,723 | A | * | 10/1996 | DesJardins et al. ......... 382/260 |
| 5,838,834 | A | * | 11/1998 | Saito .......................... 382/251 |
| 5,969,777 | A | * | 10/1999 | Mawatari .............. 375/240.26 |
| 6,215,905 | B1 | * | 4/2001 | Lee et al. ................... 382/238 |
| 6,219,457 | B1 | * | 4/2001 | Potu ........................... 382/233 |
| 6,347,116 | B1 | * | 2/2002 | Haskell et al. ......... 375/240.03 |
| 6,411,340 | B1 | * | 6/2002 | Lee et al. ................... 348/649 |
| 6,654,418 | B2 | * | 11/2003 | Haskell et al. ......... 375/240.03 |
| 7,095,896 | B2 | * | 8/2006 | Abe et al. ................... 382/233 |

OTHER PUBLICATIONS

Pekka Toivanen, Arto Kaarna and Heikki Kalviainen, "Distance Transforms in RGB Color Image Compression", 4 pgs., (Linkoping University ITN/Campus Norrkoping, 601 74 Norrkoping, Sweden and Lappeenranta University of Technology, Department of Information Technology, P.O. Box 20, FIN-53851 Lappeenranta, Finland).

Ke Shen and Edward J. Delp, "Color Image Compression Using An Embedded Rate Scalable Approach", 4 pgs., (Video and Image Processing Laboratory (VIPER), School of Electrical and Computer Engineering, Purdue University, West Lafayette, Indiana 47907-1285, USA).

Ricardo L. De Queiroz, "Improved Transforms for the Compression of Color and Multispectral Images", (2002), pp. II-381-II-384, IEEE ICIP, (Xerox Corporation, 800 Phillips Rd., 128-27E, Webster, NY, 14580).

Ekram Khan and Mohammed Ghanbari, "Wavelet Based Efficient Color Image Coding Technique", 4 pgs., (Department of Electronic Systems Engineering, University of Essex Colchester, CO4 3SQ, UK).

* cited by examiner

3702

| y\x | 1 | 2 | 3 | 4 | 5 |
|---|---|---|---|---|---|
| 1 | 0.000 | 10.000 | 20.000 | 30.000 | 40.000 |
| 2 | 50.000 | 60.000 | 70.000 | 80.000 | 90.000 |
| 3 | 100.000 | 110.000 | 120.000 | 130.000 | 140.000 |
| 4 | 150.000 | 160.000 | 170.000 | 180.000 | 190.000 |
| 5 | 200.000 | 210.000 | 220.000 | 230.000 | 240.000 |
| 6 | 250.000 | 260.000 | 270.000 | 280.000 | 290.000 |

3704

| y\x | 1 | 2 | 3 | 4 | 5 |
|---|---|---|---|---|---|
| 1 | 1.000 | 6.000 | 11.000 | 16.000 | 21.000 |
| 2 | 26.000 | 31.000 | 36.000 | 41.000 | 46.000 |
| 3 | 51.000 | 56.000 | 61.000 | 66.000 | 71.000 |
| 4 | 76.000 | 81.000 | 86.000 | 91.000 | 96.000 |
| 5 | 101.000 | 106.000 | 111.000 | 116.000 | 121.000 |
| 6 | 126.000 | 131.000 | 136.000 | 141.000 | 146.000 |

3706

| y\x | 1 | 2 | 3 | 4 | 5 |
|---|---|---|---|---|---|
| 1 | 0.000 | 3.000 | 7.000 | 10.000 | 13.000 |
| 2 | 17.000 | 20.000 | 23.000 | 26.000 | 30.000 |
| 3 | 33.000 | 37.000 | 40.000 | 43.000 | 47.000 |
| 4 | 50.000 | 53.000 | 57.000 | 60.000 | 63.000 |
| 5 | 67.000 | 70.000 | 73.000 | 77.000 | 80.000 |
| 6 | 83.000 | 87.000 | 90.000 | 93.000 | 97.000 |

| y\x | 1 | 2 | 3 | 4 | 5 |
|---|---|---|---|---|---|
| 1 | 0.000 | 10.000 | 20.000 | 30.000 | 40.000 |
| 2 | 78.102 | 60.000 | 70.000 | 80.000 | 90.000 |
| 3 | 100.000 | 110.000 | 120.000 | 130.000 | 140.000 |
| 4 | 150.000 | 160.000 | 170.000 | 180.000 | 190.000 |
| 5 | 200.000 | 210.000 | 220.000 | 230.000 | 240.000 |
| 6 | 250.000 | 260.000 | 270.000 | 280.000 | 290.000 |

← 3804

| y\x | 1 | 2 | 3 | 4 | 5 |
|---|---|---|---|---|---|
| 1 | 1.000 | 6.000 | 11.000 | 16.000 | 21.000 |
| 2 | 40.460 | 0.128 | 36.000 | 41.000 | 46.000 |
| 3 | 51.000 | 56.000 | 61.000 | 66.000 | 71.000 |
| 4 | 76.000 | 81.000 | 86.000 | 91.000 | 96.000 |
| 5 | 101.000 | 106.000 | 111.000 | 116.000 | 121.000 |
| 6 | 126.000 | 131.000 | 136.000 | 141.000 | 146.000 |

← 3806

| y\x | 1 | 2 | 3 | 4 | 5 |
|---|---|---|---|---|---|
| 1 | 0.000 | 3.000 | 7.000 | 10.000 | 13.000 |
| 2 | 26.248 | 4.481 | 23.000 | 26.000 | 30.000 |
| 3 | 33.000 | 37.000 | 40.000 | 43.000 | 47.000 |
| 4 | 50.000 | 53.000 | 57.000 | 60.000 | 63.000 |
| 5 | 67.000 | 70.000 | 73.000 | 77.000 | 80.000 |
| 6 | 83.000 | 87.000 | 90.000 | 93.000 | 97.000 |

| y\x | 1 | 2 | 3 | 4 | 5 |
|---|---|---|---|---|---|
| 1 | 10.000 | 10.000 | 20.000 | 30.000 | 40.000 |
| 2 | 78.102 | 60.000 | 70.000 | 80.000 | 90.000 |
| 3 | 148.661 | 110.000 | 120.000 | 130.000 | 140.000 |
| 4 | 219.317 | 160.000 | 170.000 | 180.000 | 190.000 |
| 5 | 290.000 | 210.000 | 220.000 | 230.000 | 240.000 |
| 6 | 250.000 | 260.000 | 270.000 | 280.000 | 290.000 |

↙3904

| y\x | 1 | 2 | 3 | 4 | 5 |
|---|---|---|---|---|---|
| 1 | 6.000 | 1.000 | 11.000 | 16.000 | 21.000 |
| 2 | 40.460 | 0.128 | 36.000 | 41.000 | 46.000 |
| 3 | 75.743 | 0.067 | 61.000 | 66.000 | 71.000 |
| 4 | 111.072 | 0.046 | 86.000 | 91.000 | 96.000 |
| 5 | 146.414 | 0.034 | 111.000 | 116.000 | 121.000 |
| 6 | 126.000 | 131.000 | 136.000 | 141.000 | 146.000 |

↙3906

| y\x | 1 | 2 | 3 | 4 | 5 |
|---|---|---|---|---|---|
| 1 | 3.000 | 0.000 | 7.000 | 10.000 | 13.000 |
| 2 | 26.248 | 4.481 | 23.000 | 26.000 | 30.000 |
| 3 | 49.576 | -0.471 | 40.000 | 43.000 | 47.000 |
| 4 | 72.863 | 0.228 | 57.000 | 60.000 | 63.000 |
| 5 | 96.897 | 0.241 | 73.000 | 77.000 | 80.000 |
| 6 | 83.000 | 87.000 | 90.000 | 93.000 | 97.000 |

| y\x | 1 | 2 | 3 | 4 | 5 |
|---|---|---|---|---|---|
| 1 | 0.000 | 20.000 | 40.000 | 10.000 | 30.000 |
| 2 | 50.000 | 70.000 | 90.000 | 60.000 | 80.000 |
| 3 | 100.000 | 120.000 | 140.000 | 110.000 | 130.000 |
| 4 | 150.000 | 170.000 | 190.000 | 160.000 | 180.000 |
| 5 | 200.000 | 220.000 | 240.000 | 210.000 | 230.000 |
| 6 | 250.000 | 270.000 | 290.000 | 260.000 | 280.000 |

| y\x | 1 | 2 | 3 | 4 | 5 |
|---|---|---|---|---|---|
| 1 | 10.000 | 36.056 | 40.000 | 10.000 | 30.000 |
| 2 | 78.102 | 106.301 | 90.000 | 60.000 | 80.000 |
| 3 | 148.661 | 176.918 | 140.000 | 110.000 | 130.000 |
| 4 | 219.317 | 247.588 | 190.000 | 160.000 | 180.000 |
| 5 | 200.000 | 210.000 | 220.000 | 230.000 | 240.000 |
| 6 | 250.000 | 260.000 | 270.000 | 280.000 | 290.000 |

/ 4104

| y\x | 1 | 2 | 3 | 4 | 5 |
|---|---|---|---|---|---|
| 1 | 6.000 | 19.415 | 21.000 | 1.000 | 0.277 |
| 2 | 40.460 | 54.562 | 46.000 | 0.128 | 0.094 |
| 3 | 75.743 | 89.872 | 71.000 | 0.067 | 0.057 |
| 4 | 111.072 | 125.208 | 96.000 | 0.046 | 0.040 |
| 5 | 101.000 | 106.000 | 111.000 | 116.000 | 121.000 |
| 6 | 126.000 | 131.000 | 136.000 | 141.000 | 146.000 |

/ 4106

| y\x | 1 | 2 | 3 | 4 | 5 |
|---|---|---|---|---|---|
| 1 | 3.000 | 12.203 | 13.000 | 0.000 | 0.277 |
| 2 | 26.248 | 34.713 | 30.000 | 0.256 | 0.188 |
| 3 | 49.576 | 58.728 | 47.000 | -0.471 | 0.226 |
| 4 | 72.863 | 82.758 | 63.000 | 0.228 | 0.242 |
| 4 | 67.000 | 70.000 | 73.000 | 77.000 | 80.000 |
| 6 | 83.000 | 87.000 | 90.000 | 93.000 | 97.000 |

| y\x | 1 | 2 | 3 | 4 | 5 |
|---|---|---|---|---|---|
| 1 | 120.000 | 191.311 | 20.000 | 30.000 | 40.000 |
| 2 | 177.200 | 268.514 | 70.000 | 80.000 | 90.000 |
| 3 | 241.661 | 350.143 | 120.000 | 191.050 | 140.000 |
| 4 | 150.000 | 160.000 | 170.000 | 261.725 | 190.000 |
| 5 | 200.000 | 210.000 | 220.000 | 332.415 | 240.000 |
| 6 | 250.000 | 260.000 | 270.000 | 280.000 | 290.000 |

↙4204

| y\x | 1 | 2 | 3 | 4 | 5 |
|---|---|---|---|---|---|
| 1 | 61.000 | 97.119 | 11.000 | 16.000 | 21.000 |
| 2 | 89.842 | 135.859 | 36.000 | 41.000 | 46.000 |
| 3 | 122.155 | 176.728 | 1.000 | 0.925 | 0.052 |
| 4 | 76.000 | 81.000 | 0.677 | 0.659 | 0.038 |
| 5 | 101.000 | 106.000 | 0.497 | 0.505 | 0.030 |
| 6 | 126.000 | 131.000 | 136.000 | 141.000 | 146.000 |

↙4206

| y\x | 1 | 2 | 3 | 4 | 5 |
|---|---|---|---|---|---|
| 1 | 40.000 | 63.770 | 7.000 | 10.000 | 13.000 |
| 2 | 59.481 | 89.269 | 23.000 | 26.000 | 30.000 |
| 3 | 80.112 | 117.038 | 0.000 | -0.334 | -0.471 |
| 4 | 50.000 | 53.000 | 0.226 | 0.054 | 0.229 |
| 5 | 67.000 | 70.000 | -0.166 | 0.244 | 0.241 |
| 6 | 83.000 | 87.000 | 90.000 | 93.000 | 97.000 |

| y\x | 1 | 2 | 3 | 4 | 5 |
|---|---|---|---|---|---|
| 1 | 0.000 | 10.000 | 20.000 | 30.000 | 40.000 |
| 2 | 78.102 | 60.000 | 70.000 | 80.000 | 90.000 |
| 3 | 100.000 | 110.000 | 120.000 | 130.000 | 140.000 |
| 4 | 150.000 | 160.000 | 170.000 | 180.000 | 190.000 |
| 5 | 200.000 | 210.000 | 220.000 | 230.000 | 240.000 |
| 6 | 250.000 | 260.000 | 270.000 | 280.000 | 290.000 |

↙4604

| y\x | 1 | 2 | 3 | 4 | 5 |
|---|---|---|---|---|---|
| 1 | | | | | |
| 2 | | 50.000 | | | |
| 3 | | | | | |
| 4 | | | | | |
| 5 | | | | | |
| 6 | | | | | |

| y\x | 1 | 2 | 3 | 4 | 5 |
|---|---|---|---|---|---|
| 1 | 10.000 | 10.000 | 20.000 | 30.000 | 40.000 |
| 2 | 78.102 | 60.000 | 70.000 | 80.000 | 90.000 |
| 3 | 148.661 | 110.000 | 120.000 | 130.000 | 140.000 |
| 4 | 219.317 | 160.000 | 170.000 | 180.000 | 190.000 |
| 5 | 290.000 | 210.000 | 220.000 | 230.000 | 240.000 |
| 6 | 250.000 | 260.000 | 270.000 | 280.000 | 290.000 |

↙4704

| y\x | 1 | 2 | 3 | 4 | 5 |
|---|---|---|---|---|---|
| 1 | | 0.000 | | | |
| 2 | | 50.000 | | | |
| 3 | | 100.000 | | | |
| 4 | | 150.000 | | | |
| 5 | | 200.000 | | | |
| 6 | | | | | |

| y\x | 1 | 2 | 3 | 4 | 5 |
|---|---|---|---|---|---|
| 1 | 10.000 | 36.056 | 40.000 | 10.000 | 30.000 |
| 2 | 78.102 | 106.301 | 90.000 | 60.000 | 80.000 |
| 3 | 148.661 | 176.918 | 140.000 | 110.000 | 130.000 |
| 4 | 219.317 | 247.588 | 190.000 | 160.000 | 180.000 |
| 5 | 200.000 | 210.000 | 220.000 | 230.000 | 240.000 |
| 6 | 250.000 | 260.000 | 270.000 | 280.000 | 290.000 |

*4804*

| y\x | 1 | 2 | 3 | 4 | 5 |
|---|---|---|---|---|---|
| 1 | | | | 0.000 | 10.000 |
| 2 | | | | 50.000 | 60.000 |
| 3 | | | | 100.000 | 110.000 |
| 4 | | | | 150.000 | 160.000 |
| 5 | | | | | |
| 6 | | | | | |

| y\x | 1 | 2 | 3 | 4 | 5 |
|---|---|---|---|---|---|
| 1 | 120.000 | 191.311 | 20.000 | 30.000 | 40.000 |
| 2 | 177.200 | 268.514 | 70.000 | 80.000 | 90.000 |
| 3 | 241.661 | 350.143 | 120.000 | 191.050 | 140.000 |
| 4 | 150.000 | 160.000 | 170.000 | 261.725 | 190.000 |
| 5 | 200.000 | 210.000 | 220.000 | 332.415 | 240.000 |
| 6 | 250.000 | 260.000 | 270.000 | 280.000 | 290.000 |

← 4904

| y\x | 1 | 2 | 3 | 4 | 5 |
|---|---|---|---|---|---|
| 1 | | | | | |
| 2 | | | | | |
| 3 | | | 0.000 | 10.000 | 130.000 |
| 4 | | | 50.000 | 60.000 | 180.000 |
| 5 | | | 100.000 | 110.000 | 230.000 |
| 6 | | | | | |

Figure 49

DATA TRANSFORM FOR IMPROVED COMPRESSION OF MULTICOMPONENT IMAGES

FIELD OF THE INVENTION

The present invention relates to image coding and, more particularly, to methods and apparatus for efficiently coding images including both luminance and chrominance components.

BACKGROUND OF THE INVENTION

Many three-component color image coders follow the broad design shown in FIG. 1 which shows an exemplary known grayscale image coder 100. The known grayscale image coder 100 receives raw image data (I) and performs a forward spatial transform operation 102 thereon to produce coefficients It. Examples of forward spatial transforms which may be performed in step 102 include a forward discrete cosine transform, e.g., in the case of JPEG coding and a 9/7 or 5/3 forward wavelet transform, e.g., in the case of JPEG 2000 coding.

The coefficients It generated by the forward spatial transform 102 are then subject to modeling and entropy coding in the next step 104 which generates the coded image data (Ic). Step 104 may result in some data being discarded, e.g., in the case of lossy coding. Examples of operations performed in modeling and entropy coding step 104 include, e.g., in the case of JPEG coding, Quantization and Huffman coding and, in the case of JPEG 2000, Quantization, MQ-coder processing, elaborate modeling, and code-stream re-arrangement.

The know gray scale coding process shown in FIG. 1 is exemplary of both the original JPEG coding algorithm (wherein the spatial transform is a discrete cosine transform) and the JPEG 2000 standard for lossless or lossy coding. The color-component and spatial transforms share two important functions: decorrelating image data (thereby reducing entropy) and facilitating the visual weighting of various errors.

Decoding usually, but not always, involves performing the inverse of the various steps performed during encoding. FIG. 2 illustrates an exemplary known grayscale decoding process 200 for decoding images encoded using an encoder, e.g., standard JPEG or JPEG 2000 encoder, which operates in accordance with the process shown in FIG. 1. The decoding method 200 includes a modeling and entropy decoding step 202 which receives the coded image values Ic as input values and generates the intermediate values Ixt there from. Examples of operations performed in the modeling and entropy decoding step 202 include, e.g., Huffman decoding and dequantization in the case of JPEG. In the case of JPEG-2000 step 202 may include, e.g., Code-stream re-assembly, elaborate modeling, MQ decoder processing and dequantization. The Ixt values are then subject to a reverse spatial transform in step 204 to produce the decoded image values Ix. In the case of JPEG, the reverse spatial transform 204 is normally a reverse discrete cosine transform. In the case of JPEG-2000, the reverse spatial transform may be, e.g., a 9/7 or 5/3 reverse wavelet transform. The decoding process 200 normally produces a lossy decoded image since the coding and decoding process normally results in the loss of some image information, e.g., but with the advantage of reduced image data storage and/or transmission requirements thanks to the compression benefits obtained through the use of the coding process.

The grayscale coding process shown in FIG. 1, and decoding process shown in FIG. 2, are shown for a single image component, e.g., the luminance component. However, in the case of color images, each image normally has several components. Consider for example lossy JPEG 2000 method of coding an image, with red, green, and blue components as shown in FIG. 3. The first step in lossy coding process 300 is the irreversible color-component transform step 302 which converts the red, green, and blue (RGB) input components to a luminance component and two chrominance components. In the case of JPEG, the luminance component, indicated in FIG. 3 using L, is generally known as the Y component, while the first and second chrominance components are normally described as U and V components. Thus, in the case of JPEG, separate Y, U and V components are the output of step 302. In the case of JPEG 2000 coding, step 302 would convert an RGB input signal into a Y, Cb, Cr signal format. Thus, in the case of JPEG 2000 coding step 302 would output a separate luminance (Y) signal indicated using an L in FIG. 3, and first and second chrominance components Cb, Cr, respectively, correspond, respectively, to the values U and V output by step 302. Each of the separate luminance and chrominance components L, U, V generated in step 302 are then independently subjected to grayscale coding in steps 304, 306 and 308, respectively. The coded signaling components Lc, Uc and Vc generated by steps 304, 306 and 306 are then merged in step 310 to produce a set of coded image data (Ic) representing the image which is being coded. A noteworthy feature of the known color-component transform shown in FIG. 3 is that each pixel's three components (Y,U,V) or (Y,Cb,Cr) are transformed independently.

JPEG 2000's second lossy coding step, which is part of each of the grayscale image coding steps 304, 306, 308 in some JPEG 2000 coding systems, is the irreversible 9/7 wavelet transform. This transform removes redundancy between neighboring sample values of each component. Each transform step replaces the LL sub-band with a quartet of LL, HL, LH, and HH sub-bands (the original image component being considered an LL sub-band). Thus the resulting number N of sub-bands is N=3L+1, where L is the number of wavelet transform steps.

A noteworthy feature of the wavelet transform is that each component is transformed independently of the others. Moreover, in JPEG 2000 and similar color image coders the subsequent modeling and entropy coding steps operate on each image component independently of the others. This leaves a fair amount of redundancy across image components, e.g., luminance and chrominance components, even after the color-component transform.

Known color image decoding techniques generally involve performing the inverse of the operations performed to encode a color image. FIG. 4 illustrates the steps of an exemplary color image decoding operation 400. The decoding operation involves splitting the set of image data in step 402 into sets corresponding to the separate luminance and chrominance coefficients used to represent the image in an encoded format. Each of the separate luminance and chrominance components is then subject to an independent grayscale image decoding operation in steps 404, 406, 408 respectively. The grayscale decoding operation generates Y, U, and V signals in the case of JPEG and Y, Cb and Cr signals in the case of JPEG 2000. From grayscale image decoding steps 404, 406, 408 operation then proceeds to reverse color transform step 412 wherein the luminance and chrominance signals are subject to a reverse color transform operation which produces signal lx which is an RGB signal representing the lossily decoded image.

While image coding techniques have made significant advances over the years, there remains room for improvement in terms of coding efficiency. Coding efficiency may be expressed in terms of the quality of an image after decoding given a particular amount of data used to represent the image in encoded form. A higher coding efficiency is achieved if the same amount of coded image data provides a superior decoded image and/or if less coded image data is required to achieve the same decoded image quality as achieved by another coding technique that requires the use of more coded image data to achieve the same result.

In view of the above discussion, it is apparent that there is a need for improved coding methods and apparatus which can take advantage of redundancy which exists across color image components to achieve increased coding efficiency as compared to known coding techniques. Any new methods and apparatus should be relatively simple to implement. From an implementation standpoint, it is desirable that the number of coefficients generated as part of a new coding process not be significantly greater than the number of coefficients which would be generated, e.g., using the known process described with regard to FIGS. 1 and 2. In addition, from an implementation standpoint, it is desirable that any coding changes from the known techniques should be relatively easy to implement from a computation and/or hardware perspective and not result in significant increases in encoder and/or decoder complexity over that of known systems.

BRIEF DESCRIPTION OF THE FIGURES

FIG. 37 illustrates an exemplary set of wavelet coefficient matrixes, L, Cb, Cr representing an image with 30 elements, e.g., pixels, where each of the exemplary matrixes include 30 wavelet coefficient values used to represent the image.

FIG. 38 illustrates an exemplary set of matrixes, e.g., a luminance control matrix and two chrominance matrixes, resulting from the application of the TF routine to location (1,2) and (2,2) of the matrixes of FIG. 37.

FIG. 39 illustrates an exemplary set of matrixes, e.g., a luminance control matrix and two chrominance matrixes, resulting from the application of the TColF routine to columns starting at locations (1,2) and (2,2) and with a height of 5 thereby excluding the information in row 6 of each matrix form being processed by the applied routine.

FIG. 40 illustrates an exemplary set of matrixes, e.g., a luminance control matrix and two chrominance matrixes, resulting from the application of the horizontal de-interlace routine (HDIL) to the entire set of exemplary matrixes shown in FIG. 37.

FIG. 41 illustrates an exemplary set of matrixes, e.g., a luminance control matrix and two chrominance matrixes, resulting from the application of the THF routine to the L, Cb and Cr coefficients of the sub-rectangle comprising rows 1-4 and columns 1-5 of the matrixes shown in FIG. 37.

FIG. 42 illustrates an exemplary set of matrixes, e.g., a luminance control matrix and two chrominance matrixes, resulting from the application of the TDF routine to the L, Cb and Cr coefficients of a first sub-rectangle, r1, comprising rows 1-4 and columns 1-2 and a second sub-rectangle, r2, comprising rows 3-5 and columns 3-5 of the matrixes shown in FIG. 37.

FIG. 43 illustrates an exemplary wavelet sub-band structure for three wavelet decomposition levels applied to a set of wavelet coefficients.

FIG. 44 illustrates an exemplary eidochromatic sub-band structure having the same number of coefficients as the structure shown in FIG. 43, after application of the global eidochromatic transform for a standard merging sequence to the set of wavelet coefficients shown in FIG. 43.

FIG. 45 illustrates an exemplary eidochromatic sub-band structure having the same number of coefficients as the structure shown in FIG. 43, after application of the global eidochromatic transform for a scalable merging sequence to the set of wavelet coefficients shown in FIG. 43.

FIGS. 46-49 show the exemplary results of various processing routines used to decode image data encoded in accordance with the present invention.

SUMMARY OF THE INVENTION

Figure 1:
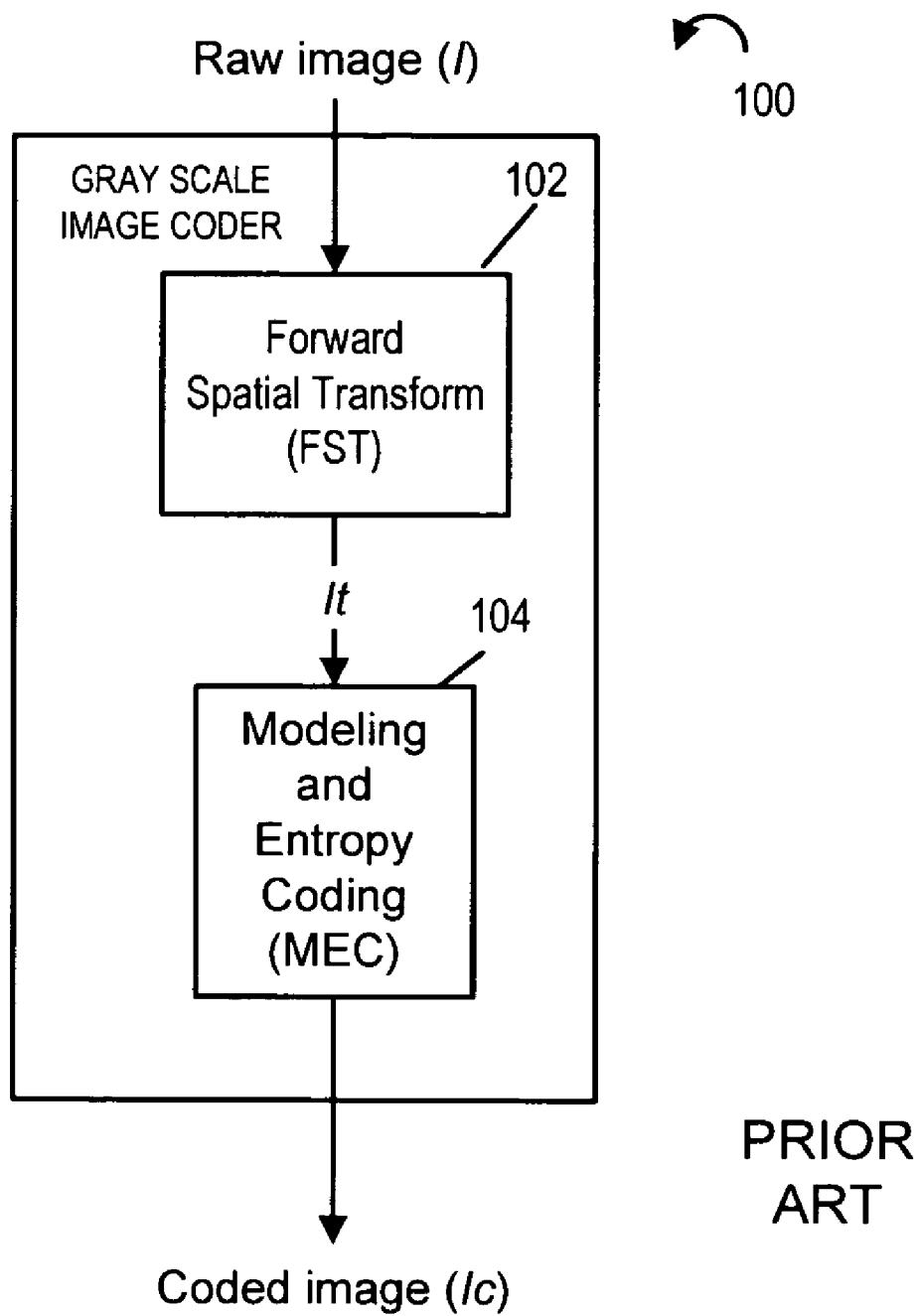
FIG. 1 illustrates a known gray scale coding method.
Figure 2:
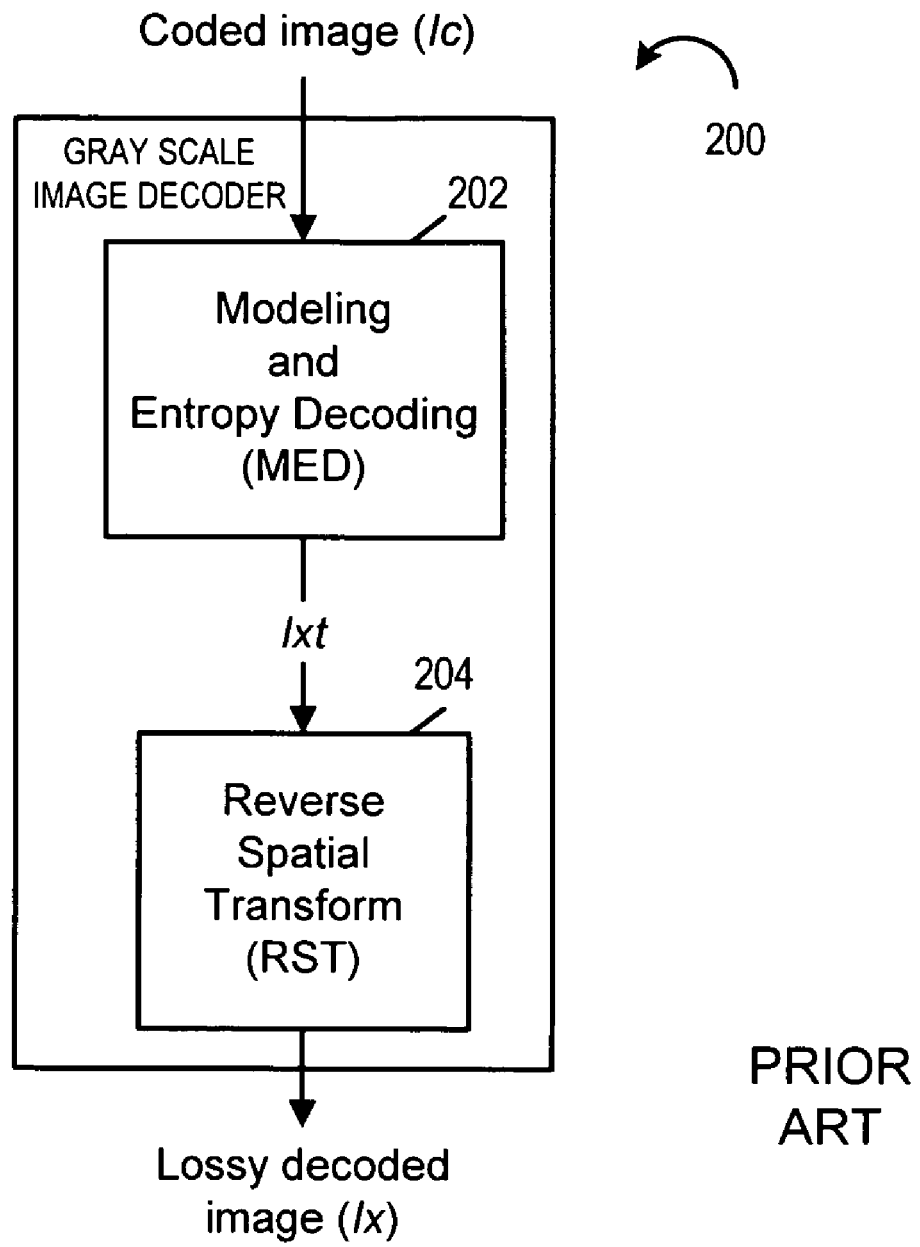
FIG. 2 illustrates a known grayscale decoding method.

The present invention is directed to new color image transform coding methods and apparatus which take advantage of redundant information which is normally present in the luminance and chrominance components of a color image. The transform coding method of the present invention, can normally provide increased compression and/or better image quality at a given coding data rate than conventional JPEG or JPEG 2000 coding which does not use the transform of the present invention as part of the color component coding process. These benefits are normally achieved without generating more coefficients than would be generated in the case of more conventional coding such as JPEG or JPEG 2000 coding. In fact, the transform of the present invention can be applied to increase the coding efficiency of coding systems which perform spatial transforms and modeling and entropy coding operations of the type normally used in JPEG and/or JPEG 2000 coding systems.

JPEG 2000's irreversible color-component transform, like many others, approximates the Karhunen-Loeve transform on the three image components, which by definition completely decorrelates the three color components. Typically, however, the three color components and their wavelet-transformed planes, though decorrelated, are still highly dependent.

The principle underlying the present invention is that many or most color images exhibit three-dimensional redundancy in the two space dimensions and across components, e.g., across color and luminance components. The present invention attempts to take adaptable of this redundancy by performing analysis across space and across image components, e.g., by making one or more gray scale image coding operations a function of another one of the image components, e.g., making coding of one or both chrominance components a function of an image's luminance component. In such embodiments, chrominance coefficient encoding is a function of an image's corresponding luminance components which may be used, in some embodiments, as chrominance coding control values.

To introduce such a coding dependency and to thereby take advantage of the redundancy which remains across separate luminance and chrominance image components, e.g., Y, U, V or Y, Cb, Cr after a forward color transform the present invention uses values generated from luminance values as control coefficients during chrominance component encoding.

In various embodiments of the invention, the resulting number of coded chrominance coefficients is the same as the number of uncoded chrominance coefficients. From a performance perspective, as well as an implementation and processing perspective this has significant advantages over a system which may produce more coded chrominance coefficients than exist at the start of the coding process. Significantly, keeping the number of chrominance coefficients the same or less than the number before coding facilitates the goal of coding these coefficients as compactly as possible. Moreover, the number of memory locations needed to store the coefficients before and after coding can be the same which simplifies implementation issues in many cases. Normally the coding, while keeping the number of coefficients the same, will reduce redundancy an thus the number of bits required to represent an image. This provides transmission advantages over systems which do not offer such benefits in data reduction.

The description of this invention is described in terms of image coding using the 9/7 wavelet transform and JPEG 2000's irreversible color transform, using mean-squared error (MSE) and peak-signal-to-noise ratio (PSNR) as objective measures of image quality. However, the methods of the invention are applicable to a wide variety of image coders following the design of FIG. 1, using various spatial and color-component transforms and may perhaps prove even more effective for other metrics of visual quality.

In one exemplary embodiment, an eidochromatic operator T of the present invention uses a wavelet-transformed luminance plane L to transform the wavelet-transformed chrominance plane Cr based on a redundancy principle that can be summarized as: luminance coefficients and chrominance coefficients tend to be small together in the smooth areas of the image, or large together near edges or other structure in the image.

An image of a baboon face makes a good test image because of the colorful nature of the baboon's face. In developing the transform of the invention, in one test, a scatter-plot of the level-two L and Cr wavelet coefficients for an exemplary image of a Baboon was found to show a rather weak correlation between the two image components (L and Cr). However, partitioning the exemplary Baboon image into 144 roughly equal-sized blocks and constructing scatter-plots on each was found to show a much stronger correlation on most blocks (though with varying coefficients) particularly on those blocks with significantly non-zero Cr coefficients.

The inventors used this insight to form what may be described as a locally linear hypothesis on image structure which is that locally each wavelet-transformed chrominance component $C(x,y)$ will tend to be approximately a linear function of the wavelet-transformed luminance component $L(x,y)$. This can be expressed in terms of the following equation:

$$C(x,y) \approx pL(x,y). \qquad \text{Equation 1:}$$

It is this hypothesis which motivates the novel transform of the present invention which is described herein as an eidochromatic transform. The term eidochromatic is used to indicate that the transform is based on knowledge beyond that available from the chrominance component alone but is also based in part on luminance information.

An exemplary eidochromatic operator T includes, in one embodiment, a pair of operators Ts and Te that decompose chrominance vectors in components parallel and perpendicular to luminance, respectively. If (C1,C2) are consecutive (or mutually proximate on the original image) entries in the Cr plane and (L1,L2) are the corresponding entries in the L plane, and (L1,L2) ((0,0) then define T(L1,L2|C1,C2)= (Ts,Te) as:

$$S=Ts(C1,C2|L1,L2)=proj(L1,L2)(C1,C2)=(L1C1+L2C2)/((L1^2+L2^2)),$$

$$E=Te(C1,C2|L1,L2)=(L2C1(L1C2)/((L1^2+L2^2)).$$

If (L1,L2)=(0,0) then operator T leaves (C1,C2) unchanged:

$$S=Ts(C1,C2|0,0)=C1; E=Te(C1,C2|0,0)=C2.$$

One can also think of the operation Ts as extracting the slope of chrominance in terms of luminance, since if the vector (C1,C2) is parallel to the vector (L1,L2), then Ts(C1, C2|L1, L2)/$\sqrt{(L1^2+L2^2)}$ gives exactly the scaling factor p in Equation 1:

$$(C1,C2)=(L1,L2)\times Ts(C1,C2|L1,L2)/\sqrt{(L1^2+L2^2)}.$$

The quantity Te(C1,C2|L1,L2) measures the deviation from linearity: it vanishes precisely when (C1,C2) and (L1,L2) are parallel.

Note that the exemplary operator T, although non-linear in luminance, is linear and energy-preserving in chrominance:

$$S^2+E^2=[Ts(C1,C2|L1,L2)]^2+[Te(C1,C2|L1,L2)]^2=C1^2+C2^2.$$

When chrominance and luminance are parallel, the energy of chrominance is fully or almost fully captured by Ts. The concentration of energy into the Ts component can be illustrated by analyzing luminance vectors with one entry vanishing. One expects the chrominance component at that location to be zero. When L1≠0 and L2=0, we expect C2 to be near zero. We get:

$$Ts(C1,C2|L1,0)=C1; Te(C1,C2|L1,0)=C2.$$

Conversely, when L1=0 and L2≠0, we expect C1 to be near zero. We get:

$$Ts(C1,C2|0,L2)=C2; Te(C1,C2|0,L2)=C1.$$

In either case, Ts selects the larger-magnitude chrominance values and Te selects the smaller.

Eidochromatic transform coefficients generated in accordance with the invention may be defined by recursive application of the operators Ts and Te to the S-values of the chrominance plane, controlled by the similarly transformed S-values of the luminance plane. Note that E-values of the luminance plane are normally all zero.

Note that Ts and Te together form a self-inverse transform: if S=Ts(C1,C2|L1,L2), and E=Te(C1,C2|L1,L2), then C1=Ts(S,E|L1,L2) and C2=Te(S,E|L1,L2).

The merging sequence—the particular recursive progression by which pairs of coefficients (C1,C2) are chosen to merge into S bands and E bands—is chosen based on the properties of the given spatial transform in use. When the transform is complete, the transform data describing the chrominance component consist of all calculated E-values (analogous to high-frequency wavelet coefficients) together with those remaining S-values corresponding to unmerged sets (analogous to the LL band of wavelet coefficients).

Reversing the transform involves use of information about the merging sequence in order to split (C1,C2) pairs of sets in reverse order, e.g., in an order reverse to the order used for encoding. An important point is that, in various embodiments, the (L1,L2) control values are taken from the lossily coded luminance component. This can be important for reversing the transform, as the eidochromatic transform of the present invention may be a discontinuous function of the control luminance values.

In most, but not necessarily all implementations, the number of coefficients used to represent a portion of an image is the same for each of the image components. In implementations where the same number of coefficients is used for each image component, the luminance component, the first chrominance component, and the second chrominance component will each have the same number of coefficients. In such implementations, there will be a corresponding luminance coefficient for each chrominance component. This facilitates correlation of luminance and chrominance components in accordance with the transform encoding and decoding procedures of the present invention, e.g., based on the location of the coefficient within the block of coefficients to which the particular luminance or chrominance coefficient corresponds. In addition, in most cases a single encoded coefficient is generated from each input chrominance coefficient. Thus, the relationship between the number of luminance and chrominance coefficients is normally maintained throughout the encoding and decoding process.

Numerous additional features, benefits and embodiments are described in detailed description which follows.

DETAILED DESCRIPTION

As discussed above, the present invention is directed to methods and apparatus for using luminance information when encoding chrominance information. This is done in various exemplary embodiments without altering the number of chrominance coefficients but with, in most cases, a noticeable reduction in the amount of data used to represent the image being encoded.

Encoding in accordance with various embodiments of the present invention involves performing an eidochromatic transform of the present invention on chrominance data between a forward spatial transform step and a modeling and entropy coding step using luminance information, e.g., luminance coefficients, as control values while performing the eidochromatic transform. Decoding in accordance with the invention usually involves the reverse procedure with a reverse eidochromatic transform being performed on chrominance coefficients between a modeling and entropy decoding step and a reverse spatial transform step. The encoding and decoding methods of the invention can be used with various known modeling and entropy coding techniques and spatial transform techniques such as those discussed in the background, e.g., techniques used with JPEG and JPEG 2000 coding methods.

Figure 5A:
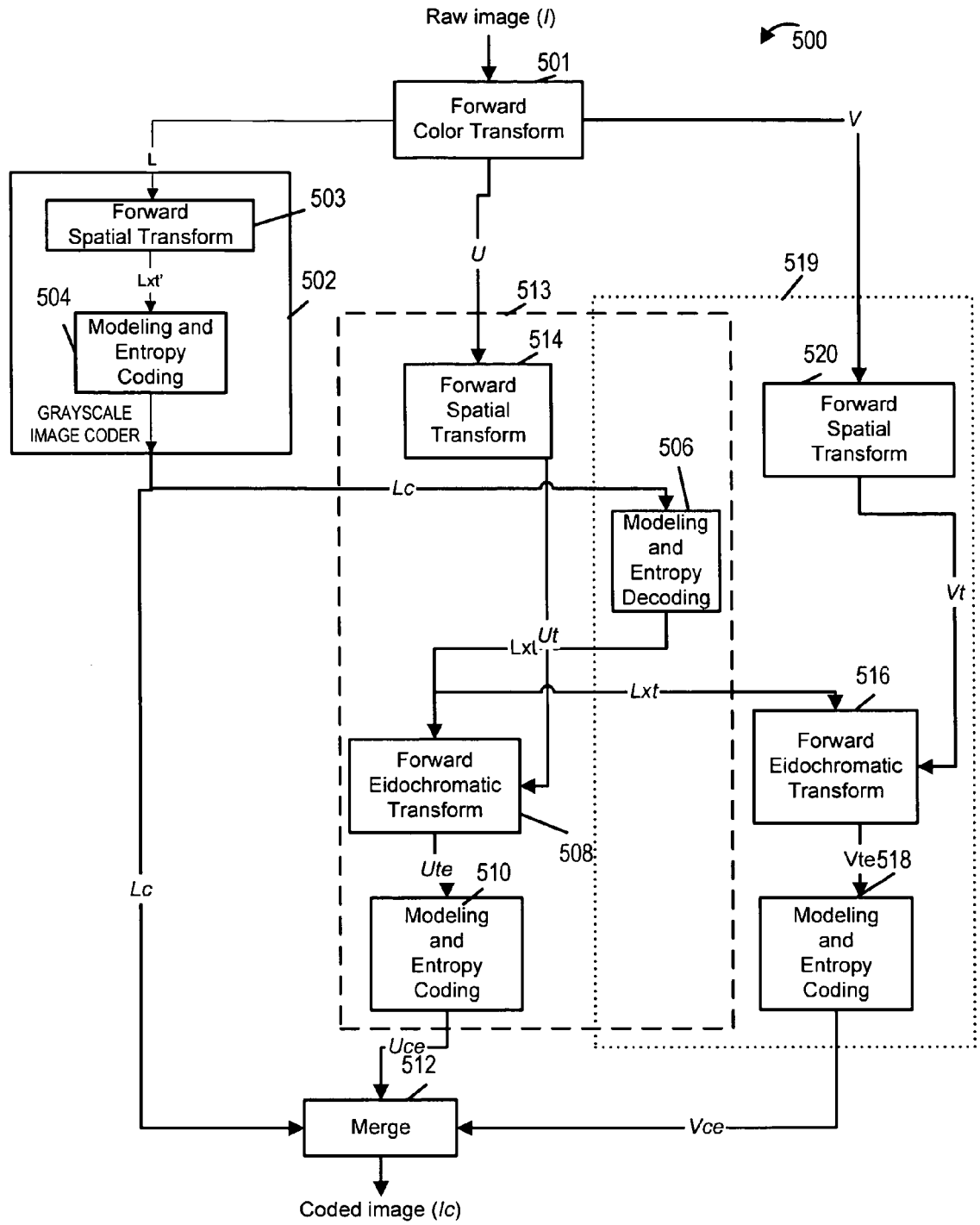
FIG. 5 illustrates an exemplary color image encoding method implemented in accordance with an exemplary embodiment of the present invention which uses a novel transform of the invention as part of the encoding process.
Figure 5B:
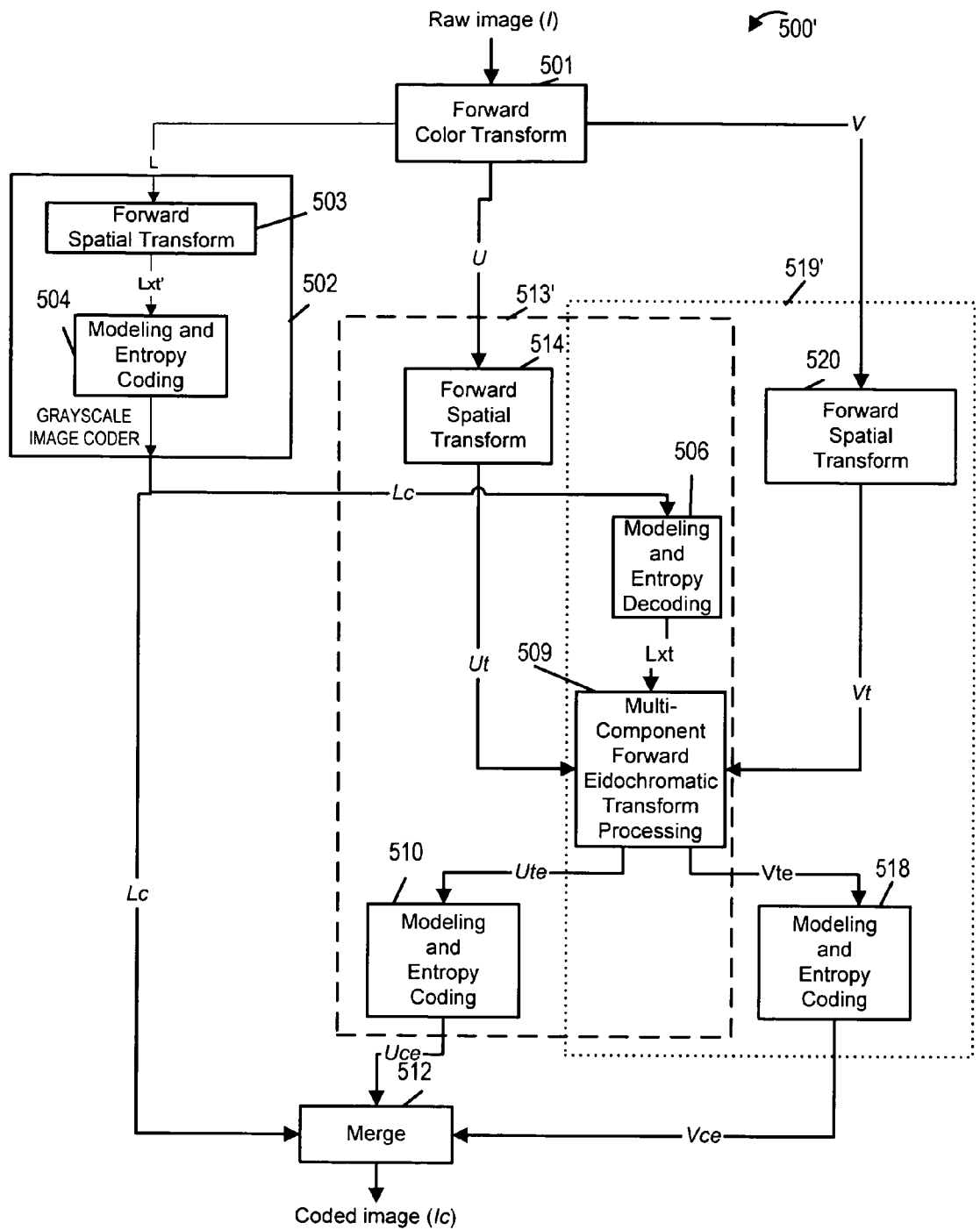

FIGS. 5A and 5B illustrate first and second exemplary encoding methods implemented in accordance with the present invention. An encoder implemented in accordance with the exemplary embodiments of invention includes hardware circuits and/or software which is executed, e.g., by a CPU, to perform the operations and/or transforms illustrated in FIG. 5A or 5B. Accordingly, an encoder implemented in accordance with the invention may, and often does, include a module, e.g., software or hardware, for performing each of the operations and/or transforms illustrated in FIG. 5A or 5B.

In the FIGS. 5A and 5B embodiments, many of the elements are the same with the main difference being the number of luminance and chrominance coefficients performed by the eidochromatic transform processing module of the present invention during each transform operation.

Figure 3:
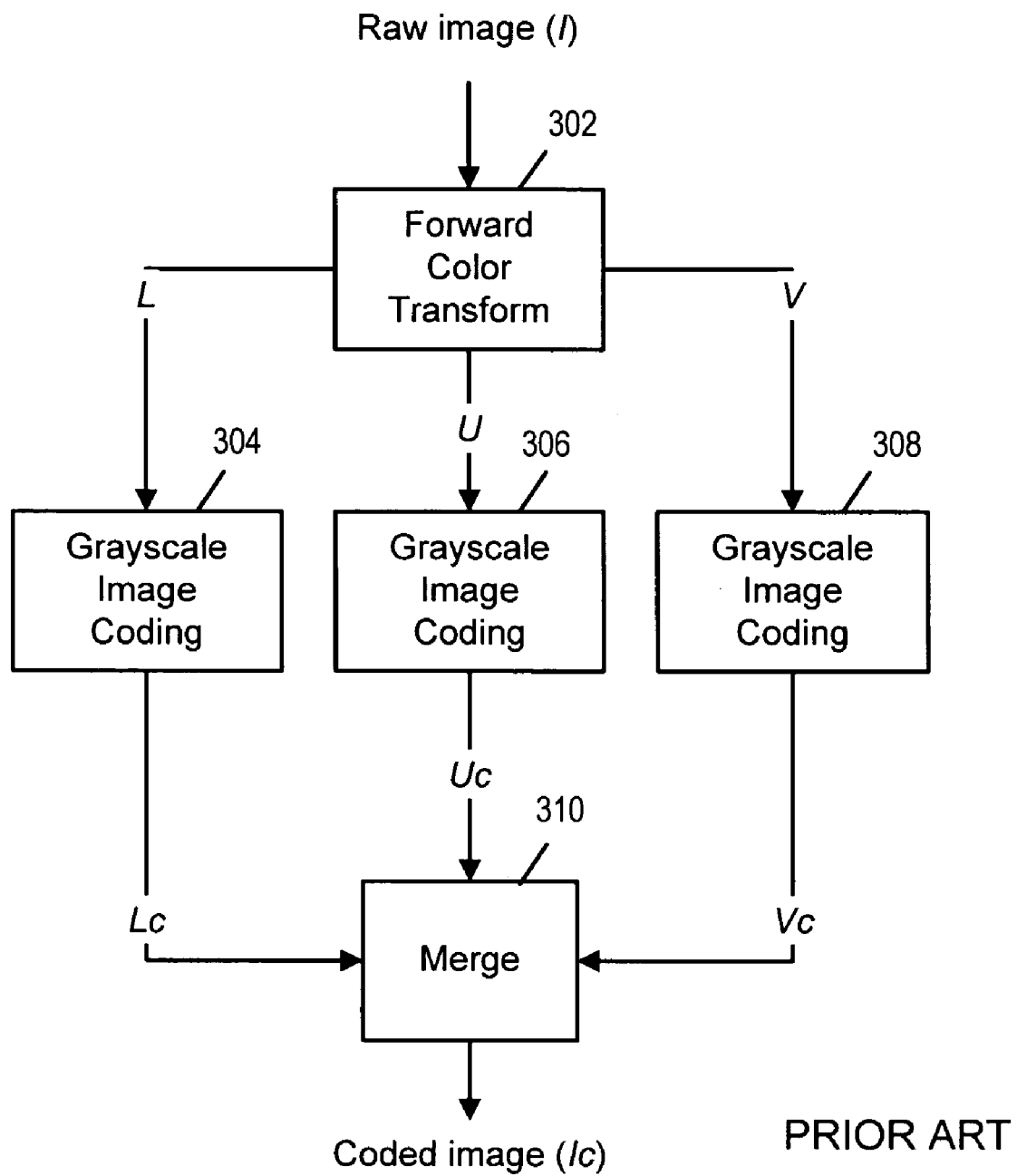
FIG. 3 illustrates a known color coding method which uses the grayscale coding method of FIG. 1.
Figure 4:
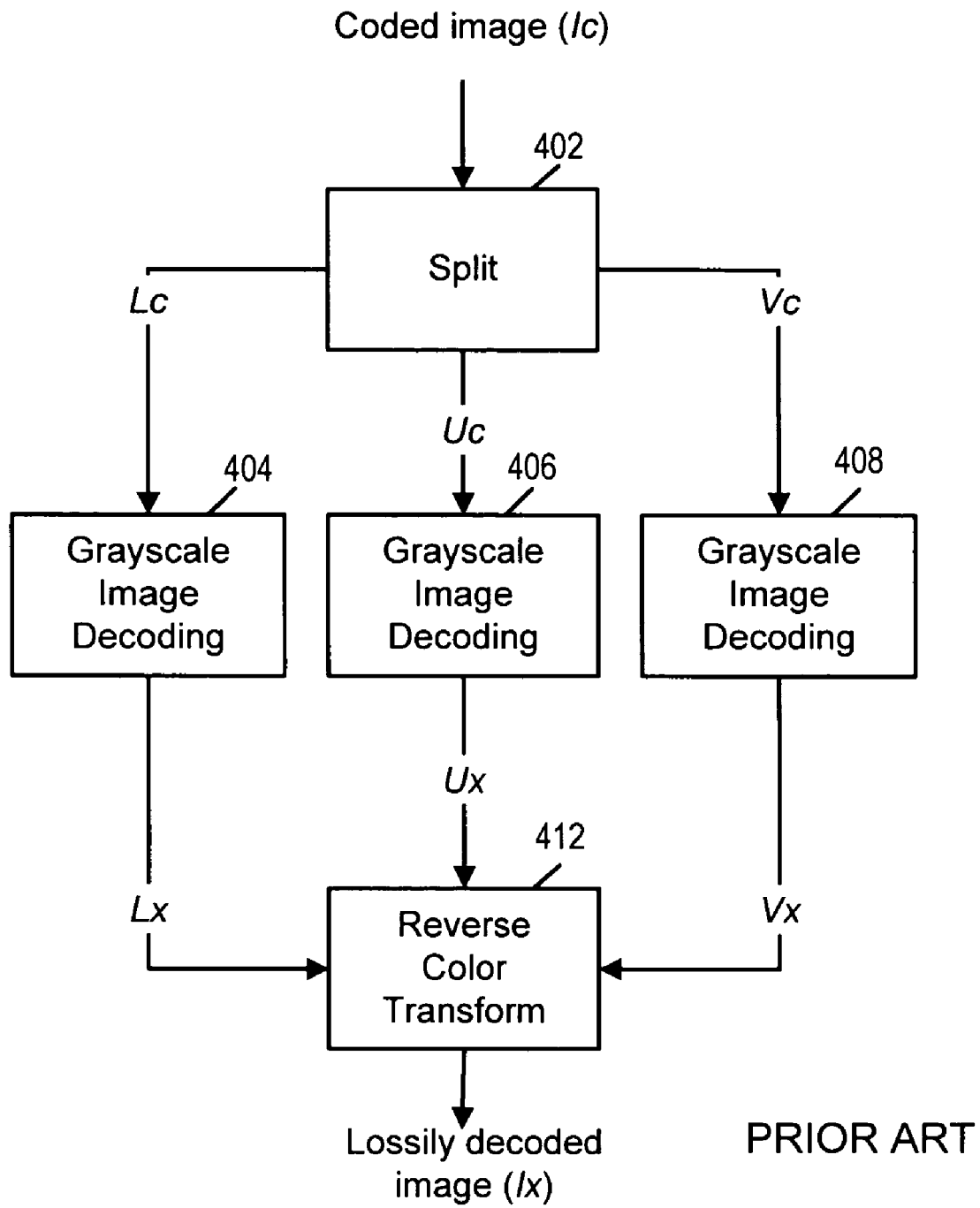
FIG. 4 illustrates a known color decoding method which uses the grayscale decoding method of FIG. 2.

In the FIGS. 5A and 5B embodiments, many of the elements are the same with the main difference being the number of luminance and chrominance coefficients performed by the eidochromatic transform processing module of the present invention during each transform operation. An exemplary color image coder method will now be described with reference to FIG. 5A. As illustrated in FIG. 5A the coding method begins with raw image data (l) being received and with a forward color transform 501 being performed thereon. The forward color transform may be implemented using known techniques such as those previously discussed with regard to FIG. 3. The forward color transform converts the input signal, e.g., an RGB signal, into separate luminance and chrominance signals, e.g., or Y,Cr, Cb signals corresponding to L, U and V in the figure. Each of the separate luminance and chrominance components is then processed along a different processing path. The luminance component L is processed by a grayscale image coding operation 502 which may be implemented using known techniques. The grayscale image coding operation 502 includes performing a forward spatial transform 503 which generates transformed luminance coefficients Lxt' which are then subjected to a modeling and entropy coding operation in step 504. This produces a set of coded luminance coefficients Lc. The coded coefficients are communicated to merge step 512 which is responsible for generating a complete set lc of coded luminance and coded chrominance coefficients from the processing of the luminance and chrominance information.

In accordance with the present invention, the luminance coefficients Lc, output by the grayscale image coding step 502, are used as chrominance encoding control coefficients. In other embodiments, the chrominance coefficients Lxt' produced by the forward spatial transform are used as chrominance transform control coefficients. Use of the luminance coefficients Lc output by the grayscale encoder as the control coefficients may provide better results since they are a close approximation to what will be available at the decoder but use of the output of the forward spatial transform can be more hardware efficient, e.g., since the coefficients can be used for control purposes without first having to perform an inverse of the modeling and entropy coding step 504.

The coding of the first set of chrominance coefficients U (Cb) corresponding to an image is performed by chrominance coding module 513 which includes a forward spatial transform step 514. Examples of forward spatial transforms which may be performed in step 514 include a forward discrete cosine transform, e.g., in the case of JPEG coding and a 9/7 or 5/3 forward wavelet transform, e.g., in the case of JPEG 2000 coding.

The coefficients Ut generated by the forward spatial transform in step 514 are then subject to application of the novel transform of the present invention referred to herein as a forward eidochromatic transform. This transform will be explained in detail in regard further below. Luminance coefficients Lc are processed in modeling and entropy decoding step 506 to produce transformed luminance coefficient Lxt to be used as control coefficients as part of the forward eidochromatic transform performed in step 508. By using transformed luminance coefficients produced by performing the inverse of modeling and entropy step 504, as the control coefficients, the control coefficients used in step 508 will better approximate the control coefficients which will be available at a decoder. However, in some embodiments, step 506 is skipped and the transformed luminance coefficients Lxt' output by the forward spatial transform 503 are used as the luminance control coefficients input to step 508.

In step 508, the eidochromatic transform of the present invention is applied to the chrominance coefficients input thereto. In this transform operation, the same or fewer chrominance coefficients are output then are input, e.g., one or more coefficients may be dropped. In several embodiments, the number of output chrominance coefficients is the same as the number of input chrominance coefficients. A luminance control coefficient in combination with a corresponding chrominance input coefficient is normally used to generate each corresponding output chrominance coefficient. The eidochromatically transformed coefficients Ute generated by step 508 are then supplied to modeling and entropy coding step 510. The resulting coded chrominance coefficient values generated by step 510 are supplied to merge step 512.

Processing of the second set of chrominance coefficients V (Cr) occurs in generally the same manner as described with regard to the processing of the first set of chrominance coefficients U. This processing occurs in module 519 which shares step 506 with module 513. In this manner, the luminance control coefficients need only be generated once and are used to control the eidochromatic transform applied to both sets of chrominance information. As in the case of processing performed by module 513, processing performed by module 519 includes a forward spatial transform step 520, a forward eidochromatic transform step 516 and a modeling and entropy coding step 518 which operate in the same or similar manner as steps 514, 508 and 510 which have already been described. The second set of coded chrominance coefficients Vce generated by step 518 are supplied to merge step 512. Merge step 512 combines the coded luminance Lc, first set of chrominance Uce and second set Vce of coded chrominance information to form a set of coded image data (lc) suitable for storage and/or transmission.

The FIG. 5A example shows a case where chrominance coefficients generated by a forward spatial transform operation 514 or 520 corresponding to a single chrominance component of an image, are subjected to the eidochromatic transform of the present invention with the two separate chrominance coefficient sets 514, 520 being processed separately in parallel. Efficiencies in terms of hardware implementation can be achieved by performing the eidochromatic transform on both sets of chrominance coefficients corresponding to an image as part of a single transform operation. FIG. 5B shows such an exemplary implementation.

FIG. 5O illustrates a computer based image encoding system 5000 which includes a CPU 5002, input output devices 5006 which include a display device 5010 and a memory 5011 which are coupled together by a bus 5004. In FIG. 5O a computer based image encoding system 5000 is shown where software modules 501', 503', 502', 504', 506' 508', 510' 512', 514', 516', 518', 519' and 520', when executed by CPU 5002 are used to perform the various operations discussed in regard to FIG. 5A. The processing is performed on a first set of luminance information which produces blocks of luminance coefficients which are also stored in memory block 5012. First chrominance information, corresponding to the same image as luminance information 5012, and the resulting coded chrominance coefficients are stored in memory block 5014. Second chrominance information, corresponding to the same image as luminance information 5012, and the resulting second set of coded chrominance coefficients are stored in memory block 5016. Additional memory is used for temporarily storing coefficients during processing, e.g., chrominance transform control coefficients may be generated and stored in memory. In addition, a set of merged coded image data may be generated and stored in memory rather than being output immediately via an I/O device included in the set of I/O devices 5006. The modules in FIG. 5O which have the same reference number but a 'after the number control the CPU 5002 to perform the image processing operation described in regard to the element of FIG. 5A which bears the same reference number but does not include the'. For example, forward color transform module 501' controls the CPU 5002 to perform the step 501 described with regard to FIG. 5A.

Elements in FIG. 5B which bear the same reference number as the elements of FIG. 5A are the same or similar to the elements already described with regard to the 5A embodiment and therefore will not be described again. The FIG. 5B embodiment differs from the 5A embodiment primarily by the fact that it includes a multi-component forward eidochromatic transform processing step which replaces steps 508 and 516 of FIG. 5A. Thus, in the FIG. 5B embodiment the processing module 513' which corresponds to the first chrominance component shares both the modeling and entropy decoding step 506 and the multi-component forward eidochromatic transform processing step 509 with the processing module 519' which is responsible for processing of the second chrominance component corresponding to the image being coded.

Multi-component forward eidochromatic transform processing step 509 receives as its input three sets, e.g., matrixes of coefficients, the luminance coefficient Lxt which are used as transform control coefficients, the first set of chrominance coefficients Ut corresponding to the first chrominance component of the image, and the second set of chrominance coefficients Vt corresponding to the second chrominance component of the image. In accordance with various embodiments of the present invention, for each input chrominance coefficient, a transformed chrominance coefficient is generated. In such an embodiment, the output set of transformed chrominance coefficients Ute corresponding to the first chrominance component will have the same number of coefficients as the input set of coefficients Ut. Similarly, the transformed set of chrominance coefficient Vte generated by step 509 will have the same number of coefficients as the input set Vt. As in the case of the FIG. 5A embodiment, in the FIG. 5B embodiment, the transformed coefficient set Ute is subjected to modeling and entropy coding in step 510 to produced the set of coded coefficient Uce corresponding to the first chrominance component. In addition, the second set of transformed chrominance coefficients Vte, corresponding to the second chrominance component are subjected to modeling and entropy coding in step 518.

Various implementations of the novel eidochromatic transform of present invention will be described below in the context of an exemplary system which uses a set of luminance coefficients corresponding to an image as control coefficients while performing a transform on corresponding coefficients from each of the two sets of chrominance coefficients which correspond to different chrominance components of the image. While the use of two sets of chrominance coefficients and one set of luminance coefficients to represent an image is a common coding choice, it should be appreciated that the transform and methods of the present invention can be used with other combinations of luminance and chrominance coefficients. In one such embodiment which will be described, pairs of coefficients from each set of luminance (L) and each of the chrominance (Cb and Cr) coefficient sets are processed at the same time. However, it is possible to process one luminance and chrominance coefficient at a time or one luminance and two chrominance coefficients at a time using the transform of the present invention.

Figure 6A:
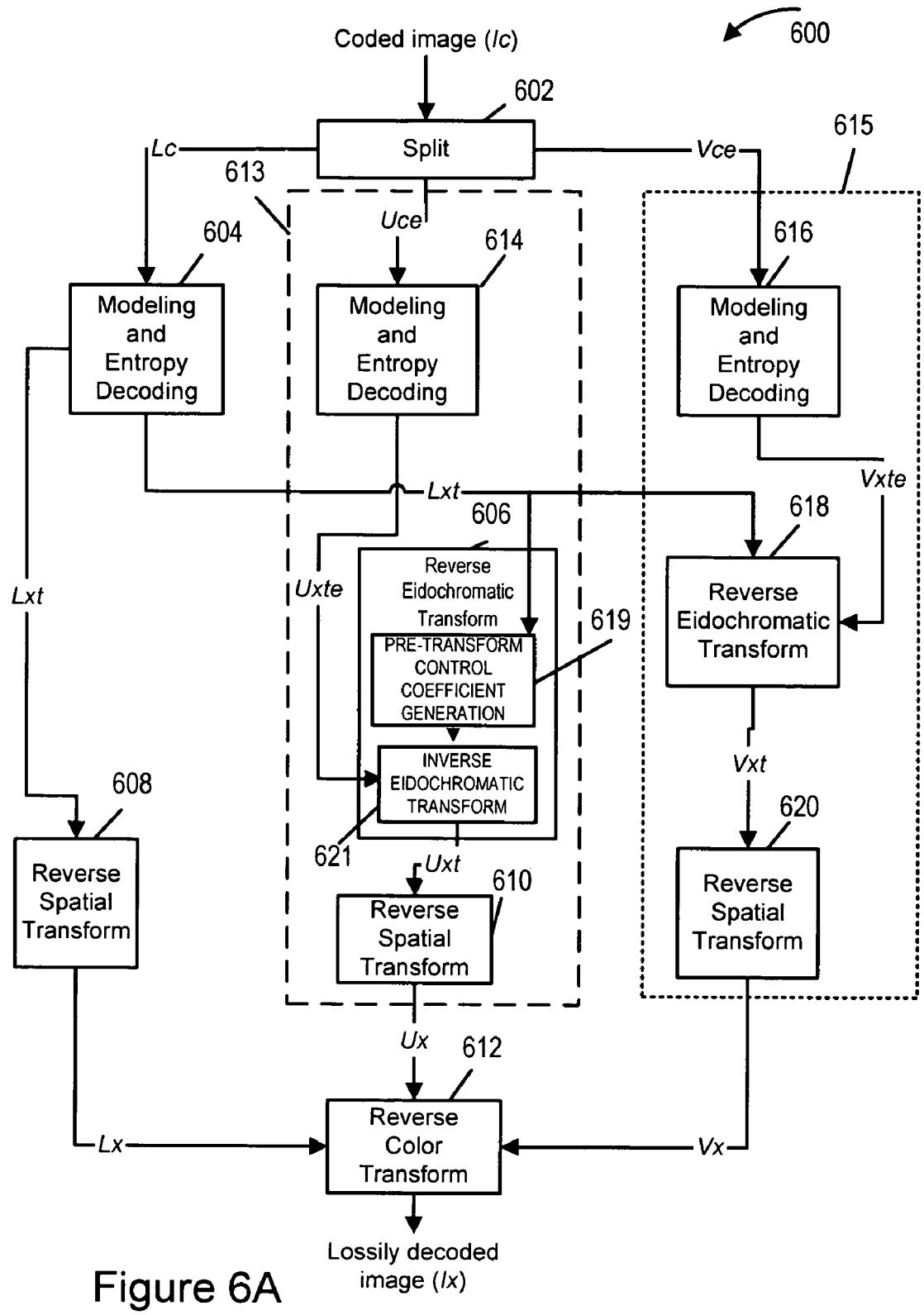
FIG. 6 illustrates an exemplary color image decoding method implemented in accordance with an exemplary embodiment of the present invention which can be used to decode color images generated in accordance with the encoding method of FIG. 5.
Figure 6B:
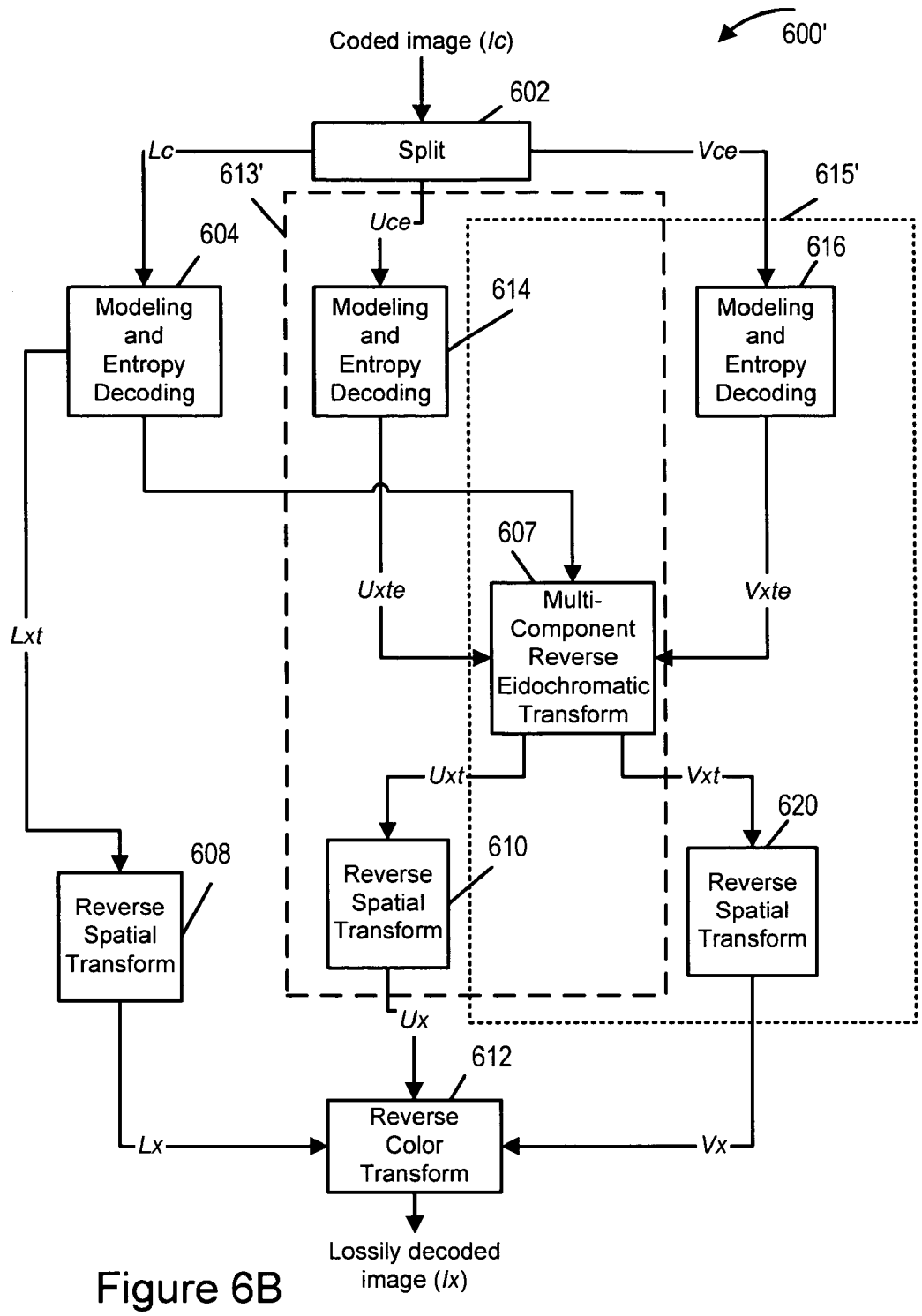

FIGS. 6A and 6B illustrate first and second exemplary decoding methods implemented in accordance with the present invention. A decoder implemented in accordance with various exemplary embodiments of the invention includes hardware circuits and/or software which is executed, e.g., by a CPU, to perform the operations and/or transforms illustrated in FIG. 6A or 6B. Accordingly, a decoder implemented in accordance with the invention, may and sometimes does include a module, e.g., software or hardware, for performing each of the operations and/or transforms illustrated in FIG. 6A or 6B.

In the FIGS. 6A and 6B embodiments, many of the elements are the same with the main difference being the number of luminance and chrominance coefficients performed by the eidochromatic transform processing module of the present invention during each transform operation.

FIGS. 6A and 6B show methods 600, 600' of decoding image data, e.g., sets of coded luminance and corresponding chrominance coefficients, in accordance with various embodiments of the present invention which perform an inverse transform according to the invention.

The decoding method 600 of FIG. 6A begins with a set of coded image data Ic being supplied to splitting step 602. In step 602 the coded image data is split into separate sets of coded luminance Lc, and chrominance components Uce, Vce. A modeling and entropy decoding operation is performed in step 604 to produce spatially transformed chrominance coefficients Lxt. The generated set of luminance coefficients Lxt is supplied to be used as control coefficients to first and second reverse eidochromatic transform steps 606, 618 which are used to processes the first and second chrominance components. Eidochromatic transform steps 606 and 608 each include two substeps, a pre-transform control coefficient generation step 619 and in inverse eidochromatic transform step 621. The pre-transform control coefficient generation step 619 involves generating a set of control coefficients from the decoded luminace information Lxt (e.g., luminance coefficients) which is the same as, or similar to, the set of control coefficients which exited at the end of the encoding process which resulting in the generation of the coded chrominance data to be decoded. Inverse eidochromatic transform step 621 involves performing a reverse transform operation on the encoded chrominance coefficients, using the generated control coefficients, to reverse the eidochromatic transform processing and thereby generate chrominance coefficients Uxt which are then processed by reverse spatial transform step 610. Steps 619, 621 are not shown in block 618 to simplify the drawing.

The set of luminance coefficients Lxt is subjected to a reverse spatial transform in step 608 to produce a decoded set of luminance coefficients Lx. The decoded luminance coefficients Lx are supplied to reverse color transform step 612.

Processing of the set of coded coefficients Uce corresponding to the image's first chrominance component starts is performed by module 613 with the first step being a modeling and entropy decoding step 614. This produces the set of eidochromatically transformed coefficients Uxte which are supplied as chrominance coefficients to be processed to reverse eidochromatic transform step 606. Reverse eidochromatic transform step performs a revise eidochromatic transform on the chrominance coefficients in accordance with the invention using the luminance coefficients as control coefficients. Normally this results in one spatially transformed coefficient being output for each input chrominance coefficient. Of course, some coefficients may be dropped during processing resulting in less output chrominance coefficients than input chrominance coefficients. The generated set of chrominance coefficients Uxt is subject to a reverse spatial transform in step 610 which produces a set of decoded chrominance coefficients Ux corresponding to the image's first chrominance coefficient. The decoded chrominance coefficients are supplied to reverse color transform step 612.

Decoding of the second set of chrominance components Vce, performed by module 615, involves the same procedure as the decoding of the first set of chrominance coefficients Uce. In step 616 the set of coded chrominance coefficients Vce corresponding to the second chrominance component are subject to modeling and entropy decoding to produce the set of eidochromatically transformed chrominance coefficients Vxte. This set of coefficients is then subjected to an inverse eidochromatic transform in step 618 to produce the set of spatially transformed chrominance coefficients Vxt. This set of coefficients is then subject to a reverse spatial transform in step 620. The set of decoded chrominance coefficients Vx, corresponding to the image's second chrominance coefficient are then supplied to the reverse color transform step 612. Reverse color transform step 612 processes the decoded luminance and chrominance information Lx, Ux, Vx to generate a composite Ix, e.g., RGB, image representation of the decoded image.

Figure 51:
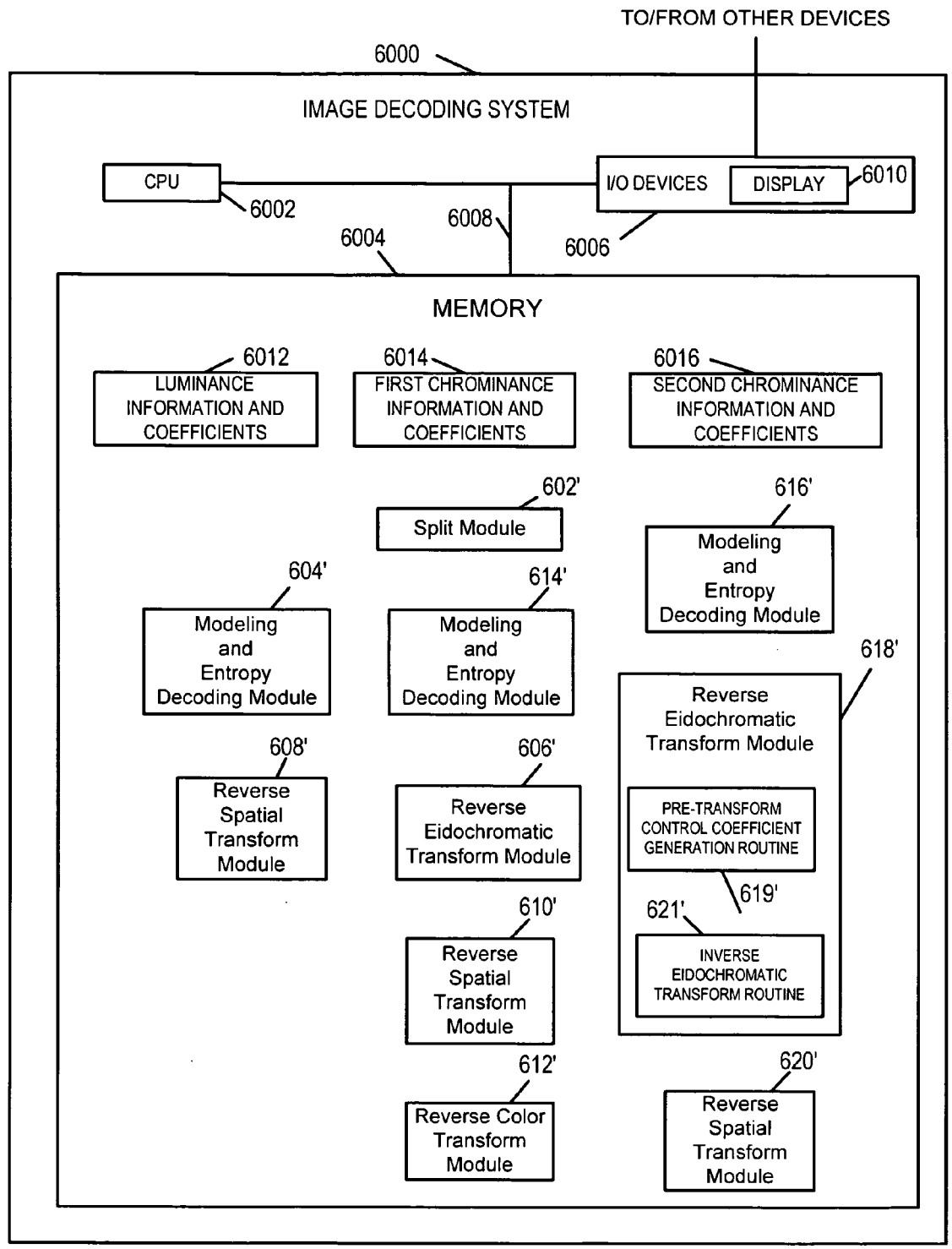
FIG. 51 illustrates an image decoding system which uses a programmable processing unit and various modules, e.g., software modules, to implement image encoding in accordance with the present invention.

FIG. 51 illustrates a computer based image decoding system 6000 which includes a CPU 6002, input output devices 6006 which include a display device 6010 and a memory 6004 which are coupled together by a bus 6008. In FIG. 51 a computer based image decoding system 6000 is shown where software modules 602', 604', 606', 608', 610', 612', 616', 618', 620', when executed by CPU 6002 are used to perform the various operations discussed in regard to FIG. 6A. The processing is performed on a first set of coded luminance coefficients to produced decoded luminance information which is also stored in memory block 6012. First coded chrominance coefficients, corresponding to the same image as luminance information 6012, and the resulting decoded chrominance information are stored in memory block 6014. Second chrominance coefficients, corresponding to the same image as luminance information 6012, and the resulting second set of decoded chrominance information are stored in memory block 5016. Additional memory is used for temporarily storing coefficients during processing, e.g., chrominance transform control coefficients generated from received coded luminance coefficients. In addition, a set of decoded image data may be generated and stored in memory 6004 prior to being displayed on a display device 6010 or being supplied to another device via an input/output device included in the set of devices 60006. The modules in FIG. 51 which have the same reference number but a 'after the number control the CPU 6002 to perform the image processing (decoding) operations described in regard to the corresponding element of FIG. 6A which bears the same reference number but does not include the'.

FIG. 6B illustrates a decoder implemented using a multi-component reverse eidochromatic transform which processes chrominance coefficients corresponding to two different components at the same time. This multi-component reverse eidochromatic transform step is shared by both chrominance processing modules 613', 615'. Luminance coefficients Lxt are used as control coefficients as in the case of the FIG. 6B embodiment. Multi-component reverse eidochromatic transform step receives the first and second sets of chrominance coefficients Uxte and Vxte and generates corresponding sets of spatially transformed chrominance coefficients Uxt and Vxt which are then processed by reverse spatial transform steps 610, 620, respectively.

In the FIG. 6B implementation, implementation efficiencies are obtained by processing the chrominance coefficients corresponding to the different chrominance coefficients in a single reverse eidochromatic transform step 607 as opposed to two different processing steps 606, 618 as in the case of the FIG. 6A embodiment. The results achieved by the FIG. 6B decoder are generally the same as in the case of the FIG. 6A embodiment.

To gain a better appreciation of the invention, it will be explained using various examples which involve the processing of exemplary sets of coefficients shown in FIG. 37.

FIG. 37 illustrates three exemplary sets of coefficients 3702, 3704, 3706, e.g., wavelet coefficients, representing an exemplary image with thirty pixels. L, Cb, and Cr matrices 3702, 3704 and 3706 are matrixes of wavelet coefficients for the luminance component and the two chrominance components of the same image. All of these have dimensions identical to the dimensions of the original image.

The sets of chrominance coefficients may be processed, in accordance with the coding method of the present invention, to remove redundancy found between the luminance and chrominance components. In the examples described herein, each pixel has three components, a luminance component (L) and two chrominance components (Cb, Cr). In the example, as in many known system, the number of wavelet coefficients for each pixel component L, Cb, Cr matches the number of pixels in the image being represented by the sets of coefficients 3702, 3704, 3706. Thus, there are 30 wavelet coefficients in each set 3702, 3704, 3706 which are arranged into 5 columns and 6 rows. While the sets of coefficients 3702, 3704, 3706 correspond to an image 6×5 pixels in size, the wavelet coefficient located at a particular matrix location does not directly correspond, represent a pixel value, of the pixel at that particular image location.

The invention is generally applicable to coding and decoding a wide range of pixel and/or coefficient values. Accordingly, while explained in the context of wavelet coefficient values, it should be appreciated that the methods and apparatus of the present invention can also be used to code coefficients corresponding directly to pixel values, e.g., luminance and chrominance pixel values and not simply wavelet coefficients can be coded in accordance with the methods and apparatus of the present invention.

FIG. 37 illustrates an exemplary set of wavelet coefficient matrixes, 3702, 3704, 4706 L, Cb, Cr representing an image with 30 elements, e.g., pixels, where each of the exemplary matrixes include 30 wavelet coefficient values used to represent the image which may be processed by the transform of the present invention. The sets of coefficients 3702, 3704, 3706 corresponding to luminance and chrominance values may be generated using various known coefficient generation techniques including JPEG coding techniques with the sets 3702, 3704, 3706. Each set of coefficients 3702, 3704, 3706 includes 5 columns and 6 rows of coefficients which can be referenced by their row/column numbers (y/x). The set of luminance coefficients 3702 is exemplary of a set of luminance coefficients which may be output by the modeling and entropy decoding step 506 for use as eidochromatic transform control coefficients. Cb and Cr coefficients sets 3704, 3706 are representative of the outputs of the forward spatial transform 514 and 520 which serve as the sets of chrominance input values to eidochromatic transform steps 508, 516, respectively, or multi-component forward eidochromatic transform 509.

The coefficient matrixes 3702, 3704, 3706 will be used as the basis for several examples showing processing performed in accordance with various routines and/or subroutines in accordance with the invention.

The method of the present invention will now be described further with reference to several exemplary routines or procedures which can be used to implement the invention, e.g., when executed by a processor processing image coefficients in accordance with the invention. Several of the procedures use "rectangles" specifying subrectangles of the overall coefficient matrices. Each rectangle r is defined by four quantities left (r) (the leftmost column position), right (r) (the rightmost column position), top (r) (the topmost row position), and bottom (r) (the bottommost row position). Also used are the number of columns width (r)=right (r)+1-left (r) and the number of rows height (r)=bottom (r)+1-top (r).

While at the lowest level, the transform of the present invention is applied to a chrominance coefficient (or pair of chrominance coefficients where each coefficient corresponds to a different chrominance value) using a luminance value as a control coefficient, in order to support processing of blocks of coefficients, a global routine is supported in various embodiments of the invention. The global routine is responsible for calling one or more subroutines to perform various processing operations, including transform operations in accordance with the invention, in order to process a block of coefficients which normally involves processing of the same blocks of coefficients corresponding to both luminance components and using the corresponding chrominance block of coefficients as control coefficients.

Figure 17:
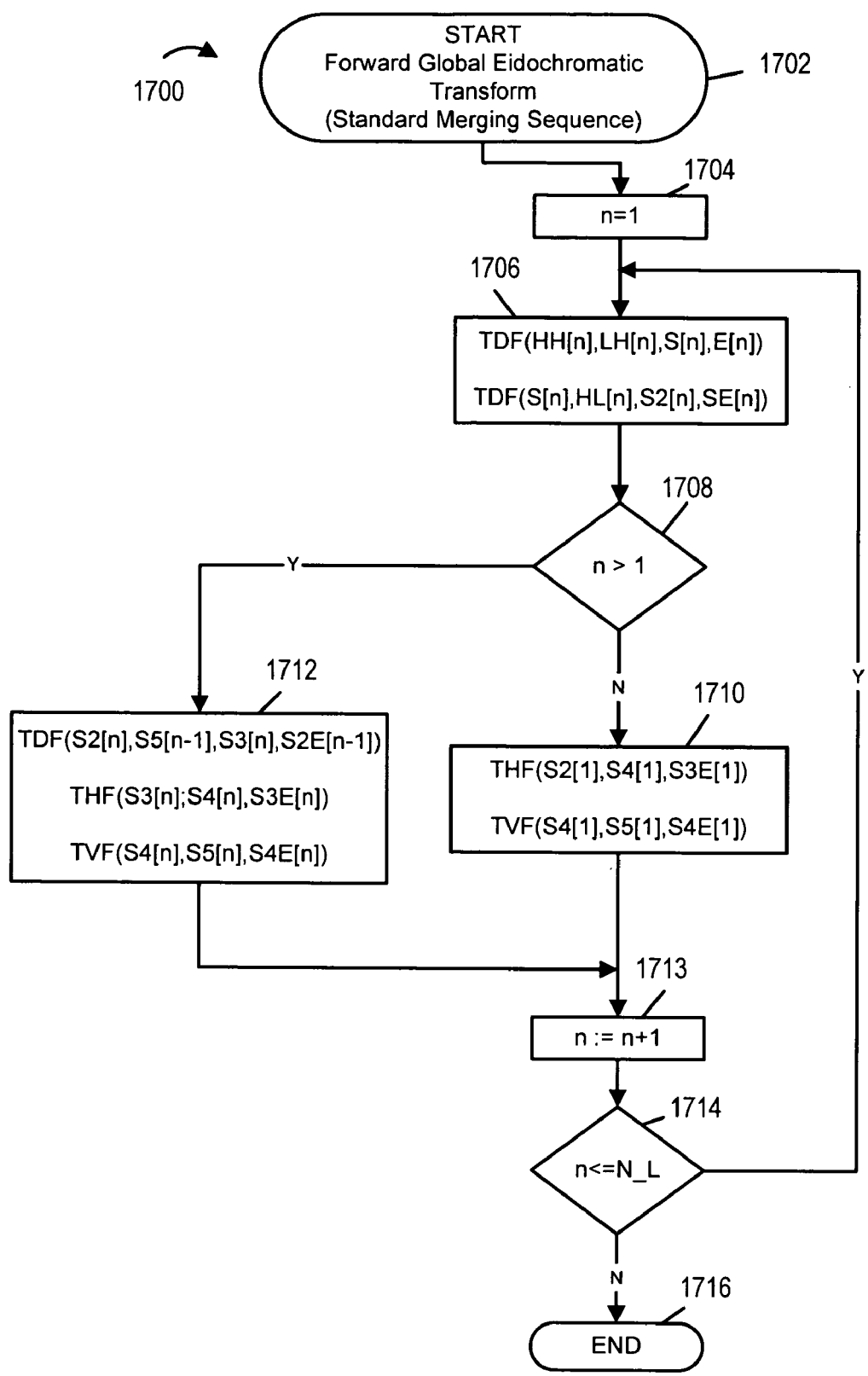
FIGS. 17 and 18 illustrate alternative examples of a main eidochromatic transform routines which may call one or more of the subroutines shown in FIGS. 7-16 and may be used to implement the forward eidochromatic transform steps shown in FIG. 5.
Figure 18:
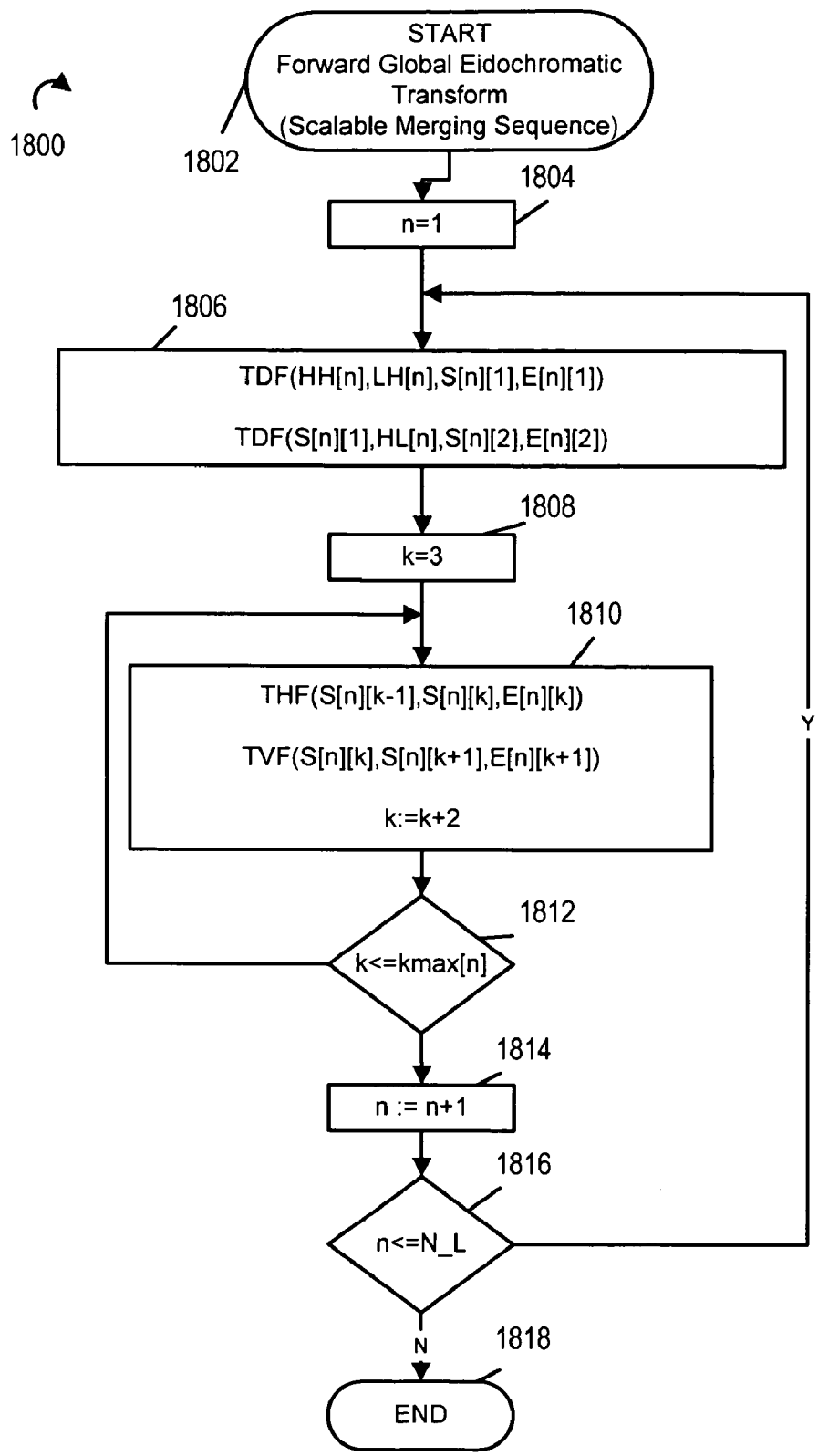

FIG. 17 shows the steps 1700 of an exemplary Forward Global Eidochromatic Transform which uses what is referred to as a standard merging sequence in which various coefficient blocks are merged during processing. As a result of the use of a standard merging sequence for application of the transform to a block of coefficients, the entire block will normally need to be fully decoded in order to recover the image. FIG. 18 illustrates the steps 1800 of an alternative Forward Global Eidochromatic Transform which implements a scalable merging sequence. Application of the scalable merging sequence has the advantage that a coded image need not be fully decoded to recover the image. In the case of the scalable merging sequence, the coded coefficients corresponding to a particular coding level can be decoded and an image produced therefrom. Decoding of coefficients corresponding to additional layers will produce a higher resolution image but is not necessary for recovery and display of an image. While this facilitates the support of decoders of different complexity which provide different resolution outputs, the overall data reduction achieved tends to be slightly lower than when using the standard merging sequence used in the FIG. 17 embodiment.

When discussing the various subroutines, while discussed in terms of blocks of coefficients, reference to a block will normally mean that a block of coefficients corresponding to the same row/column location in each of matrixes of coefficients L, C, and Cr coefficients are used unless the context of the reference indicates otherwise.

As discussed above, the Forward Global Eidochromatic Transforms 1700, 1800 call various subroutines. The subroutines produce from an input block of coefficients one or more output blocks of coefficients which, in combination in the case of multiple output blocks, normally have the same number of coefficients as the input block, i.e., the number of coefficients used to represent the image will normally be unchanged. The coefficients generated by the transform are used to replace the coefficients of the input block. This will happen, in most cases, several times thereby achieving one or more levels of transform processing. The level of transform processing to which a block of coefficients corresponds is determined by the number of times transform iterations used to produce the particular block of coefficients. For example, a block of transformed coefficients produced by applying the transform a single time would be considered as corresponding to a first level transform. Subjecting these transformed coefficients to the transform again would result in second level transform coefficients. The blocks of chrominance values resulting from the multiple iterative applications of the novel transform of the invention become the values output by the transform step 508, 516 or 509. Luminance values used as control coefficients are transformed as part of the iterative processing. However, the transformed luminance values are control values and are not output as transformed luminance coefficients. During decoding, these control values can, and normally are, generated from the decoded luminance information and therefore need not be transmitted, i.e., transmission of the conventionally coded luminance information is normally sufficient to allow reconstruction of the luminance control coefficients used in decoding.

Blocks of transformed coefficients generated in accordance with the invention are described as S or E blocks of coefficients. S is used to refer to coefficient values which relate, e.g., to the slope of a line resulting from applying the input coefficients to a transform equation in accordance with the present invention. E is used to refer to blocks of coefficients that represent an error prediction. While S coefficient values may be processed iteratively, E values are usually not subject to additional transform processing. Thus, S values may be used to produce additional S and E values corresponding to a higher level of transform processing but E values will normally not be used in higher levels of transform processing.

Generally there are two types of forward transform subroutines, ones that split a block of input coefficients into two output blocks of coefficients, and ones that receive as input two blocks of coefficients and output two blocks of coefficients of the same size as the input blocks.

Figure 11:
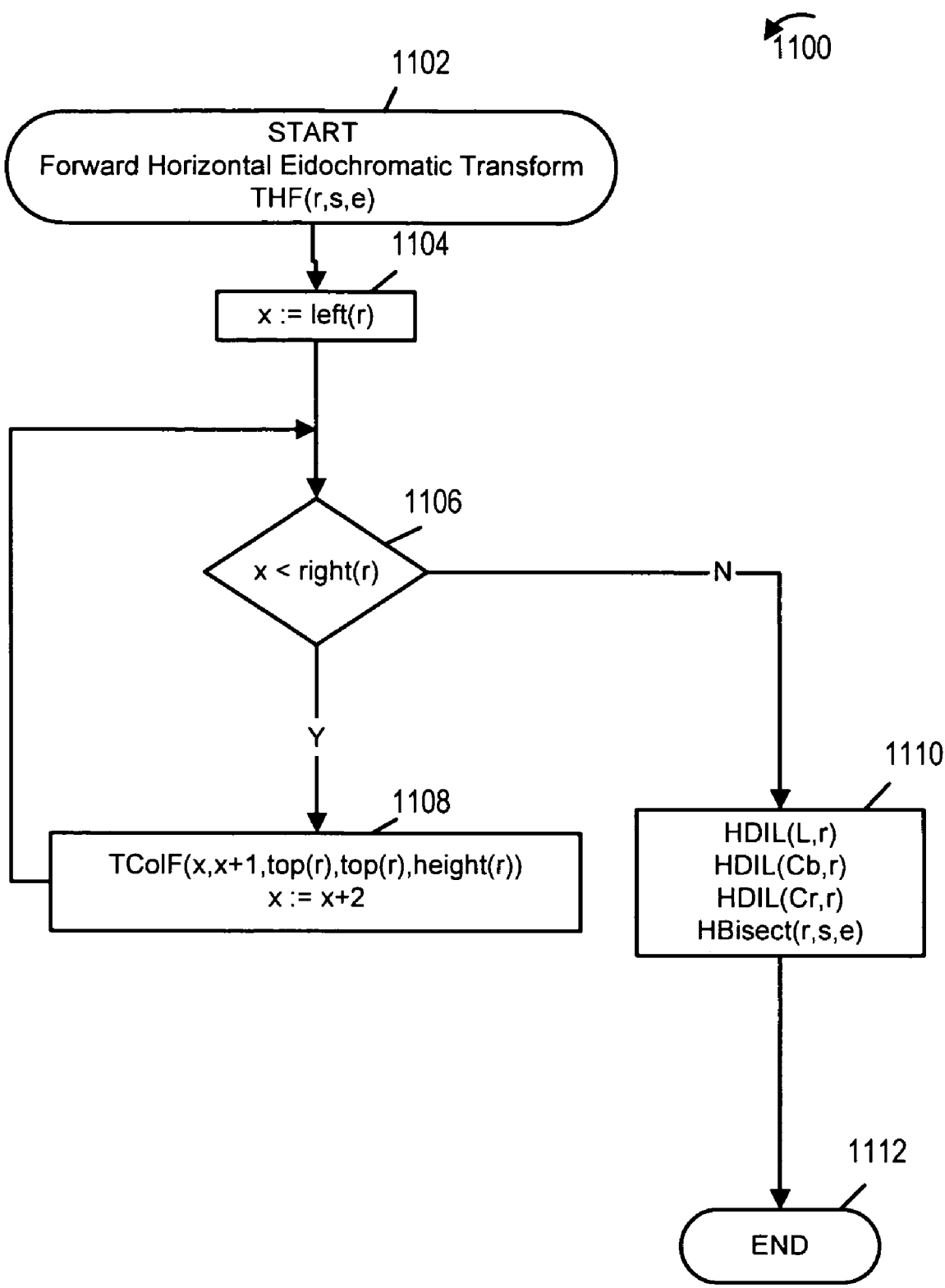
FIG. 11 illustrates a forward horizontal eidochromatic transform which is applied to horizontal pairs of coefficients within a rectangle r to generate resulting s-values that end up in a left subrectangle s and e-values that end up in a subrectangle e and which, when r has an odd number of columns, leaves the rightmost column unchanged but moves directly to the rightmost column of s.

A forward horizontal transform routine (THF) is an example of a routine which receives as its input one block of coefficients and outputs two equal (in the case of a input block with equal numbers of columns) or approximately equal size blocks (in the case of an odd number of input columns, when one output block will have one more column than the other) of output coefficients with a resulting block of S coefficients produced by the transform being positioned on the left and a block of E coefficients produced by the transform being positioned on the right. The resulting S and E blocks of coefficients, in combination, have the same number of coefficients as the input block and replace the input block of coefficients as part of the processing to produce the eidochromatically transformed set of coefficients. The steps of an exemplary forward horizontal eidochromatic transform routine (THF) are shown in FIG. 11.

Figure 15:
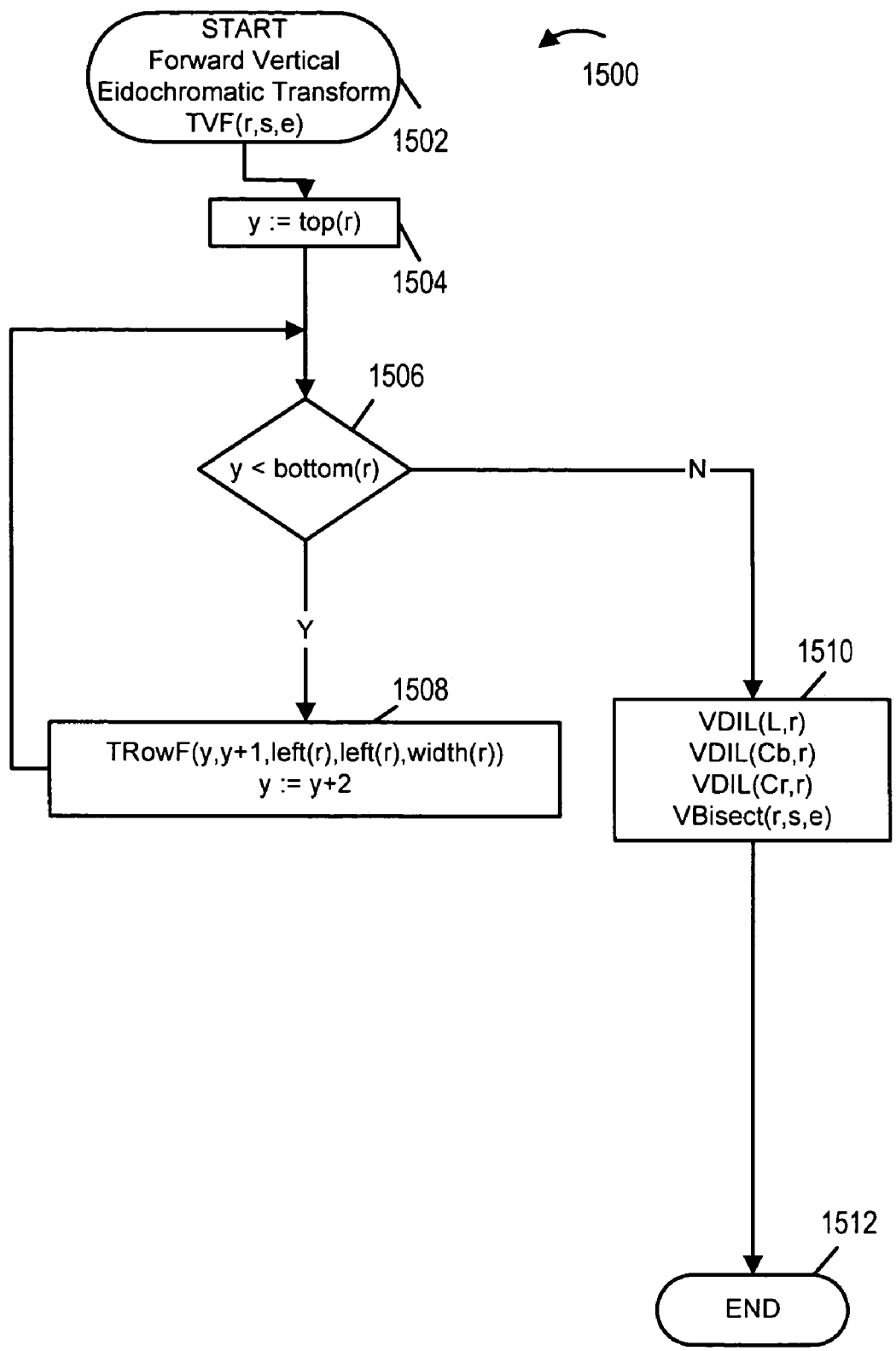
FIG. 15 illustrates a forward vertical eidochromatic transform TVF that operates on values exactly parallel to the values processed by subroutine THF, but with horizontal and vertical values interchanged.

The forward vertical eidochromatic transform routine (TVF) is an example of a routine which received an input block of coefficients which it splits into top and bottom equally sized blocks of coefficients (e.g., in the case of an even number of rows in the block) or nearly equal sized coefficients (e.g., in the case of an input block with an odd number of rows) with the S coefficients resulting from the transform being placed in the top block and the E transform coefficients being placed in the bottom block. The steps 1500 of an exemplary TVF routine are shown in FIG. 15.

Figure 16:
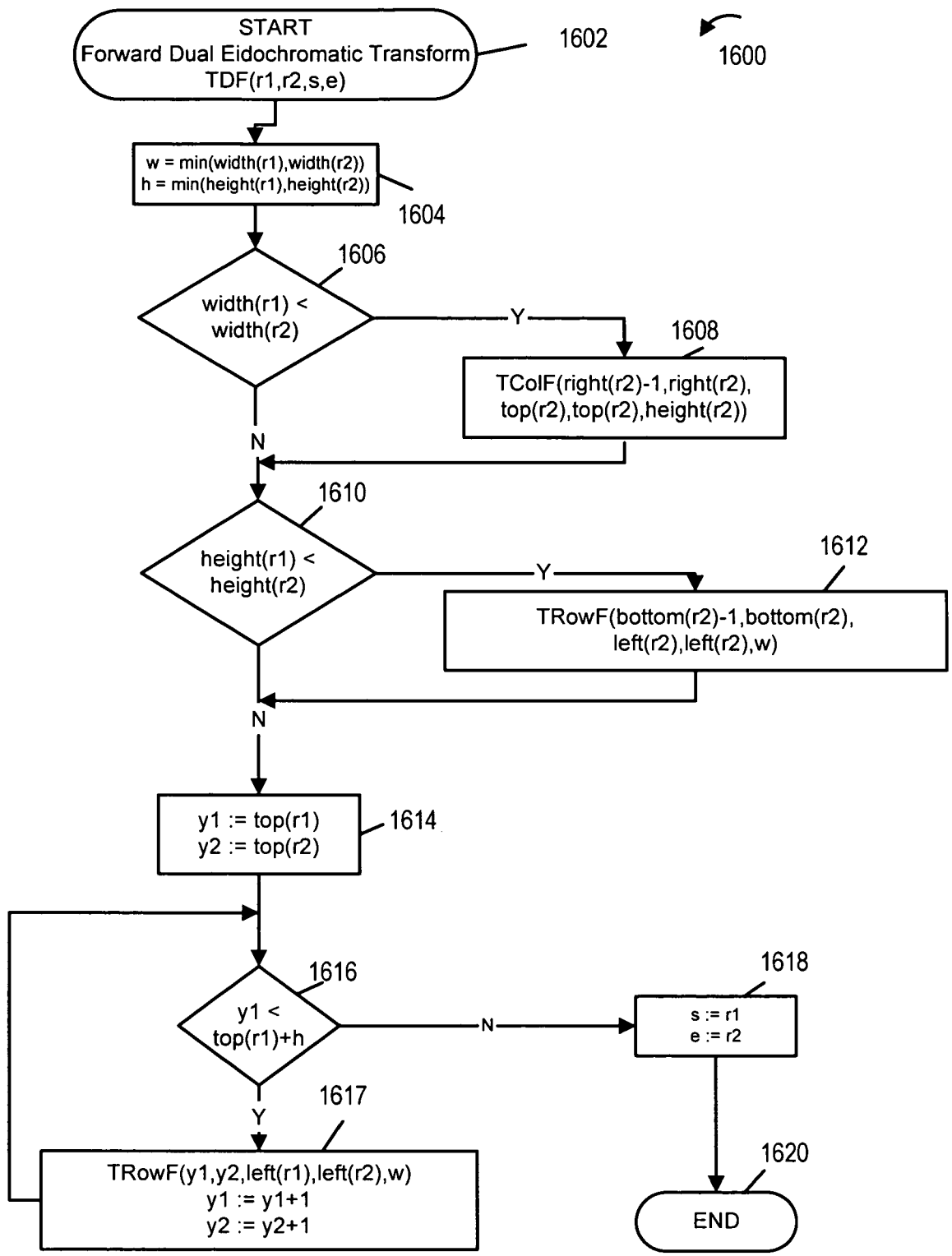
FIG. 16 illustrates a forward dual eidochromatic transform subroutine TDF implemented in accordance with one embodiment of the invention.

The forward dual eidochromatic transform (TDF) is an example of a routine which receives as inputs two blocks of coefficients, doesn't change the dimensions of the blocks and outputs the same size blocks but with the S coefficients having been placed in one of the output blocks and the E coefficients having been moved to the other one of the blocks. FIG. 16 illustrates an exemplary TDF routine.

Figure 43:
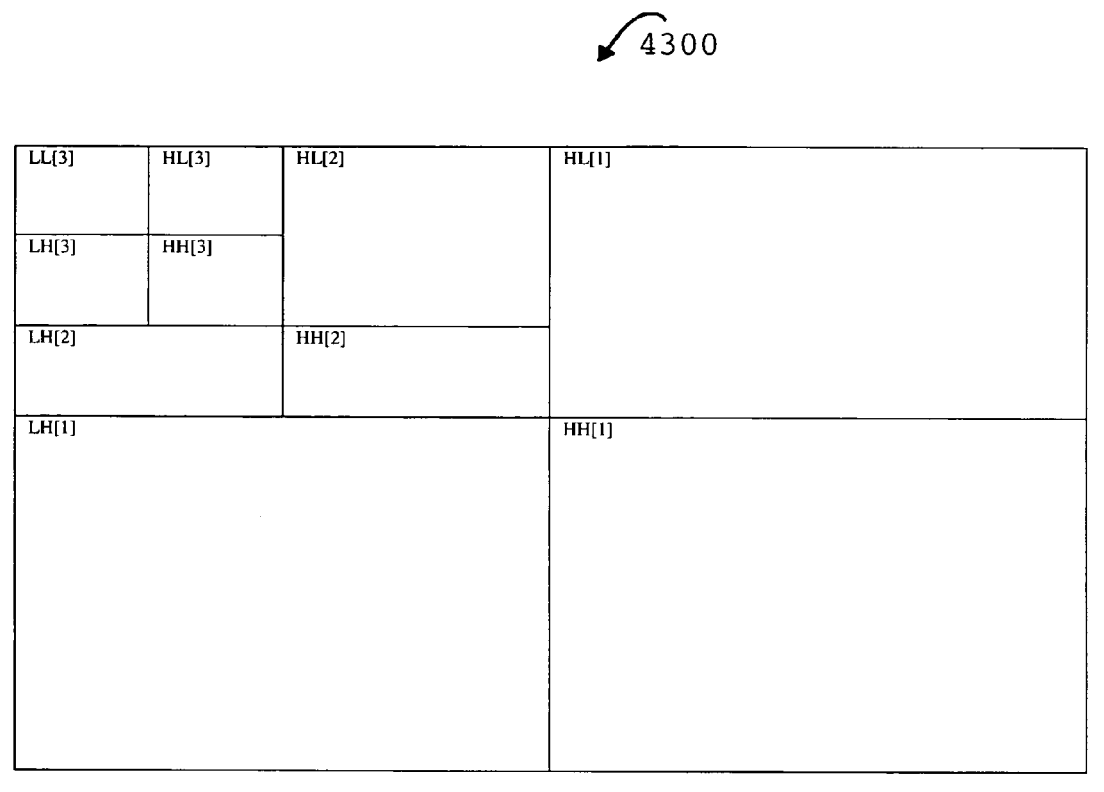

FIG. 17 shows an exemplary Forward Global Eidochromatic Transform (Standard merging sequence) routine implemented in accordance with the invention. This routine performs the eidochromatic transform on all coefficient locations of an entire image which has previously been wavelet-transformed. It is assumed for purposes of this example that a conventional wavelet transform applied in forward spatial transform step 514 or 520, for example, has created a standard wavelet sub-band structure including sub-bands HH[1], HL[1], LH[1], HH[2], HL[2], LH[2], HH[3], . . . , HH[N_L], HL[N_L], LH[N_L], LL[N_L], where N_L is the number of wavelet transform levels and where HH indicates application of high pass filtering in both the horizontal and vertical dimensions to create the coefficients, HL indicates application of high pass filtering in the horizontal and low pass filtering in the vertical dimensions to generate the coefficients, LH indicates low pass filtering in the horizontal and high pass filtering in the vertical dimensions to create the coefficients and LL indicates low pass filtering in both the horizontal and vertical dimensions to create the corresponding set of coefficients. FIG. 43 shows such a standard wavelet sub-band structure for N_L=3.

The routine 1700 starts in step 1702 where the blocks of coefficients to be processed, e.g., a block of luminance coefficients to be used for control purposes and two blocks of chrominance coefficients to be transformed are received. The blocks of coefficients may have the structure shown in FIG. 43 and as an example, may look like the exemplary contents of FIGS. 37, 38 and 39 which will be discussed below. From here operation proceeds to step 1704, which initializes the value of n to 1, n being a counter for a loop over all wavelet transform levels. Operation then proceeds to step 1706.

Step 1706 is the top of a loop over all wavelet transform levels. First the routine TDF (routine 1600) is applied to wavelet sub-bands HH[n] and LH[n], generating new eidochromatic sub-bands S[n] and E[n]. E[n] will not be modified further. Then the routine TDF is again applied to sub-bands S[n] and HL[n], generating new eidochromatic sub-bands S2[n] and SE[n]. SE[n] will not be modified further. Operation then proceeds to step 1708.

Step 1708 makes a decision whether the current wavelet level n exceeds 1. If the current wavelet level n exceeds 1, operation proceeds to step 1712. Otherwise operation proceeds to step 1710.

Step 1710 is executed only when the current wavelet level n equals 1. First the routine THF (routine 1100) is applied to the sub-band S2[1], generating new eidochromatic sub-bands S4[1] and S3E[1]. S3E[1] will not be modified further. Then the routine TVF (routine 1500) is applied to the sub-band S4[1], generating new eidochromatic sub-bands S5[1] and S4E[1]. S4E[1] will not be modified further Operation then proceeds to step 1713.

Step 1712 is executed only when the current wavelet value n exceeds 1. First the routine TDF (routine 1600) is applied to sub-bands S2[n] and S5[n-1] (created on the previous iteration of the loop), generating new eidochromatic sub-bands S3[n] and S2E[n-1]. S2E[n-1] will not be modified further. Then the routine THF (routine 1100) is applied to the sub-band S3[n], generating new eidochromatic sub-bands S4[n] and S3E[n]. S3E[n] will not be modified further. Then the routine TVF (routine 1500) is applied to the sub-band S4[n], generating new eidochromatic sub-bands S5[n] and S4E[n]. S4E[n] will not be modified further Operation then proceeds to step 1713.

Step 1713 increments the value of the loop counter n by 1 in preparation for the next trip through the loop. Operation then proceeds to step 1714.

Step 1714 compares the value of the current wavelet level n to the total number N_L of wavelet levels. If n does not exceed N_L, operation proceeds to the top 1706 of the loop. Otherwise operation proceeds to the end 1716 of the routine.

Figure 44:
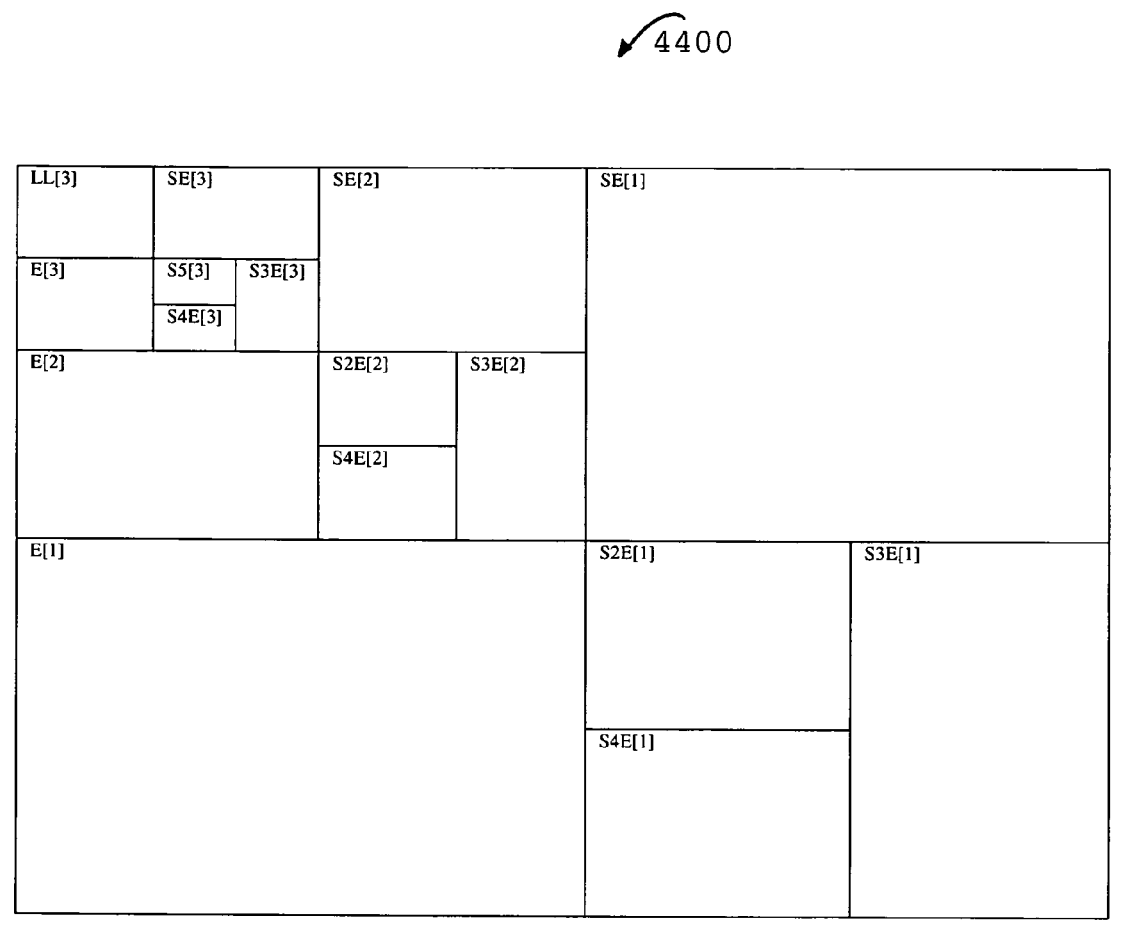

FIG. 44 shows the eidochromatic sub-band structure after application of the Forward Global Eidochromatic Transform (Standard merging sequence) to the wavelet sub-band structure shown in FIG. 43. The structure shown in FIG. 44 includes the same number of coefficients as present in the FIG. 43 structure but will normally require less data to represent than the FIG. 43 coefficient set in the case of chrominance coefficients as the result of the transform processing performed in accordance with the invention.

FIG. 18 shows an exemplary Forward Global Eidochromatic Transform (Scalable merging sequence) routine implemented in accordance with the invention. This routine is an alternative to routine 1700. This routine performs the eidochromatic transform on all coefficient locations of an entire image which has previously been wavelet-transformed-without, however, at any step combining coefficients at different wavelet levels and where HH, HL, LH and LL are as described with regard to FIG. 17. It is assumed that the wavelet transform has created a standard wavelet sub-band structure consisting of sub-bands HH[1], HL[1], LH[1], HH[2], HL[2], LH[2], HH[3], . . . , HH[N_L], HL[N_L], LH[N_L], LL[N_L], where N_L is the number of wavelet transform levels. FIG. 43 shows such a standard wavelet sub-band structure for N_L=3. An additional sequence of parameters kmax[1], kmax[2], . . . , kmax[N_L] specifies how many times the eidochromatic transform will be applied to each wavelet level. These numbers may be selected by a system operator or predetermined, e.g., pre-set for a particular encoder implementation.

The routine 1800 starts in step 1802. From here operation proceeds to step 1804, which initializes the value of n to 1, n being a counter for a loop over all wavelet transform levels. Operation then proceeds to step 1806.

Step 1806 applies the routine TDF (routine 1600) to sub-bands HH[n] and LH[n], generating new eidochromatic sub-bands S[n][1] and E[n][1]. E[n][1] will not be modified further. Then the routine TDF is again applied to sub-bands S[n][1] and HL[n], generating new eidochromatic sub-bands S[n][2] and E[n][2]. E[n][2] will not be modified further. Operation then proceeds to step 1808.

Step 1808 initializes the value of the loop counter k which counts the number of eidochromatic transform steps performed on the current wavelet resolution level. The value of k is set to three (two transform steps already having been performed on the current wavelet resolution level). Operation then proceeds to step 1810.

Step 1810 first applies the routine THF (routine 1100) to sub-band S[n] [k−1], generating new eidochromatic sub-bands S[n][k] and E[n][k]. E[n][k] will not be modified further. Then the routine TVF (routine 1500) is applied to sub-band S[n][k], generating new eidochromatic sub-bands S[n][k+1] and E[n][k+1]. E[n][k+1] will not be modified further. Operation then proceeds to step 1812.

Step 1812 compares the value of the loop counter k to the parameter kmax[n]. If the value of k does not exceed kmax[n], then operation proceeds back to the body 1810 of the loop. Otherwise the loop is exited and operation proceeds to step 1814.

Step 1814 increments the value of the current wavelet level n by 1. Operation then proceeds to step 1816.

Step 1816 compares the value of the current wavelet level n to the total number N_L of wavelet levels. If the value of n does not exceed N_L, then operation proceeds back to the top 1806 of the wavelet-level loop. Otherwise the loop is exited and operation proceeds to the end 1818 of the routine.

Figure 45:
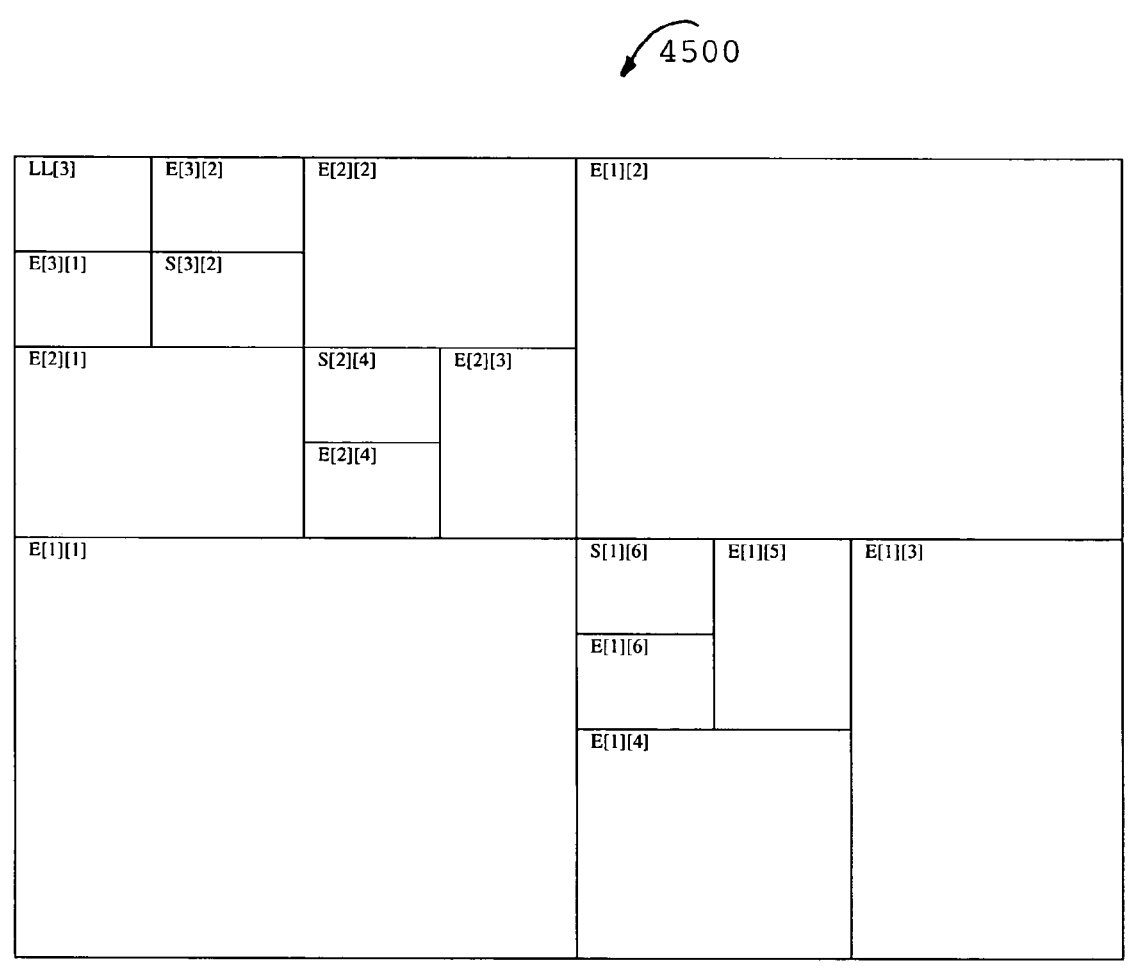

FIG. 45 shows the eidochromatic sub-band structure after application of the Global Eidochromatic Transform (Scalable merging sequence), with kmax[1]=6, kmax[2]=4, and kmax[3]=2 to the wavelet sub-band structure shown in FIG. 43. Note that the number of coefficients in FIG. 45 is the same as in FIG. 43 but with the coefficients in FIG. 45 being the result of applying the transform of the present invention to the coefficients of FIG. 43.

Having described the high level, e.g., global, routines used in various embodiments, various mid-level routines TDF, THF and TVF which are called by either of the exemplary global routines 1700 or 1800 will be described. The description of these routines will be followed by a description of intermediate routines and the lowest level routine (TF) which is responsible for applying the novel transform of the present invention to chrominance coefficients under control of one or more corresponding luminance coefficients.

FIG. 16 shows the steps 1600 of an exemplary Forward Dual Eidochromatic Transform operation (TDF) routine implemented in accordance with the invention. This routine performs the eidochromatic transform on pairs of coefficient locations at corresponding positions within two input rectangles r1 and r2, generating S-values and E-values in output rectangles s and e, respectively. Rectangles r1 and r2 are allowed to differ in width or height by at most 1, e.g., in the case of an odd number of rows or columns to be processed. This routine is called by the Forward Global Eidochromatic Transform (routine 1700 or 1800).

The routine 1600 starts in step 1602. From here operation proceeds to step 1604, wherein the variables w and h are initialized to the minimum width and height, respectively, of the two input rectangles. Operation then proceeds to step 1606.

Step 1606 compares the widths of the two input rectangles, as special handling is required in the case where rectangle r2 exceeds rectangle r1 in width. If the width of rectangle r2 does exceed that of rectangle r1, operation proceeds to step 1608; otherwise operation proceeds to step 1610.

Step 1608 is executed only in the case where rectangle r2 exceeds rectangle r1 in width. In this step the rightmost column of rectangle r2 is "folded in" to the next rightmost column by calling TColF with these two columns. Operation then proceeds to step 1610.

Step 1610 compares the heights of the two input rectangles, as special handling is required in the case where rectangle r2 exceeds rectangle r1 in height. If the height of rectangle r2 does exceed that of rectangle r1, operation proceeds to step 1612; otherwise operation proceeds to step 1614.

Step 1612 is executed only in the case where rectangle r2 exceeds rectangle r1 in height. In this step the bottommost row of rectangle r2 is "folded in" to the next bottommost row by calling TRowF with these two rows. Operation then proceeds to step 1614.

Step 1614 is the top of a loop over rows of rectangles r1 and r2. This loop is executed h times (the smaller of the height of r1 and r2). Either r1 or r2 (but not both) may contain 1 additional row. Any additional row of r2 was handled in step 1612. An additional row of r1 can be ignored. The loop is initialized by setting y1 and y2 to the top row positions of rectangles r1 and r2, respectively. Operation then proceeds to step 1616.

Step 1616 tests whether y1 is less than h plus the top row position of rectangle r1. If y1 is less than h plus the top row position of rectangle r1, then operation proceeds to the body 1617 of the loop. Otherwise the loop is exited and operation proceeds to step 1618.

In Step 1617, the routine TRowF is used to transform a row at position y1 of rectangle r1 and a row at position y2 of rectangle r2. The row positions y1 and y2 are then each incremented by 1. Operation then proceeds to step 1616.

In Step 1618, the output rectangles s and e are defined by setting s equal to the input rectangle r1 and e equal to the input rectangle r2. Operation then proceeds to the end 1620 of the routine.

FIG. 42 shows the results of TDF routine applied to the exemplary matrices of L, Cb, and Cr coefficients from FIG. 37 on subrectangles r1 consisting of rows 1-4 and columns 1-2 and r2 consisting of rows 3-5 and columns 3-5. Bold is used to indicate transformed values generated by the application of the TDF routine.

FIG. 11 shows an exemplary Forward Horizontal Eidochromatic Transform operation (THF) routine implemented in accordance with the invention. This routine performs the eidochromatic transform on all horizontal pairs of coefficient locations within an input rectangle r, generating S-values and E-values in horizontally adjacent output rectangles s and e, respectively. This routine is called by the Forward Global Eidochromatic Transform (routine 1700 or 1800).

The routine 1100 starts in step 1102. From here operation proceeds to step 1104, wherein the value of the column index x is initialized to the left edge value of the rectangle r. Operation then proceeds to the beginning 1106 of a loop over columns.

In step 1106, the value of x is compared to the right edge position right(r) of the rectangle r. If x is less than right(r), then operation proceeds to the body 1108 of the loop. Otherwise operation proceeds to step 1110.

In step 1108, the Forward Column Eidochromatic Transform TColF is applied to the pair of columns running from the top to bottom of the rectangle r at positions x and x+1. The value of the column index is then incremented by 2 to access the next pair of columns. Operation then proceeds to the top 1106 of the loop.

In step 1110, the coefficients within the subrectangle r of the L, Cb, and Cr screens are horizontally de-interlaced by calling the routine HDIL. The subrectangles s and e are then defined by calling the routine HB isect. Operation then proceeds to the end 1112 of the routine.

FIG. 41 shows the results of the THF procedure applied to the exemplary matrices of coefficients from FIG. 37, for a subrectangle r with top(r)=1, bottom(r)=4, left(r)=1, and right(r)=5. Bold is used to show the values resulting from the processing.

FIG. 15 shows an exemplary Forward Vertical Eidochromatic Transform operation (TVF) routine 1500 implemented in accordance with the invention. This routine is called by the Forward Global Eidochromatic Transform (routine 1700 or 1800). The TVF routine 1500 performs the eidochromatic transform on vertical pairs of coefficient locations within an input rectangle r, generating S-values and E-values in vertically adjacent output rectangles s and e, respectively.

The TVF routine is similar to the THF routine (routine 1100), but with the roles of horizontal and vertical being interchanged. The TVF routine 1500 starts in step 1502. From here operation proceeds to step 1504, wherein the value of the row index y is initialized to the top edge value of the rectangle r. Operation then proceeds to the beginning 1506 of a loop over rows.

In step 1506, the value of y is compared to the bottom edge position bottom(r) of the rectangle r. If y is less than bottom(r), then operation proceeds to the body 1508 of the loop. Otherwise operation proceeds to step 1510.

In step 1508, the Forward Row Eidochromatic Transform TRowF is applied to the pair of rows running from the left to right of the rectangle r at positions y and y+1. The value of the row index is then incremented by 2 to access the next pair of rows. Operation then proceeds to the top 1506 of the loop.

In step 1510, the coefficients within the subrectangle r of the L, Cb, and Cr screens are vertically de-interlaced by calling the routine VDIL. The subrectangles s and e are then defined by calling the routine VBisect. Operation then proceeds to the end 1512 of the routine.

The various mid-level routines, TDF, THF and TVF routines rely on still lower routines, intermediate routines and the lowest level routine TF. These various lower level routines will now be described beginning with the lowest level routine TF.

Figure 7:
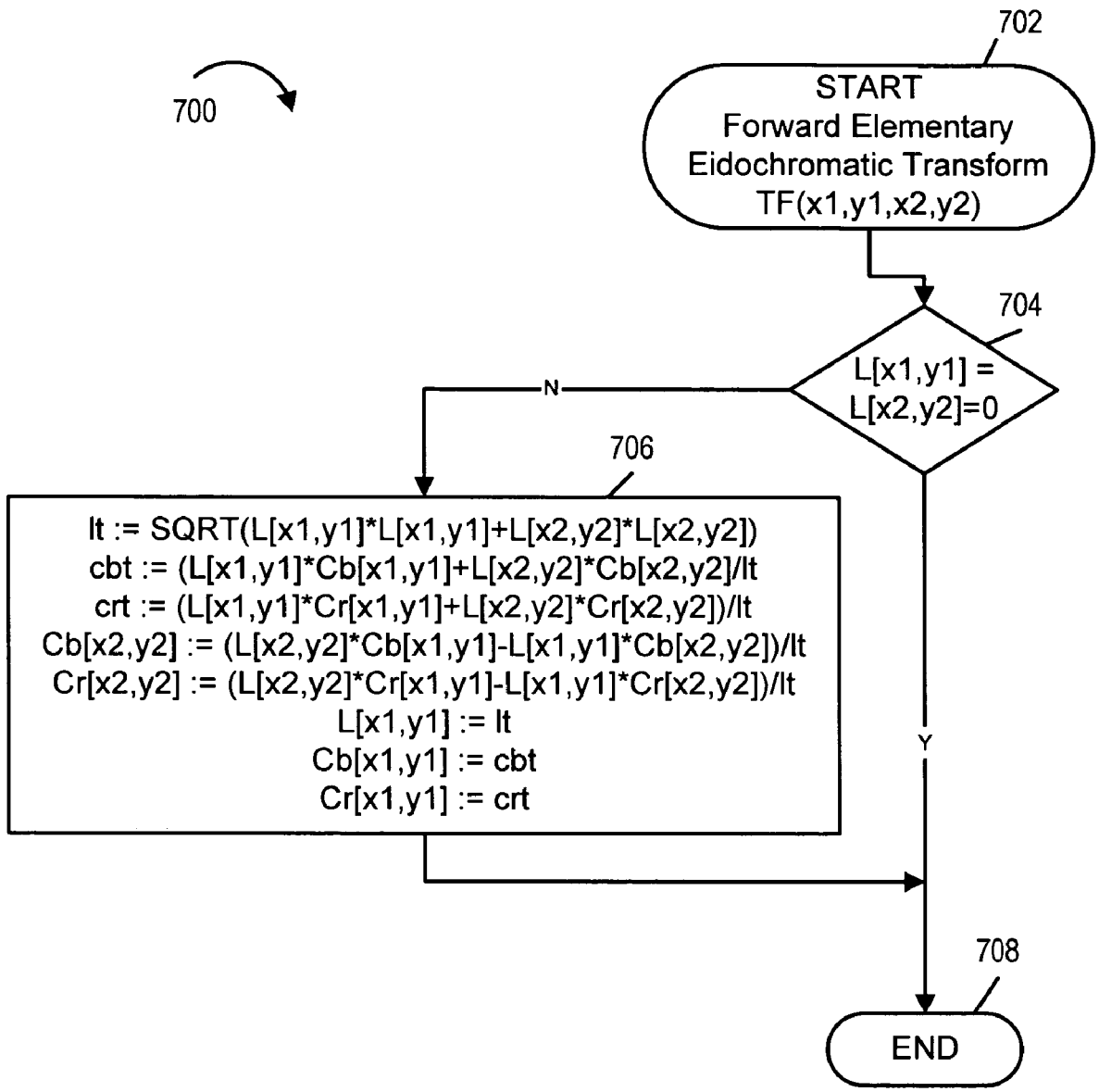
FIG. 7 illustrates the steps of a forward elementary eidochromatic transform subroutine TF implemented in accordance with the present invention which can be used to implement the eidochromatic transform step of the exemplary method shown in FIG. 5.

FIG. 7 shows the steps of an exemplary Forward Elementary Eidochromatic Transform (TF) implemented in accordance with one exemplary embodiment of the invention. This routine 700 is responsible for applying the novel eidochromatic transform of the present invention in this particular exemplary implementation to two chrominance coefficients corresponding to a first coefficient location and two chrominance coefficients corresponding to a second coefficient location to produce transformed chrominance coefficient values as a function of the luminance coefficient values corresponding to the first and second locations. The transformed number of chrominance coefficients generated by this routine is the same as the number of chrominance coefficients which are input to the routine for processing, i.e., the number of input chrominance coefficients equals the number of output coefficients. This routine interrelates wavelet coefficients at a single pair of locations and is called by TColF (routine 800) and TRowF (routine 1200). Here L, Cb, and Cr represent the two-dimensional matrices of all coefficients for the L, Cb, and Cr components, respectively. (x1,y1) and (x2,y2) are two locations within the coefficient matrix which will be interrelated.

Exemplary L, Cb, Cr coefficient matrices 3702, 3704, 3706 which can provide coefficients to be subject to transform processing are illustrated in FIG. 37. The two coefficient locations which provide coefficients to be processed might be, for example, (x1, y1)=(1,2) (with L[1,2]=50.000, Cb[1,2]=26.000, and Cr[1,2]=17.000) and (x2,y2)=(2,2) (with L[2,2]=60.000, Cb[2,2]=31.000, and Cr[2,2]=20.000).

The TF routine 700 starts in step 702 with the coefficients to be processed being received. From start step 702, where the routine begins being executed, operation proceeds to step 704 wherein the values of the L matrix at both locations (x1,y1) and (x2,y2) are compared to 0. If either value is nonzero (such as both L[1,2] and L[2,2] are nonzero in our example), operation proceeds to step 706; if both are zero, operation proceeds to the end 708 of the routine.

Step 706 performs a core forward eidochromatic calculation. First a transformed control luminance "S" value It is calculated from the values of L at locations (x1,y1) and (x2,y2) according to the formula It:=SQRT(L[x1,y1]*L[x1,y1]+L[x2,y2]*L[x2,y2]) (for example It:=SQRT(50.000*50.000+60.000*60.000)=78.102). Then transformed Cr and Cb "S" values are calculated from the values of Cr and Cb at locations (x1,y1) and (x2,y2) (controlled by the values of L at locations (x1,y1) and (x2,y2)) according to the formulae cbt:=(L[x1,y1]*Cb[x1,y1]+L[x2,y2]*Cb[x2,y2])/It and crt:=(L[x1,y1]*Cr[x1,y1]+L[x2,y2]*Cr[x2,y2])/It (for example, cbt:=(50.000*26.000+60.000*31.000)/78.102=40.460 and crt:=(50.000*17.000+60.000*20.000)/78.102=26.248). Then transformed Cr and Cb "E" values are calculated from the values of Cr and Cb at locations (x1,y1) and (x2,y2) (controlled by the values of L at locations (x1,y1) and (x2,y2)) and stored in location (x2,y2) according to the formulae Cb[x2,y2]:=(L[x2,y2]*Cb[x1,y1]−L[x1,y1]*Cb[x2,y2](L[x2,y2]*Cr[x1,y1]−L[x1,y1]*Cr[x2,y2])/It (for example, Cb[2,2]:=(60.000*26.000−50.000*31.000)/78.102=0.128 and Cr[2,2]:=(60.000*20.000−50.000*17.000)/78.102=0.256). Finally the transformed "S" values are stored in location (x1,y1): L[x1,y1]:=It, Cb[x1,y1]:= cbt, and Cr[x1,y1]:=crt (for example, L[1,2]:=78.102, Cb[1,2]:=40.460 and Cr[1,2]:=26.248). Operation then proceeds to the end 708 of the routine.

FIG. 38 shows the results of the routine TF applied to locations (1,2) and (2,2) of the exemplary coefficient matrices in FIG. 37.

The TF routine 700 is the lowest level routine. It can be called by any one of a variety of intermediate level routines which are, in turn, called by the previously discussed mid-level routines TDF, THF, TVF.

Figure 8:
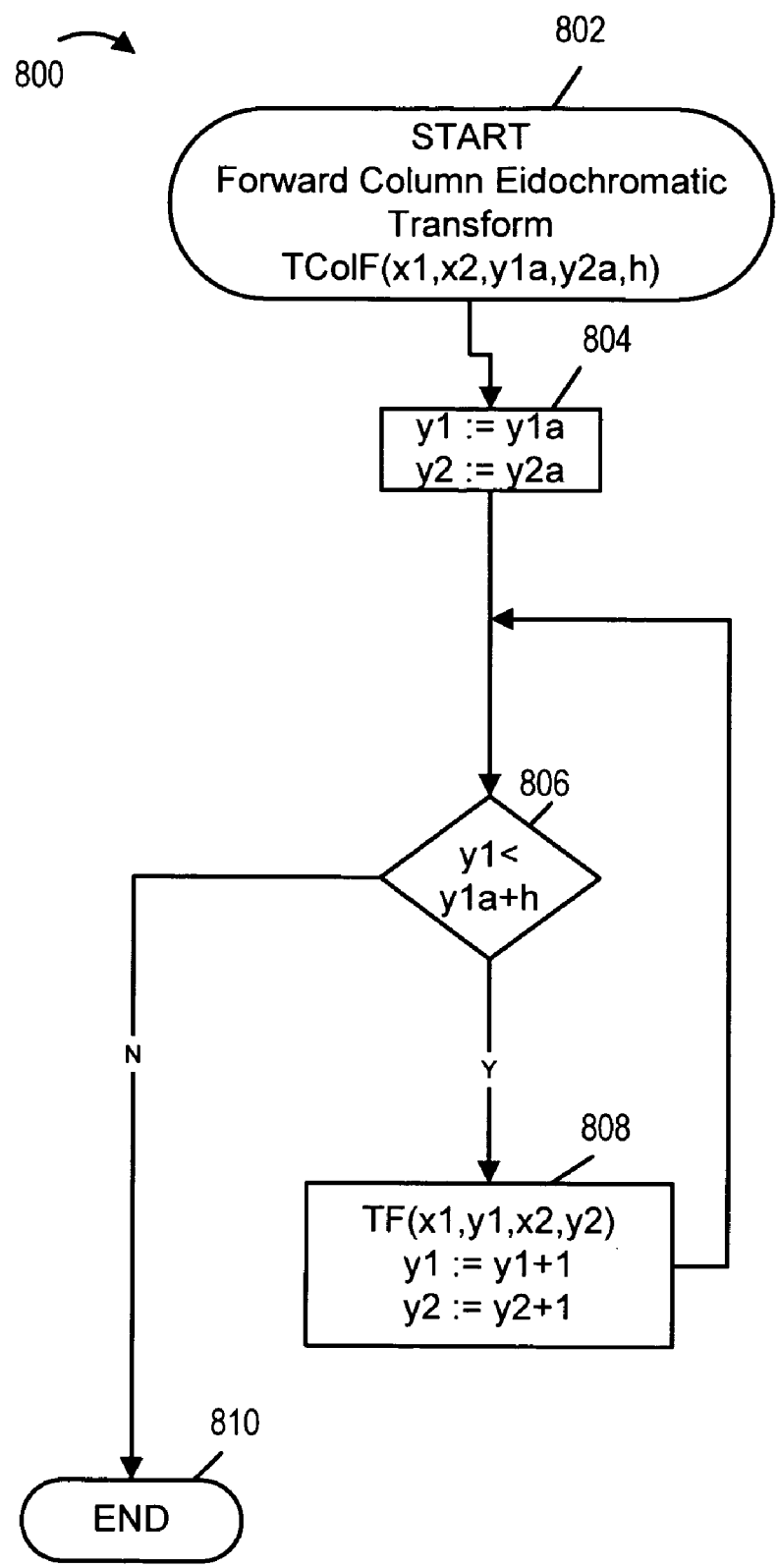
FIG. 8 illustrates the steps of a subroutine TColF for performing a forward transform of the type shown in FIG. 7, in accordance with the invention, on two columns of coefficients of equal height corresponding to a portion of an image.

An example of an intermediate routine which may call the lowest level routine TF, is the Forward Column Eidochromatic Transform (TColF) routine. FIG. 8 shows an exemplary Forward Column Eidochromatic Transform (TColF) routine implemented in accordance with the invention. This routine applies the Forward Elementary Eidochromatic Transform (TF) to pairs of locations taken from two identical-height columns within the matrix of wavelet coefficients, and is called by THF (routine 1100). Here (x1,y1a) and (x2,y2a) are the starting positions of the two columns and h is the column height. For example, using the exemplary coefficient matrices of FIG. 37, if x1=1, x2=2, y1a=y2a=1, and h=5, then the first and second columns of each matrix will be transformed down to the fifth entry in each (first column containing L-values 0.000, 50.000, 100.000, 150.000, 200.000; Cb-values 1.000, 26.000, 51.000, 76.000, 101.000; and Cr-values 0.000, 17.000, 33.000, 50.000, 67.000; second column containing L-values 10.000, 60.000, 110.000, 160.000, 210.000; Cb-values 6.000, 31.000, 56.000, 81.000, 106.000; and Cr-values 3.000, 20.000, 37.000, 53.000, 70.000).

The routine 800 starts in step 802. From start step 802, where the routine begins execution, operation proceeds to step 804, wherein the indices y1 and y2 are set to the top positions y1a and y2a of the two columns to be processed (for example 1 and 1).

From step 804, operation proceeds to step 806, which is the top of a loop over the positions within the specified columns of the exemplary matrix In step 806, the value of y1 is compared to y1a+h (for example, 7). If the value of y1 is less than that of y1a+h, operation proceeds to the body 808 of the loop. Otherwise, operation proceeds to the end 810 of the routine.

In step 808, the Forward Elementary Eidochromatic Transform TF is applied to locations (x1,y1) and (x2,y2). The values of y1 and y2 are then incremented by 1 and operation proceeds to the top step 806 of the loop (in our example, this loop is executed five times).

FIG. 39 shows the results of the TColF procedure applied to the exemplary matrices of coefficients from FIG. 37, with x1=1, x2=2, y1a=y2a=1, and h=5 with bold being used to indicate transformed values resulting from application of the TColF routine 800.

Figure 9:
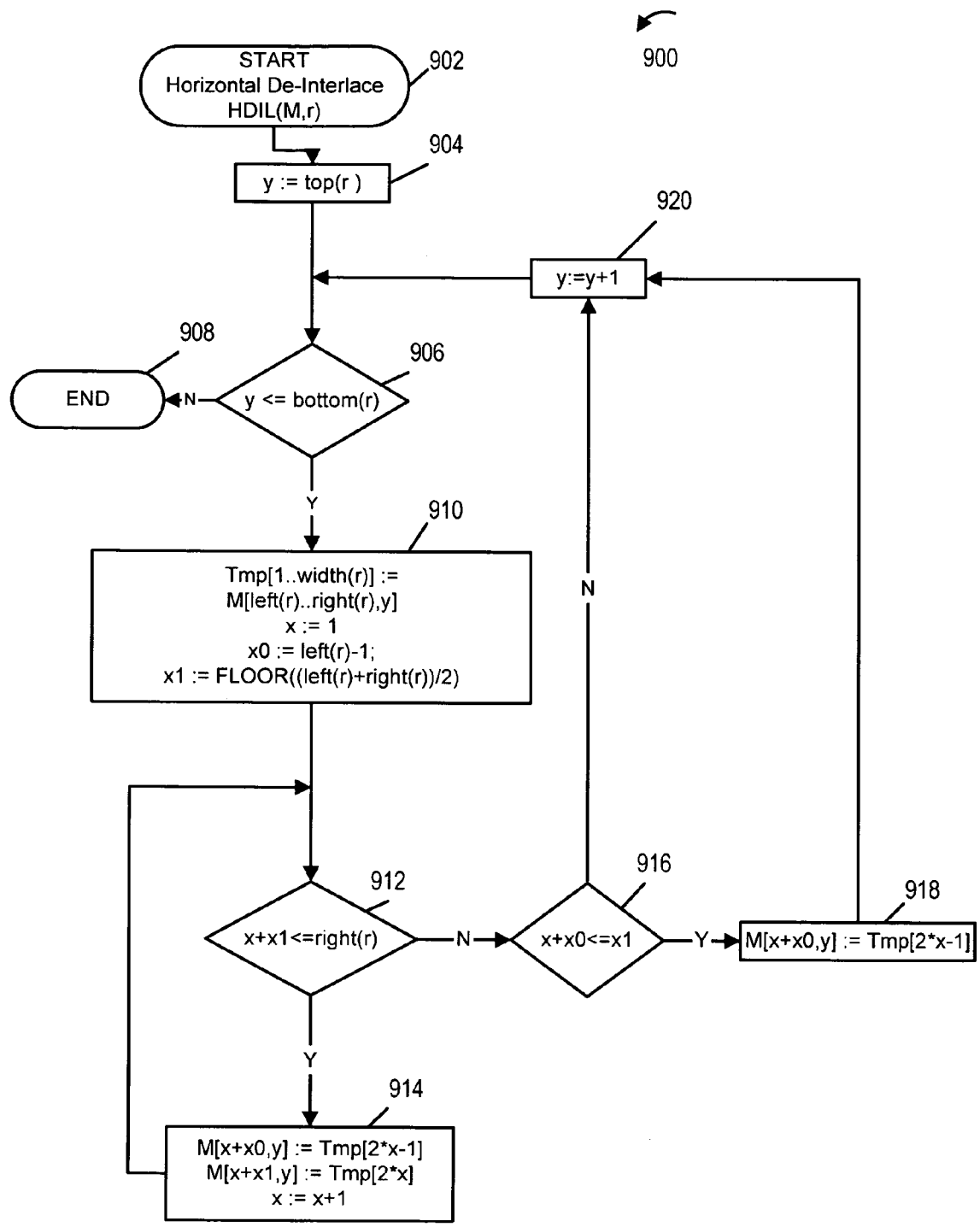
FIG. 9 illustrates an exemplary horizontal de-interlace subroutine HDIL which is used to rearrange coefficients within a rectangle of coefficients for processing purposes.

FIG. 9 shows an exemplary Horizontal De-Interlace operation (HDIL) routine implemented in accordance with the invention which is another intermediate level routine. This routine rearranges the coefficient values of a rectangle of coefficients by moving the left member of each horizontal pair to the left half of the rectangle and the right member of each horizontal pair to the right half of the rectangle. This routine is called by THF (routine 1100). Here M is a two-dimensional matrix of coefficients, r is a rectangle defined within M, and Tmp is a temporary working buffer large enough to hold a single row of M.

The routine 900 starts in step 902. From start step 902, operation proceeds to step 904, wherein the index value y is initialized to the top position of the rectangle r. Operation then proceeds to step 906.

Step 906 is the top of a loop over all rows of the rectangle r. In step 906, the index value y is compared to the bottom position of the rectangle r. If the value of y does not exceed the bottom position of r, operation proceeds to the body 910 of the loop. Otherwise, operation proceeds to the end 908 of the routine.

In step 910, the row in position y of the subrectangle r of the matrix M is copied to the working buffer Tmp. Then the values of the indices x, x0, and x1 are initialized as follows. x is initialized to 1, x0 is initialized to one less than the left edge position of the rectangle r, and x1 is initialized to FLOOR((left(r)+right(r))/2) (roughly the center position of the rectangle r). Operation then proceeds to step 912.

Step 912 is the top of a loop over pairs of coefficients within the working buffer Tmp. In step 912, the value of x+x1 is compared to the right edge position of the rectangle r. If x+x1 does not exceed the right edge position of r, then operation proceeds to the body 914 of the loop. Otherwise operation proceeds to step 916.

Step 914 de-interlaces a single pair of coefficients, moving them from the working buffer Tmp to the matrix M. The coefficient at location 2*x−1 of Tmp is moved to location (x+x0,y) of M (in the left half of the rectangle r) and the coefficient at location 2*x is moved to location (x+x1,y) of M (in the right half of the rectangle r). Operation then proceeds to the loop test 912.

Step 916 compares the value of x+x0 to x1 . If the value of x+x0 exceeds x1 (which occurs if and only if the original rectangle r contains an odd number of columns), then operation proceeds to step 918. Otherwise operation proceeds to step 920.

Step 918 is executed in the case where the original rectangle contains an odd number of columns. In this case a lone element remains in the working buffer after all horizontal pairs have been distributed to the left and right halves of the rectangle r. Step 918 moves this lone remaining element to position (x+x0,y) of M (on the borderline between the left and right halves of r). Operation then proceeds to step 920.

Step 920 increments the row counter y by 1 prior to the next passage through the row loop. Operation then proceeds to step 906.

FIG. 40 shows the results of the HDIL procedure applied to the exemplary matrix of L coefficients from FIG. 37, with rectangle r describing the entire matrix: top(r)=1, bottom(r)=6, left(r)=1, right(r)=5. Note that the routine re-arranges but does not alter the coefficient values.

Figure 10:
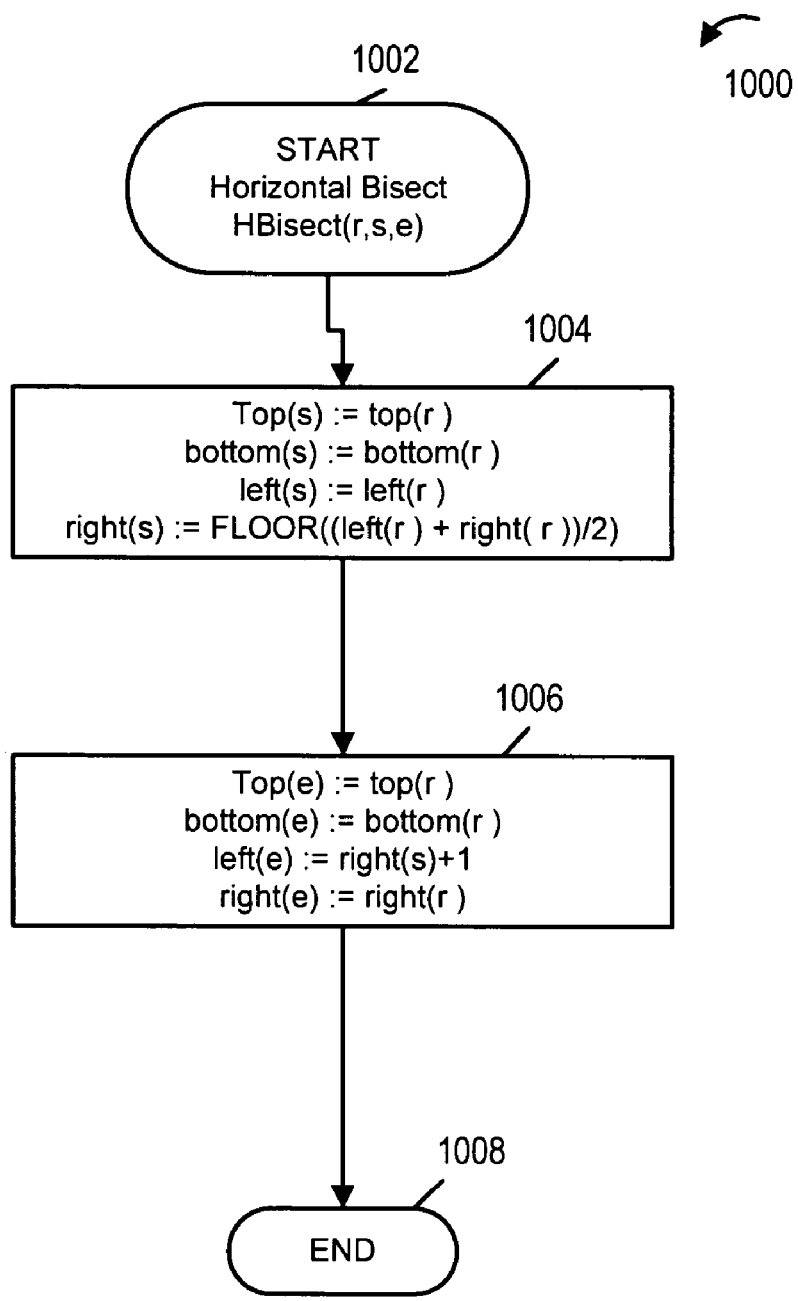
FIG. 10 illustrates an exemplary horizontal bisect subroutine HBisect which creates two new rectangles s and e by horizontally splitting a rectangle r into half, or nearly half, so that in the case where r has an odd number of columns, s is given one column more than e.

FIG. 10 shows an exemplary Horizontal Bisect operation (HBisect) routine implemented in accordance with the invention. This routine takes as input a rectangle r and creates two new rectangles s and e such that s describes the left half of r and e describes the right half of r. This routine is called by THF (routine 1100). In the case where r contains an odd number of columns, the additional column is allocated to the left subrectangle s.

The routine 1000 starts in step 1002. Operation then proceeds to step 1004, which sets the boundaries of the left subrectangle s, according to the formulae: top(s)=top(r), bottom(s)=bottom(r), left(s)=left(r), and right(s)=FLOOR ((left(r)+right(r))/2). Operation then proceeds to step 1006.

Step 1006 sets the boundaries of the right subrectangle e, according to the formulae: top(e)=top(r), bottom(e)=bottom (r), left(e)=right(s)+1, and right(e)=right(r). Operation then proceeds to the end 1008 of the routine.

For example, HBisect applied to the rectangle r with boundaries top(r)=2, bottom(r)=5, left(r)=1, and right(r)=5 yields a left rectangle s with boundaries top(s)=2, bottom(s)=5, left(s)=1, and right(s)=3; and a right subrectangle e with boundaries top(e)=2, bottom(e)=5, left(e)=4, and right(e)=5.

Figure 12:
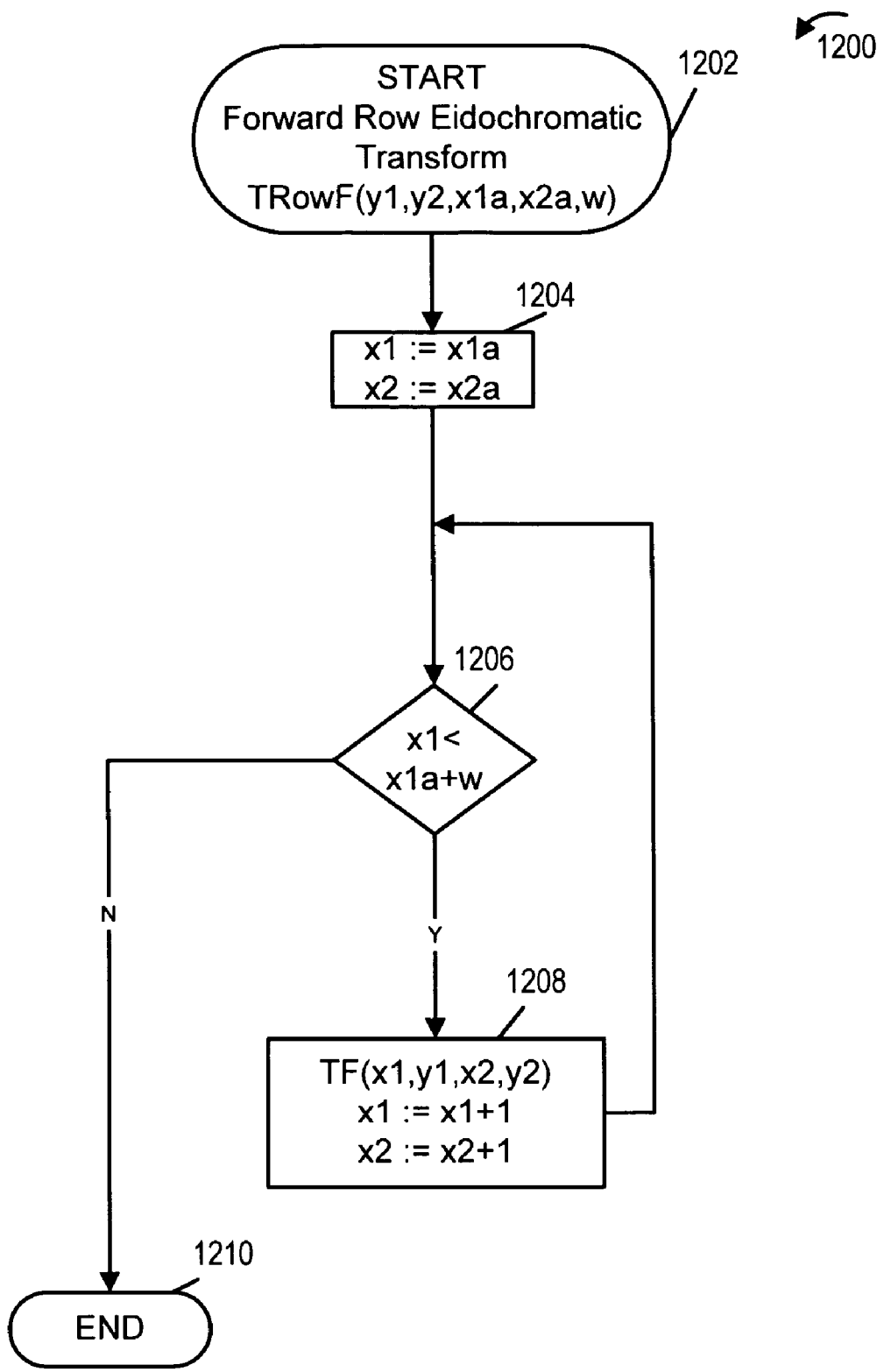
FIG. 12 illustrates a forward row eidochromatic transform subroutine TRowF that operates exactly parallel to TColF, but with horizontal and vertical interchanged.

FIG. 12 shows an exemplary Forward Row Eidochromatic Transform (TRowF) routine implemented in accordance with the invention. This routine applies the Forward Elementary Eidochromatic Transform to pairs of locations taken from two identical-width rows within the matrix of wavelet coefficients, and is called by TVF (routine 1500) and TDF (routine 1600). Here (x1a,y1) and (x2a,y2) are the starting positions of the two rows and w is the column width.

The TRowF routine is in all respects parallel to the TColF routine (routine 800), except for interchanging the roles of horizontal and vertical.

The routine 1200 starts in step 1202. From start step 1202, where the routine begins execution, operation proceeds to step 1204, wherein the indices x1 and x2 are set to the left positions x1a and x2 a of the two rows.

From step 1204, operation proceeds to step 1206, which is the top of a loop over the row positions. In step 1206, the value of x1 is compared to x1a+w. If the value of x1 is less than that of x1a+w, operation proceeds to the body 1208 of the loop. Otherwise, operation proceeds to the end 1210 of the routine.

In step 1208, the Forward Elementary Eidochromatic Transform TF is applied to locations (x1,y1) and (x2,y2). The values of x1 and x2 are then incremented by 1 and operation proceeds to the top step 1206 of the loop.

Figure 13:
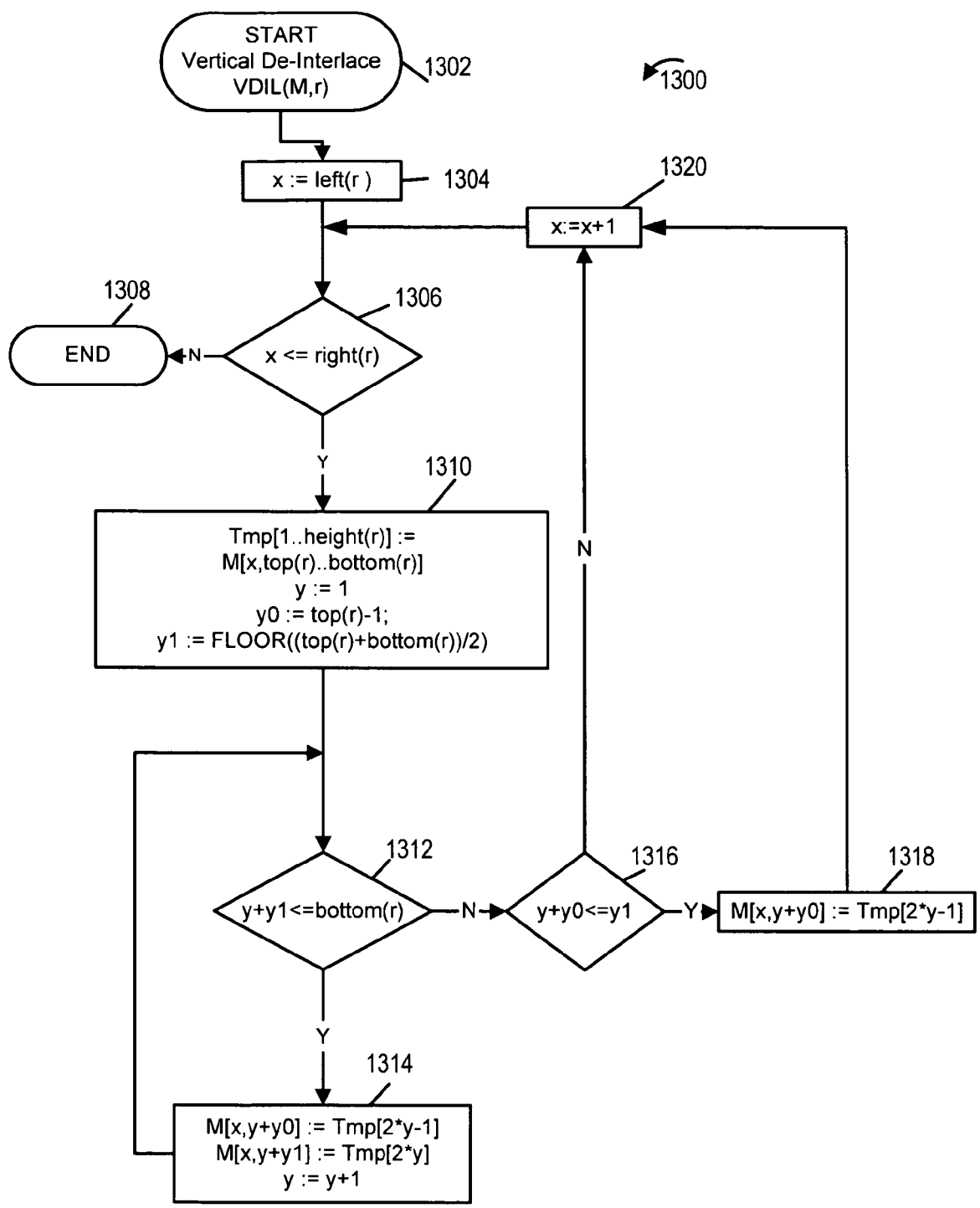
FIG. 13 illustrates a vertical de-interlace subroutine VDIL that operates on values exactly parallel to those processed by the subroutine HDIL, but with horizontal and vertical values interchanged.

FIG. 13 shows an exemplary Vertical De-Interlace operation (VDIL) routine implemented in accordance with the invention. This routine rearranges the coefficient values of a rectangle of coefficients by moving the top member of each vertical pair to the top half of the rectangle and the bottom member of each vertical pair to the bottom half of the rectangle. This routine is called by TVF (routine 1500). Here M is a two-dimensional matrix of coefficients, r is a rectangle defined within M, and Tmp is a temporary working buffer large enough to hold a single column of M.

The VDIL routine is similar to the HDIL routine (routine 900), except for interchanging the roles of horizontal and vertical.

The routine 1300 starts in step 1302. From start step 1302, operation proceeds to step 1304, wherein the index value x is initialized to the left position of the rectangle r. Operation then proceeds to step 1306.

Step 1306 is the top of a loop over all columns of the rectangle r. In step 1306, the index value x is compared to the right position of the rectangle r. If the value of x does not exceed the right position of r, operation proceeds to the body 1310 of the loop. Otherwise, operation proceeds to the end 1308 of the routine.

In step 1310, the column in position x of the subrectangle r of the matrix M is copied to the working buffer Tmp. Then the values of the indices y, y0, and y1 are initialized as follows. y is initialized to 1, y0 is initialized to one less than the top edge position of the rectangle r, and y1 is initialized to FLOOR((top(r)+bottom(r))/2) (roughly the center position of the rectangle r). Operation then proceeds to step 1312.

Step 1312 is the top of a loop over pairs of coefficients within the working buffer Tmp. In step 1312, the value of y+y1 is compared to the bottom edge position of the rectangle r. If y+y1 does not exceed the bottom edge position of r, then operation proceeds to the body 1312 of the loop. Otherwise operation proceeds to step 1316.

Step 1314 de-interlaces a single pair of coefficients, moving them from the working buffer Tmp to the matrix M. The coefficient at location 2*y−1 of Tmp is moved to location (x,y+y0) of M (in the top half of the rectangle r) and the coefficient at location 2*y is moved to location (x,y+y1) of M (in the bottom half of the rectangle r). Operation then proceeds to the loop test 1312.

Step 1316 compares the value of y+y0 to y1. If the value of y+y0 exceeds y1 (which occurs if and only if the original rectangle r contains an odd number of rows), then operation proceeds to step 1318. Otherwise operation proceeds to step 1320.

Step 1318 is executed only in the case where the original rectangle contains an odd number of rows. In this case a lone element remains in the working buffer after all vertical pairs have been distributed to the top and bottom halves of the rectangle r. Step 1318 moves this lone remaining element to position (x,y+y0) of M (on the borderline between the top and bottom halves of r). Operation then proceeds to step 1320.

Step 1320 increments the column counter prior to the next passage through the column loop. Operation then proceeds to step 1306.

Figure 14:
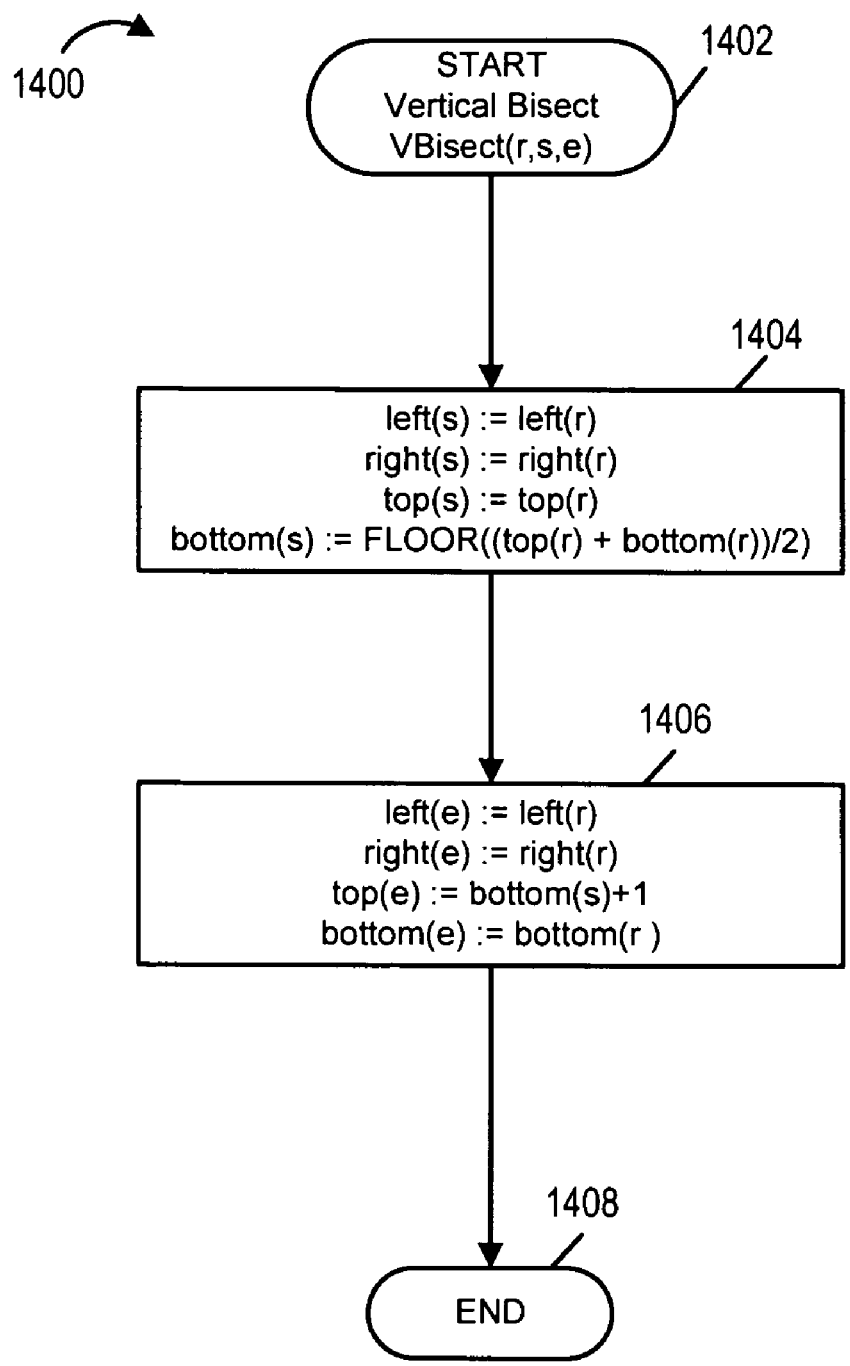
FIG. 14 illustrates a vertical Bisect subroutine VBisect that operates located exactly parallel to the values processed by the subroutine Hbisect, but with horizontal and vertical values being interchanged.

FIG. 14 shows an exemplary Vertical Bisect operation (VBisect) routine implemented in accordance with the invention. This routine takes as input a rectangle r and creates two new rectangles s and e such that s describes the top half of r and e describes the bottom half of r. This routine is called by TVF (routine 1500). In the case where r contains an odd number of rows, the additional column is allocated to the top subrectangle s.

The VBisect routine is in all respects parallel to the HBisect routine (routine 1000), except for interchanging the roles of horizontal and vertical.

The routine 1400 starts in step 1402. Operation then proceeds to step 1404, which sets the boundaries of the top subrectangle s, according to the formulae: top(s)=top(r), right(s)=right(r), left(s)=left(r), and bottom(s)=FLOOR((top(r)+bottom(r))/2). Operation then proceeds to step 1406.

Step 1406 sets the boundaries of the right subrectangle e, according to the formulae: top(e)=bottom(s)+1, bottom(e)=bottom(r), left(e)=left(r), and right(e)=right(r). Operation then proceeds to the end 1408 of the routine.

Figure 35:
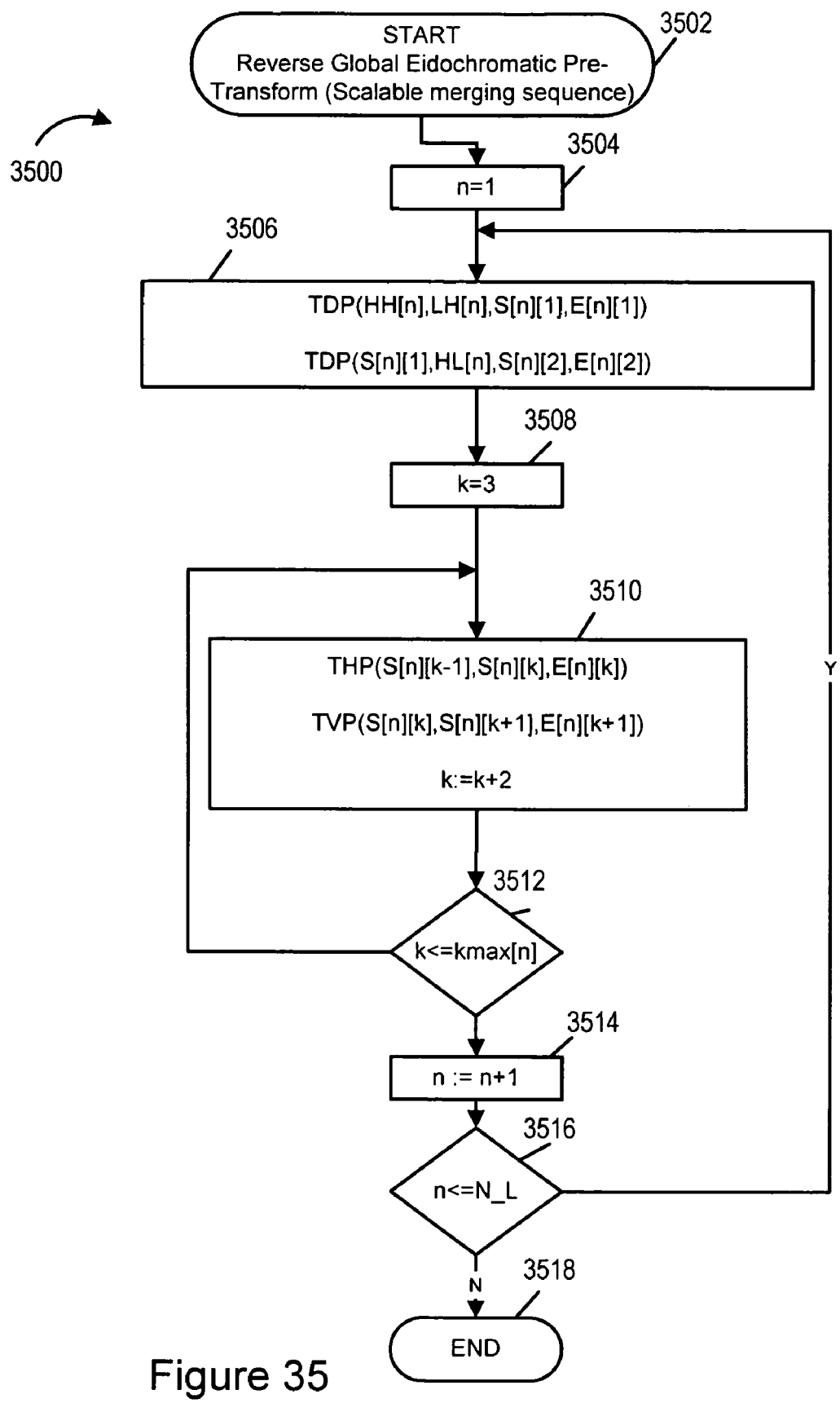
Figure 36:
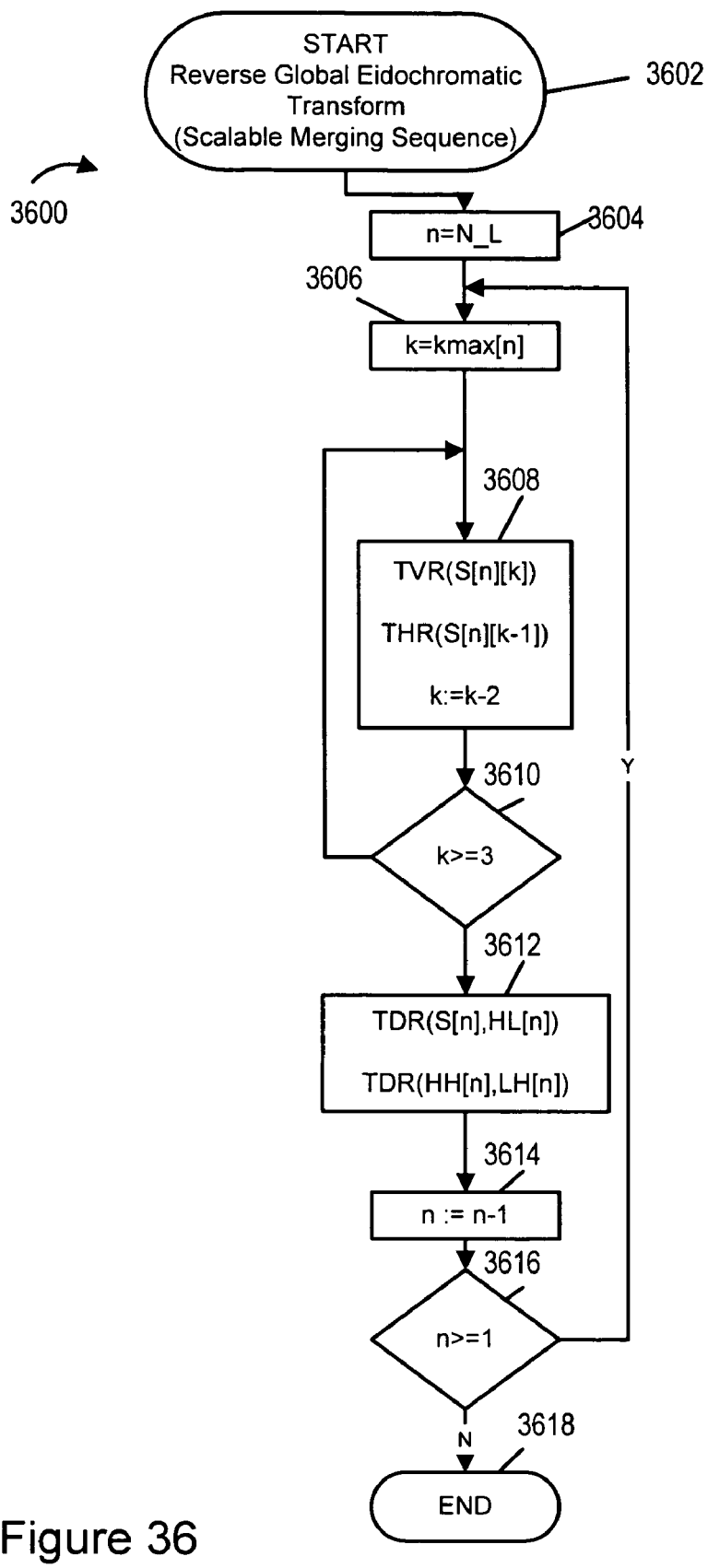
Figure 50:
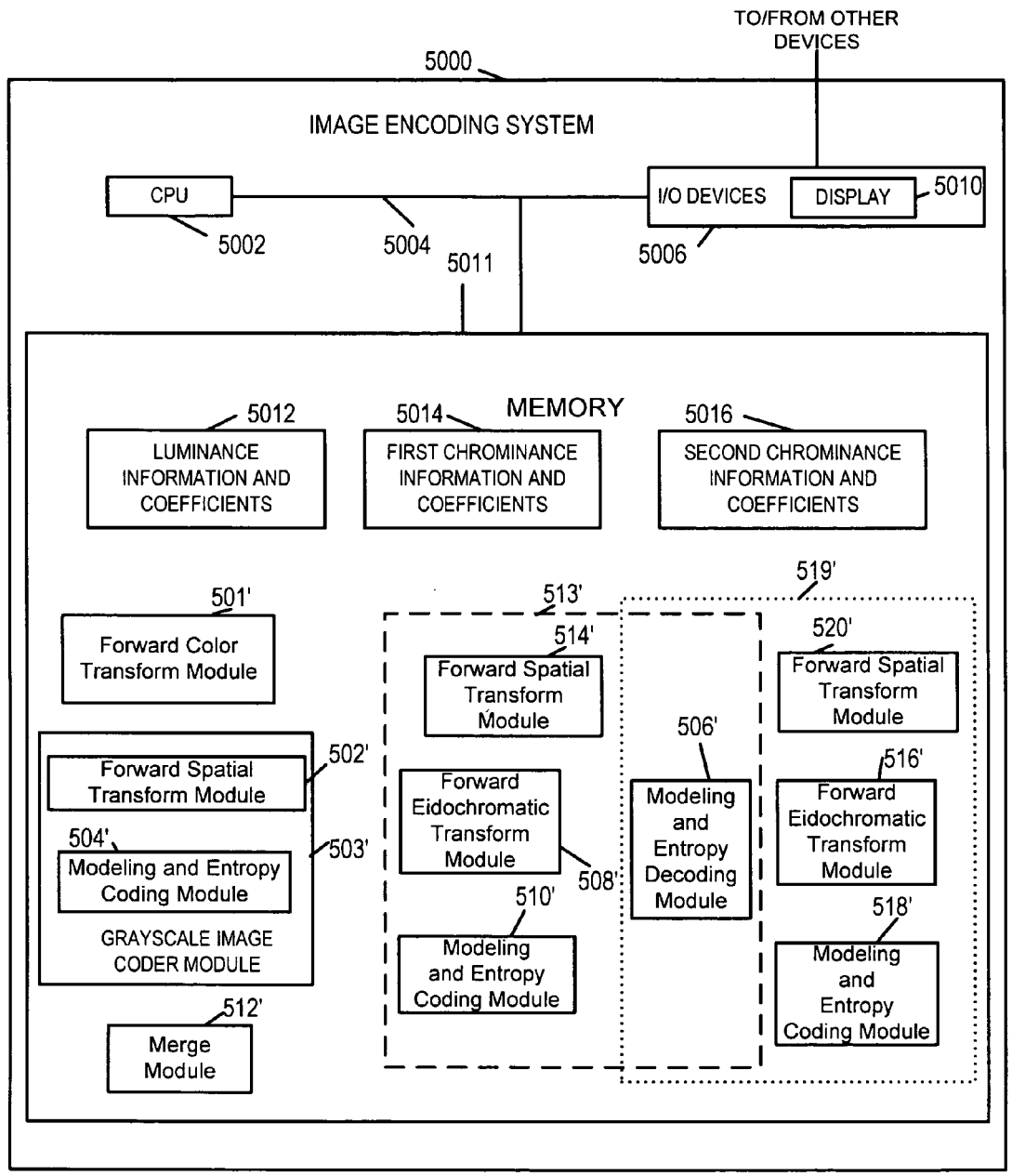
FIG. 50 illustrates an image encoding system which uses a programmable processing unit and various modules, e.g., software modules, to implement image encoding in accordance with the present invention.

The inverse transform performed in accordance with the invention can be implemented through the use of various routines of different levels as in the case of the forward transform of the present invention. The inverse transforms will be discussed starting with the lower level transforms and working up to a discussion of the top level inverse transforms, e.g., the Reverse Global Eidochromatic Pre-Transform for the standard merging sequence shown in FIG. 33 which is intended to be used with the reverse global eidochromatic transform routine 3400 for a standard merging sequence shown in FIG. 34. FIGS. 35 and 36 illustrate alternative top level inverse transform routines 3500, 3600.

From the previous discussion it should be appreciated that the luminance coefficients used a chrominance transform control coefficients are modified during the transform process but these control coefficients generated during the initial coding are not transmitted to the decoder. Rather, the actual luminance coefficients (which served as the initial transform control coefficients) are transmitted to a decoder. The purpose of the reverse global eidochromatic pre-transform operations 33, 35 is to generate from the received luminance coefficients, luminance control coefficients which will have the same values as the set of luminance control coefficients had at the end of the coding process, e.g., after being modified by the repeated eidochromatic transform steps performed by various forward transform routines.

The discussion of the reverse transform process will now begin with a detailed discussion of various low level routines that may be called as the processes of reversing the forward eidochromatic transform applied to a block of coefficients.

Figure 19:
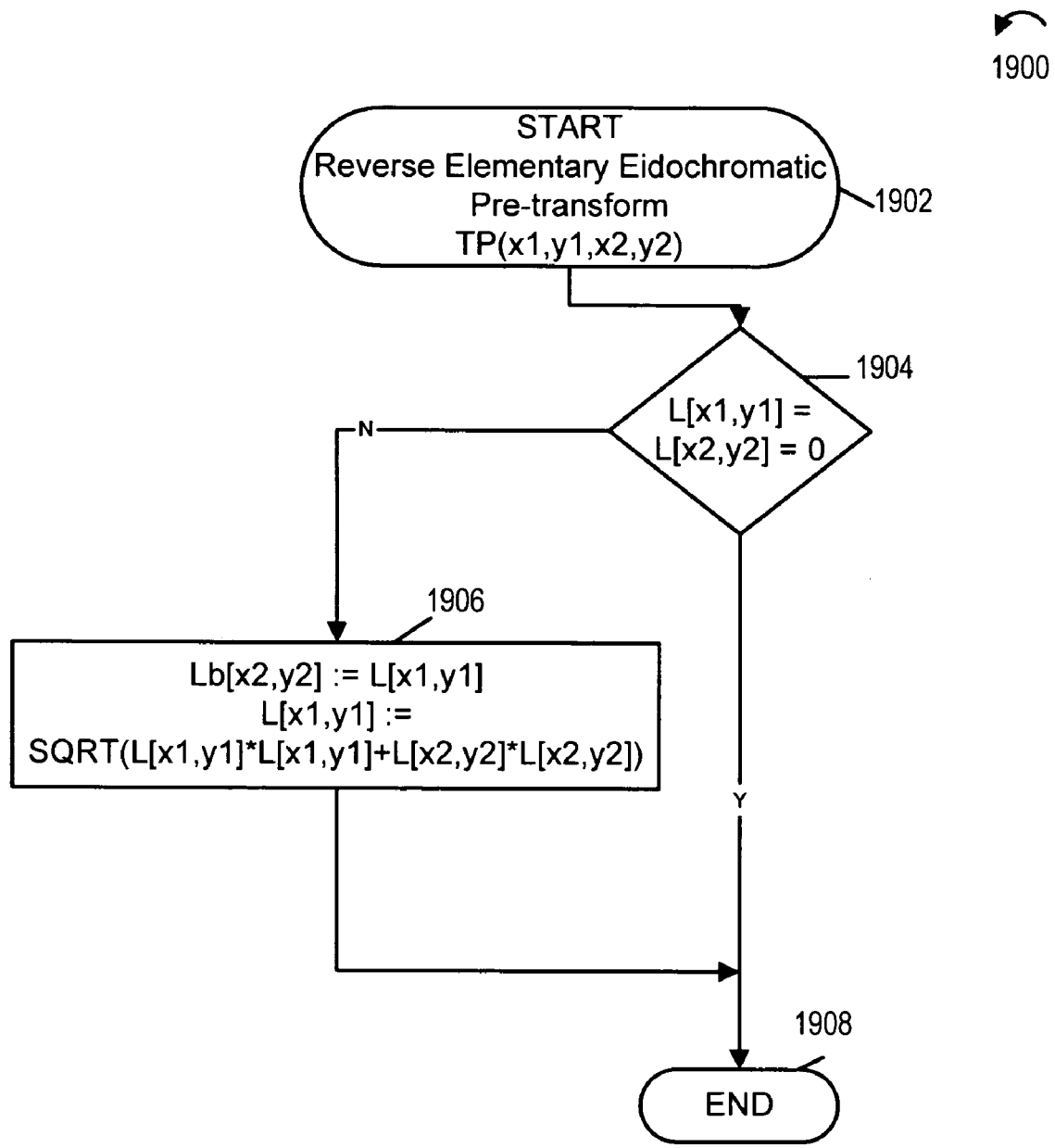
FIGS. 19-36 illustrate various routines and subroutines used to perform an inverse eidochromatic transform as part of a decoding process and may be used to implement one or both of the reverse eidochromatic transform steps performed in the decoding method shown in FIG. 6.

FIG. 19 shows an exemplary Reverse Elementary Eidochromatic Pre-Transform (TP) routine 1900 implemented in accordance with the invention which is one of the low level reverse routines. This routine 1900 modifies only luminance (L) coefficients, creating the control values for a later reverse eidochromatic transform. This routine interrelates wavelet coefficients at a single pair of locations and is called by TColP (routine 2000) and TRowP (routine 2200). Here L represents the two-dimensional matrix of all wavelet coefficients for the component. (x1,y1) and (x2,y2) are two locations within the wavelet coefficient matrix which will be interrelated. Lb is a storage buffer identical in size to L.

The routine 1900 starts in step 1902. From start step 1902, where the routine begins being executed, operation proceeds to step 1904 wherein the values of the L matrix at both locations (x1,y1) and (x2,y2) are compared to 0. If either value is nonzero, operation proceeds to step 1906; if both are zero, operation proceeds to the end 1908 of the routine.

Step 1906 performs the core reverse eidochromatic pre-transform calculation. First the value of L at location (x1,y1) is copied to the Lb buffer at location (x2,y2). Then a new control value is calculated from the values of L at locations (x1,y1) and (x2,y2) according to the formula SQRT(L[x1,y1

]*L[x1,y1 ]+L[x2,y2 ]*L[x2,y2 ]) and stored in the buffer L at loca Operation then proceeds to the end 1908 of the routine.

FIG. 46 shows the results of the routine TP 1900 applied to locations (1,2) and (2,2) of the exemplary L coefficient matrix in FIG. 37. Not that this matrix represent luminance coefficients that may be available at the decoder as a result of performing a modeling and entropy decoding operation in step 604 of the decoding process shown in FIG. 6. Bold is used to illustrate coefficients generated by application of the reverse routine TP. Matrix 4602 represent the L coefficients after application of the TP routine 1900 to locations (1,2) and (2,2) of the matrix 3700 shown in FIG. 37. Matrix 4604 represents the Lb coefficients after application of the TP routine 1900 to locations (1,2) and (2,2) of the matrix 3700 shown in FIG. 37.

Figure 20:
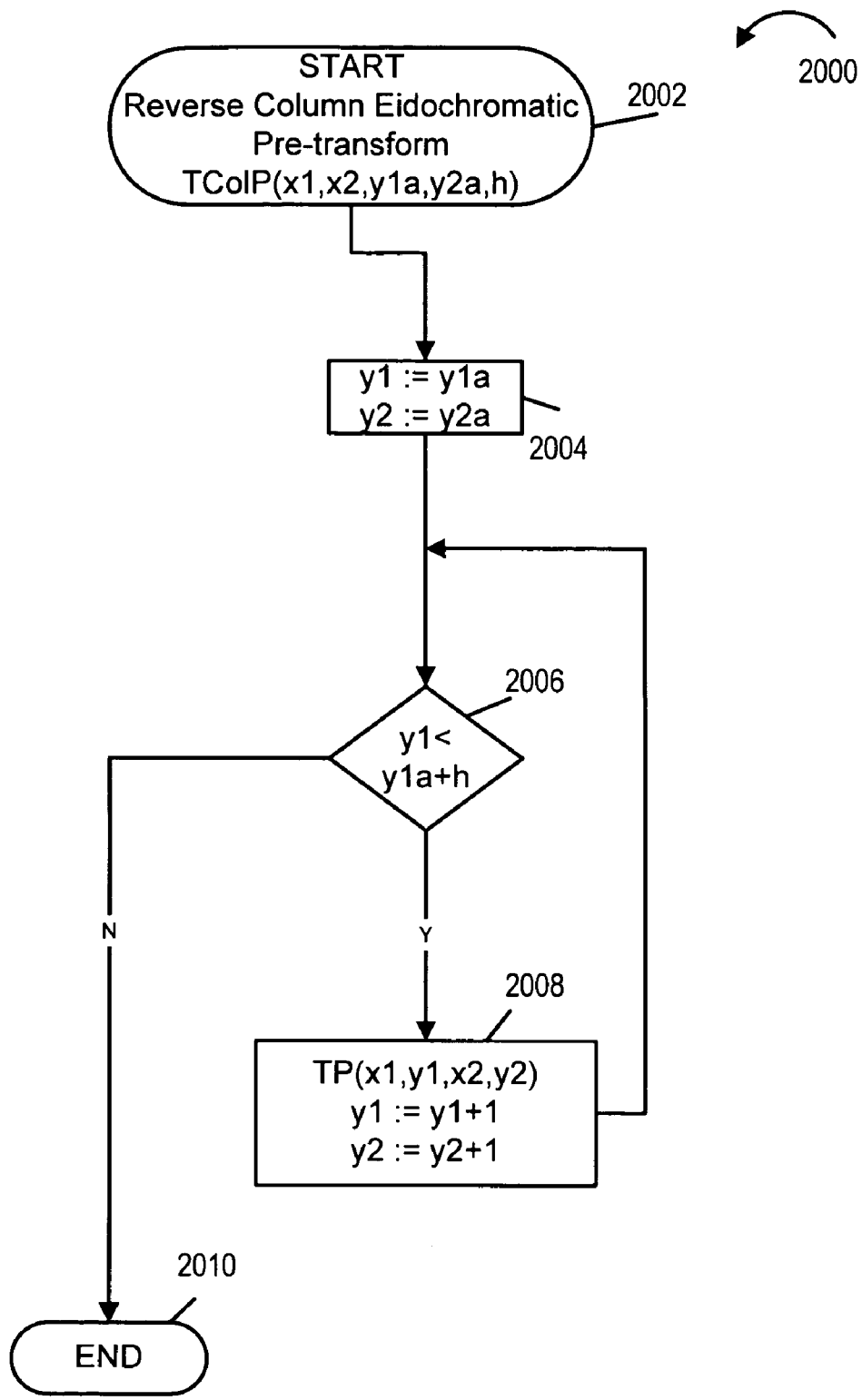

FIG. 20 shows an exemplary Reverse Column Eidochromatic Pre-Transform (TColP) routine implemented in accordance with the invention. This routine applies the Reverse Elementary Eidochromatic Pre-Transform to pairs of locations taken from two identical-height columns within the matrix of wavelet coefficients, and is called by THP (routine 2100). Here (x1,y1a) and (x2,y2a) are the starting positions of the two columns and h is the column height.

The routine 2000 starts in step 2002. From start step 2002, where the routine begins execution, operation proceeds to step 2004, wherein the indices y1 and y2 are set to the top positions y1a and y2a of the two columns.

From step 2004, operation proceeds to step 2006, which is the top of a loop over the column positions. In step 2006, the value of y1 is compared to y1a+h. If the value of y1 is less than that of y1a+h, operation proceeds to the body 2008 of the loop. Otherwise, operation proceeds to the end 2010 of the routine.

In step 2008, the Reverse Elementary Eidochromatic Pre-Transform TP is applied to locations (x1,y1) and (x2,y2). The values of y1 and y2 are then incremented by 1 and operation proceeds to the top step 2006 of the loop.

FIG. 47 shows the results of the TColP procedure applied to the exemplary matrix of L coefficients from FIG. 37, with x1=1, x2=2, y1a=y2 a=1, and h=5. Matrix 4702 represents the L coefficients after application of the TColP routine to locations (1,2) and (2,2) and with a height of 5 to the matrix 3700 shown in FIG. 37. Matrix 4704 represents the Lb coefficients after application of the TColP routine to locations (1,2) and (2,2) and with a height of 5 to the matrix 3700 shown in FIG. 37.

Figure 21:
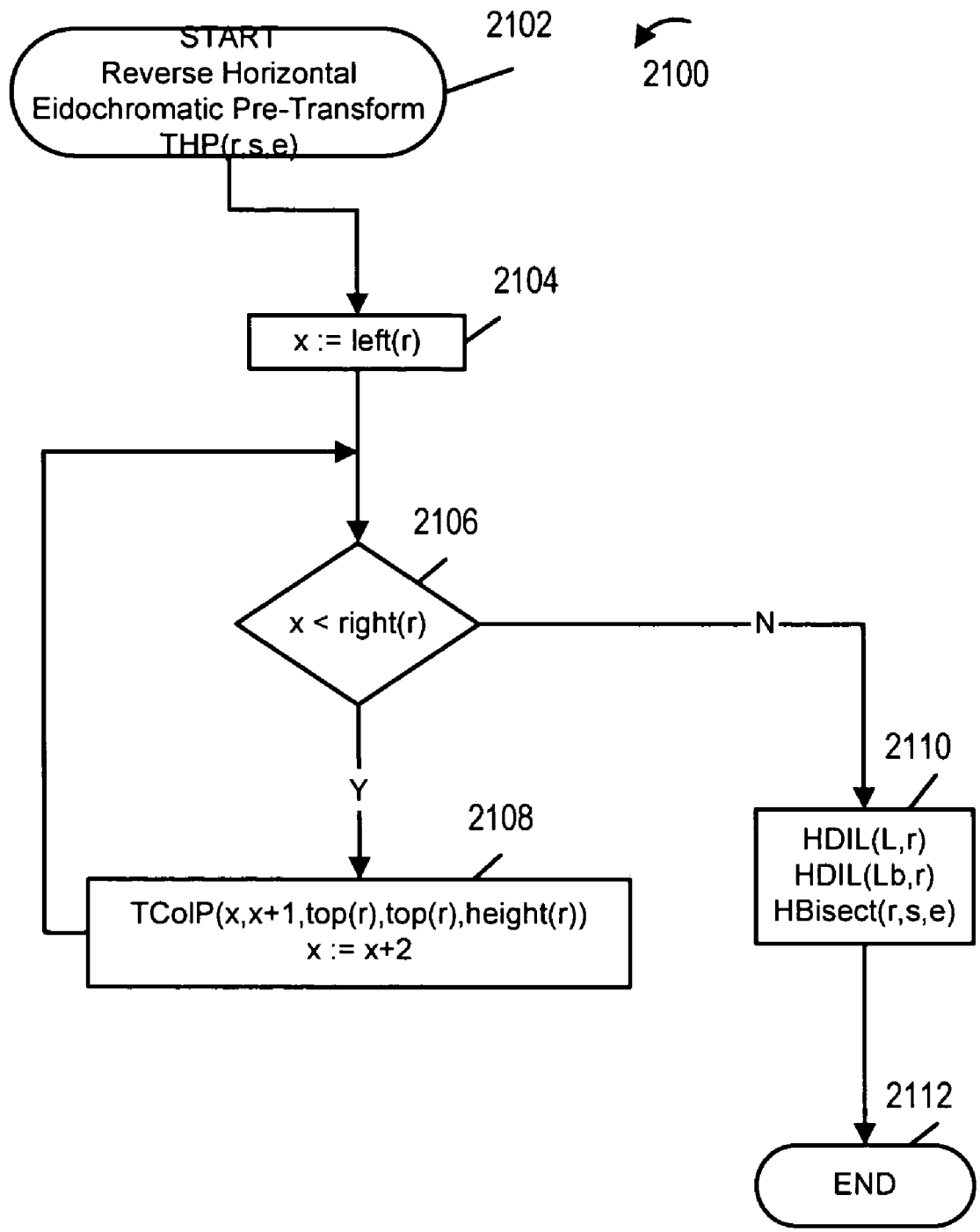

FIG. 21 shows an exemplary Reverse Horizontal Eidochromatic Pre-Transform operation (THP) routine implemented in accordance with the invention. This routine performs the reverse eidochromatic pre-transform on all horizontal pairs of coefficient locations within an input rectangle r, generating control values in output rectangle s of buffer L and storing the previous control values in output rectangle e of both buffer L and the storage buffer Lb. This routine is called by the Reverse Global Eidochromatic Pre-Transform (routine 3300 or 3500).

The routine 2100 starts in step 2102. From here operation proceeds to step 2104, wherein the value of the column index x is initialized to the left edge value of the rectangle r. Operation then proceeds to the beginning 2106 of a loop over columns.

In step 2106, the value of x is compared to the right edge position right(r) of the rectangle r. If x is less than right(r), then operation proceeds to the body 2108 of the loop. Otherwise operation proceeds to step 2110.

In step 2108, the Reverse Column Eidochromatic Pre-Transform TColP is applied to the pair of columns running from the top to bottom of the rectangle r at positions x and x+1. The value of the column index is then incremented by 2 to access the next pair of columns. Operation then proceeds to the top 2106 of the loop.

In step 2110, the coefficients within the subrectangle r of the L and Lb screens are horizontally de-interlaced by calling the routine HDIL. The subrectangles s and e are then defined by calling the routine HBisect. Operation then proceeds to the end 2112 of the routine.

FIG. 48 shows exemplary matrices of L and Lb coefficients after application of the THP routine to the exemplary matrix of L from FIG. 37 coefficients on subrectangle r with top(r)=1, bottom(r)=4, left(r)=1, and right(r)=5. Matrix 4802 represents the L coefficients resulting after application of the THP routine to the exemplary rectangle of coefficients. Matrix 4804 represents the Lb coefficients after application of the THP routine to the exemplary rectangle of coefficients.

Figure 22:
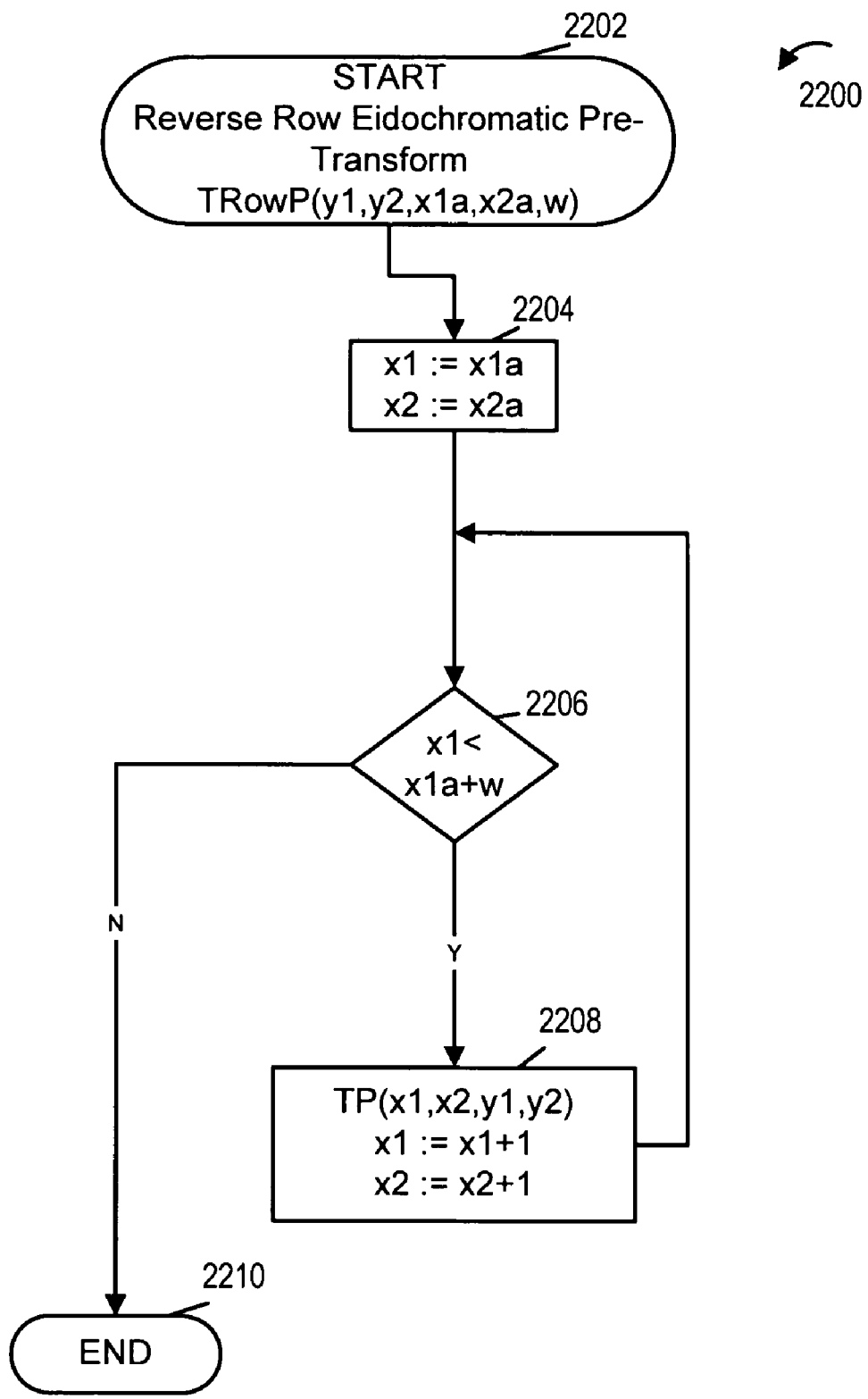

FIG. 22 shows an exemplary Reverse Row Eidochromatic Pre-Transform (TRowP) routine implemented in accordance with the invention. This routine applies the Reverse Elementary Eidochromatic Pre-Transform to pairs of locations taken from two identical-width rows within the matrix of wavelet coefficients, and is called by TVP (routine 2300) and TDP (routine 2400). Here (x1a,y1) and (x2a,y2) are the starting positions of the two rows and w is the column width.

The routine 2200 starts in step 2202. From start step 2202, where the routine begins execution, operation proceeds to step 2204, wherein the indices x1 and x2 are set to the left positions x1a and x2a of the two rows.

From step 2204, operation proceeds to step 2206, which is the top of a loop over the row positions. In step 2206, the value of x1 is compared to x1a+w. If the value of x1 is less than that of x1a+w, operation proceeds to the body 2208 of the loop. Otherwise, operation proceeds to the end 2210 of the routine.

In step 2208, the Reverse Elementary Eidochromatic Pre-Transform TP is applied to locations (x1,y1) and (x2,y2). The values of x1 and x2 are then incremented by 1 and operation proceeds to the top step 2206 of the loop.

Figure 23:
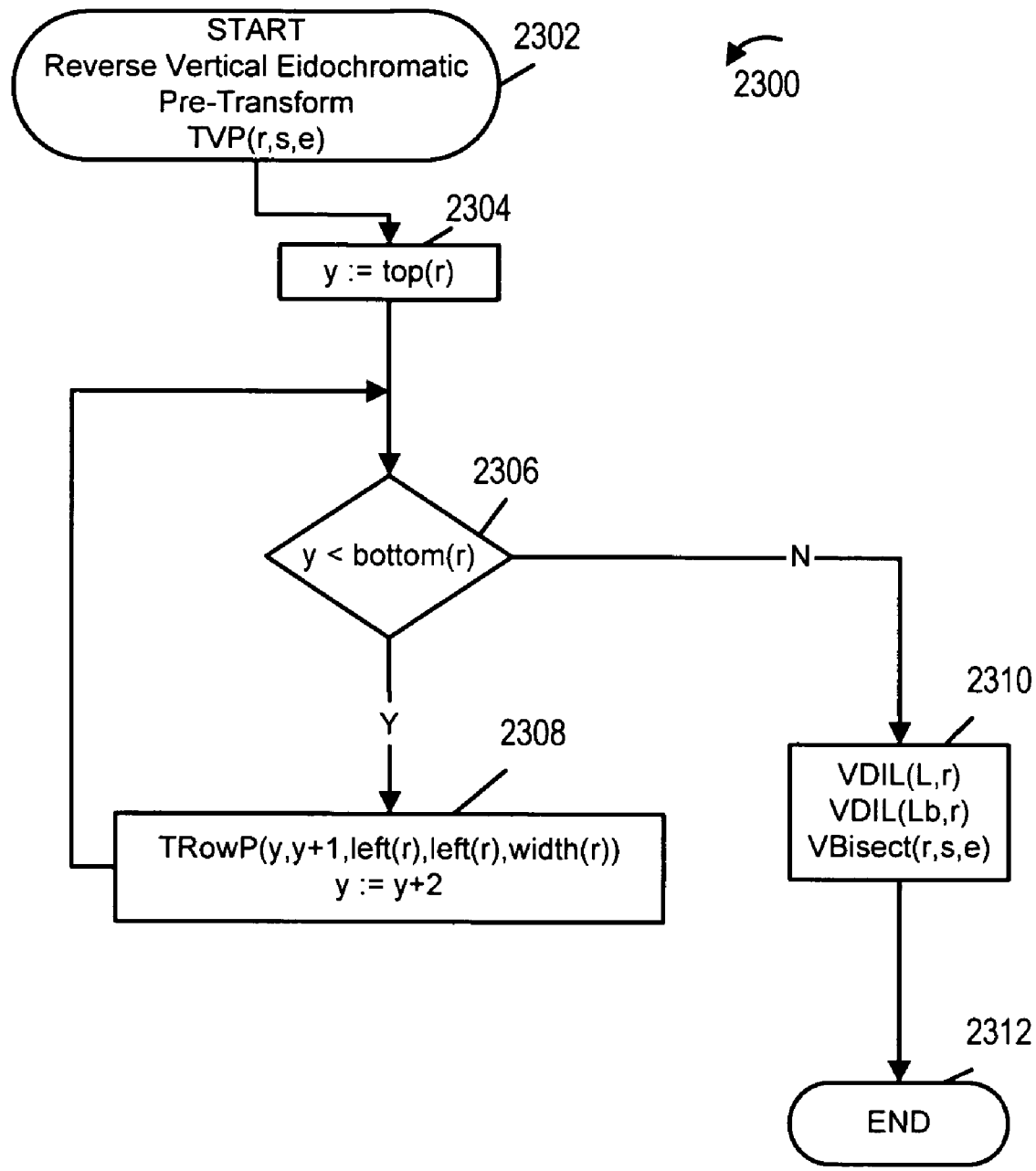

FIG. 23 shows an exemplary Reverse Vertical Eidochromatic Pre-Transform operation (TVP) routine implemented in accordance with the invention. This routine performs the reverse eidochromatic pre-transform on all vertical pairs of coefficient locations within an input rectangle r, generating control values in output rectangle s of buffer L and storing the previous control values in output rectangle e of both buffer L and the storage buffer Lb. This routine is called by the Reverse Global Eidochromatic Pre-Transform (routine 3300 or 3500).

The routine 2300 starts in step 2302. From here operation proceeds to step 2304, wherein the value of the row index y is initialized to the top edge value of the rectangle r. Operation then proceeds to the beginning 2306 of a loop over rows.

In step 2306, the value of y is compared to the bottom edge position bottom(r) of the rectangle r. If y is less than bottom(r), then operation proceeds to the body 2308 of the loop. Otherwise operation proceeds to step 2310.

In step 2308, the Reverse Row Eidochromatic Pre-Transform TRowP is applied to the pair of rows running from the left to right of the rectangle r at positions y and y+1. The value of the row index is then incremented by 2 to access the next pair of rows. Operation then proceeds to the top 2306 of the loop.

In step 2310, the coefficients within the subrectangle r of the L and Lb screens are vertically de-interlaced by, calling the routine VDIL. The subrectangles s and e are then defined by calling the routine VBisect. Operation then proceeds to the end 2312 of the routine.

Figure 24:
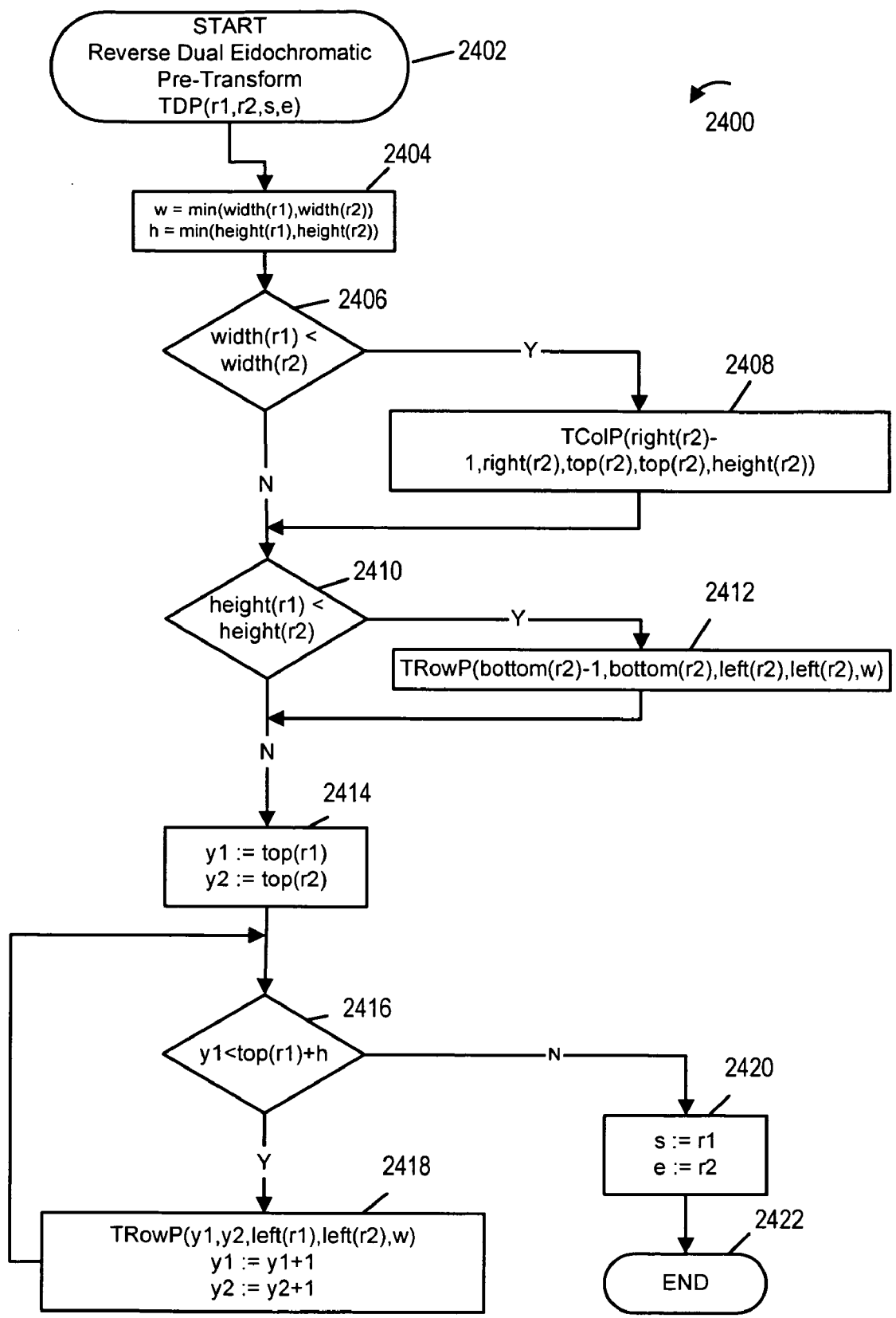

FIG. 24 shows an exemplary Reverse Dual Eidochromatic Pre-Transform operation (TDP) routine implemented in accordance with the invention. This routine performs the reverse eidochromatic pre-transform on pairs of coefficient locations at corresponding positions within two input rectangles r1 and r2, generating control values in output rectangle s of buffer L and storing the previous control values in output rectangle e of both buffer L and the storage buffer Lb. Rectangles r1 and r2 are allowed to differ in width or height by at most 1. This routine is called by the Reverse Global Eidochromatic Pre-Transform (routine 3300 or 3500).

The routine 2400 starts in step 2402. From here operation proceeds to step 2404, wherein the variables w and h are initialized to the minimum width and height, respectively, of the two input rectangles. Operation then proceeds to step 2406.

Step 2406 compares the widths of the two input rectangles, as special handling is required in the case where rectangle r2 exceeds rectangle r1 in width. If the width of rectangle r2 does exceed that of rectangle r1, operation proceeds to step 2408; otherwise operation proceeds to step 2410.

Step 2408 is executed only in the case where rectangle r2 exceeds rectangle r1 in width. In this step the rightmost column of rectangle r2 is "folded in" to the next rightmost column by calling TColP with these two columns. Operation then proceeds to step 2410.

Step 2410 compares the heights of the two input rectangles, as special handling is required in the case where rectangle r2 exceeds rectangle r1 in height. If the height of rectangle r2 does exceed that of rectangle r1, operation proceeds to step 2412; otherwise operation proceeds to step 2414.

Step 2412 is executed only in the case where rectangle r2 exceeds rectangle r1 in height. In this step the bottommost row of rectangle r2 is "folded in" to the next bottommost row by calling TRowP with these two rows. Operation then proceeds to step 2414.

Step 2414 is the top of a loop over rows of rectangles r1 and r2. This loop is executed h times (the smaller of the height of r1 and r2). Either r1 or r2 (but not both) may contain 1 additional row. Any additional row of r2 was handled in step 2412. An additional row of r1 can be ignored. The loop is initialized by setting y1 and y2 to the top row positions of rectangles r1 and r2, respectively. Operation then proceeds to step 2416.

Step 2416 tests whether y1 is less than h plus the top row position of rectangle r1. If y1 is less than h plus the top row position of rectangle r1, then operation proceeds to the body 2418 of the loop. Otherwise the loop is exited and operation proceeds to step 2420.

In Step 2418, the routine TRowP is used to transform a row at position y1 of rectangle r1 and a row at position y2 of rectangle r2. The row positions y1 and y2 are then each incremented by 1. Operation then proceeds to step 2416.

In Step 2420, the output rectangles s and e are defined by setting s equal to the input rectangle r1 and e equal to the input rectangle r2. Operation then proceeds to the end 2422 of the routine.

FIG. 49 shows exemplary matrices of L and Lb coefficients resulting from application of the TDP routine to the exemplary matrix of L coefficients from FIG. 37 on subrectangle r1 with top(r1)=1, bottom(r1)=4, left(r1)=1, and right(r1)=2 and subrectangle r2 bottom(r2)=5, left(r2)=3, and right(r2)=5. Matrix 4902 represents the L coefficients resulting after application of the TDP routine to the exemplary rectangle of coefficients. Matrix 4904 represents the Lb coefficients after application of the TDP routine to the exemplary rectangle of coefficients.

Figure 25:
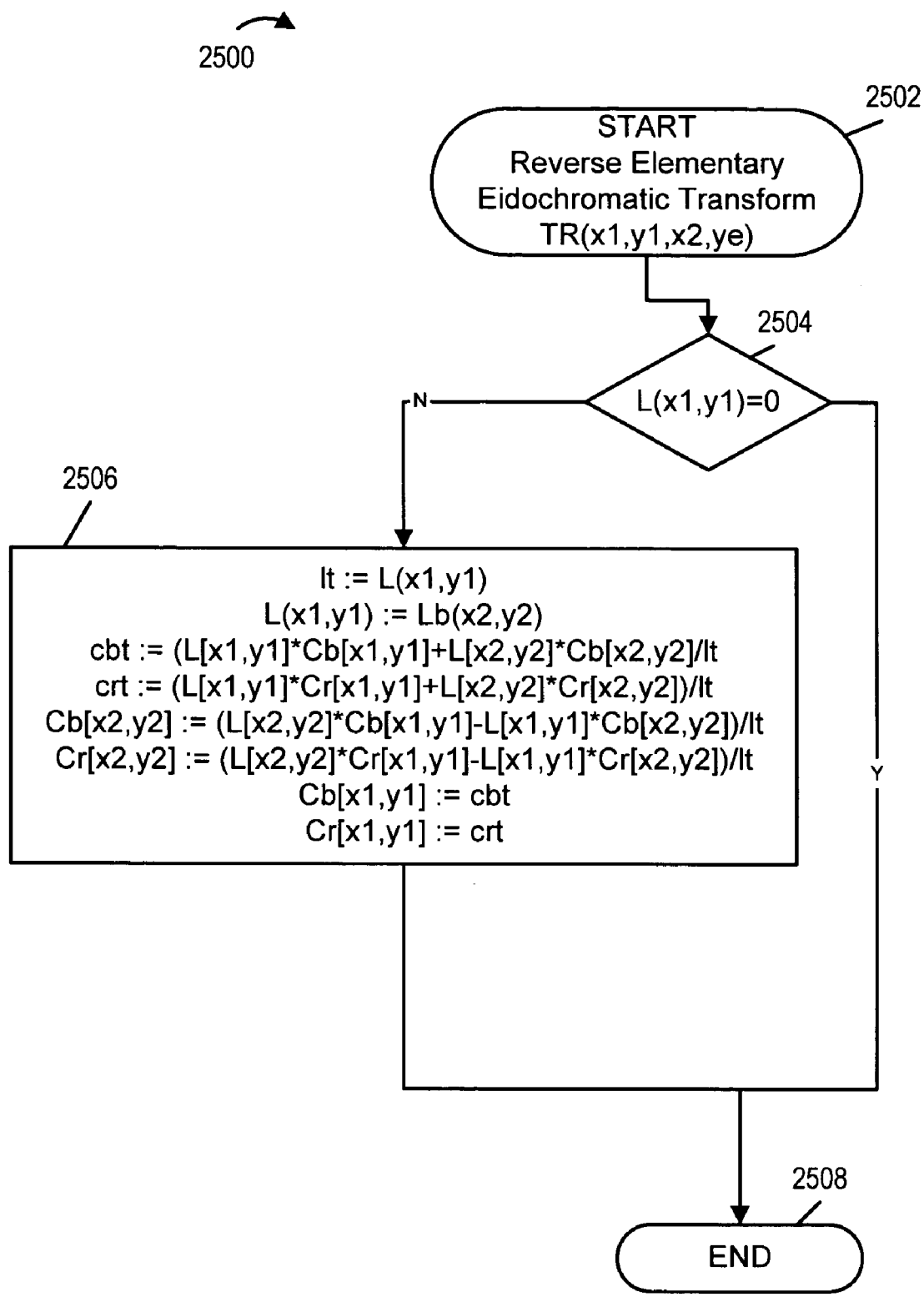

FIG. 25 shows an exemplary Reverse Elementary Eidochromatic Transform (TR) routine implemented in accordance with the invention. This routine interrelates wavelet coefficients at a single pair of locations and is called by TColR (routine 2600) and TRowR (routine 2900). Here L, Cb, and Cr represent the two-dimensional matrices of all coefficients for the L, Cb, and Cr components, respectively. Control values for the transform are located in the matrix L and storage buffer Lb, generated by a previous call to TP (routine 1900). (x1,y1) and (x2,y2) are locations of an S-value and E-value, respectively, within the eidochromatic coefficient matrix.

The routine 2500 starts in step 2502. From start step 2502, where the routine begins being executed, operation proceeds to step 2504 wherein the values of the L matrix at locations (x1,y1) (which holds a control value previously calculated by the routine TP) to 0. If this value is nonzero, operation proceeds to step 2506. Otherwise operation proceeds to the end 2508 of the routine.

Step 2506 performs the core reverse eidochromatic calculation. First the value of L at location (x1,y1) is stored in the temporary variable It. Then the value of Lb at location (x2,y2) is moved to the (x1,y1) location of L (where it was originally before being moved by TP). Then temporary values cbt and crt are calculated from the values of Cr and Cb at locations (x1,y1) and (x2,y2) (controlled by the values of L at locations (x1,y1) and (x2,y2) and the value of It) according to the formulae cbt:=(L[x1,y1 ]*Cb[x1,y1 ]+L[x2,y2 ]*Cb[x2,y2 ]/lt (L[x1,y1 ]*Cr[x1,y1 ]+L[x2,y2 ]*Cr[x2,y2 ])/lt. Then values of Cr and Cb at loca calculated from the values of Cr and Cb at locations (x1,y1) and (x2,y2) (controlled by the values of L at locations (x1,y1) and (x2,y2) and the value of It) according to the formulae Cb[x2,y2]:=(L[x2,y2]*Cb[x1,y1 ]-L[x1,y1 ]*Cb[x2,y2])/lt and Cr (L[x2,y2]*Cr[x1,y1 ]-L[x1,y1 ]*Cr[x2,y2])/lt. Finally the previously-calculated v crt are stored in location (x1,y1) of components Cb and Cr, respectively. Operation then proceeds to the end 2508 of the routine.

For example, the Reverse Elementary Eidochromatic Transform, applied to locations (1,2) and (2,2) of the exemplary matrices of Cb and Cr coefficients from FIG. 38, controlled by the exemplary matrices of L and Lb coefficients from FIG. 46, recovers the original exemplary matrices of L, Cb, and Cr coefficients from FIG. 37.

Figure 26:
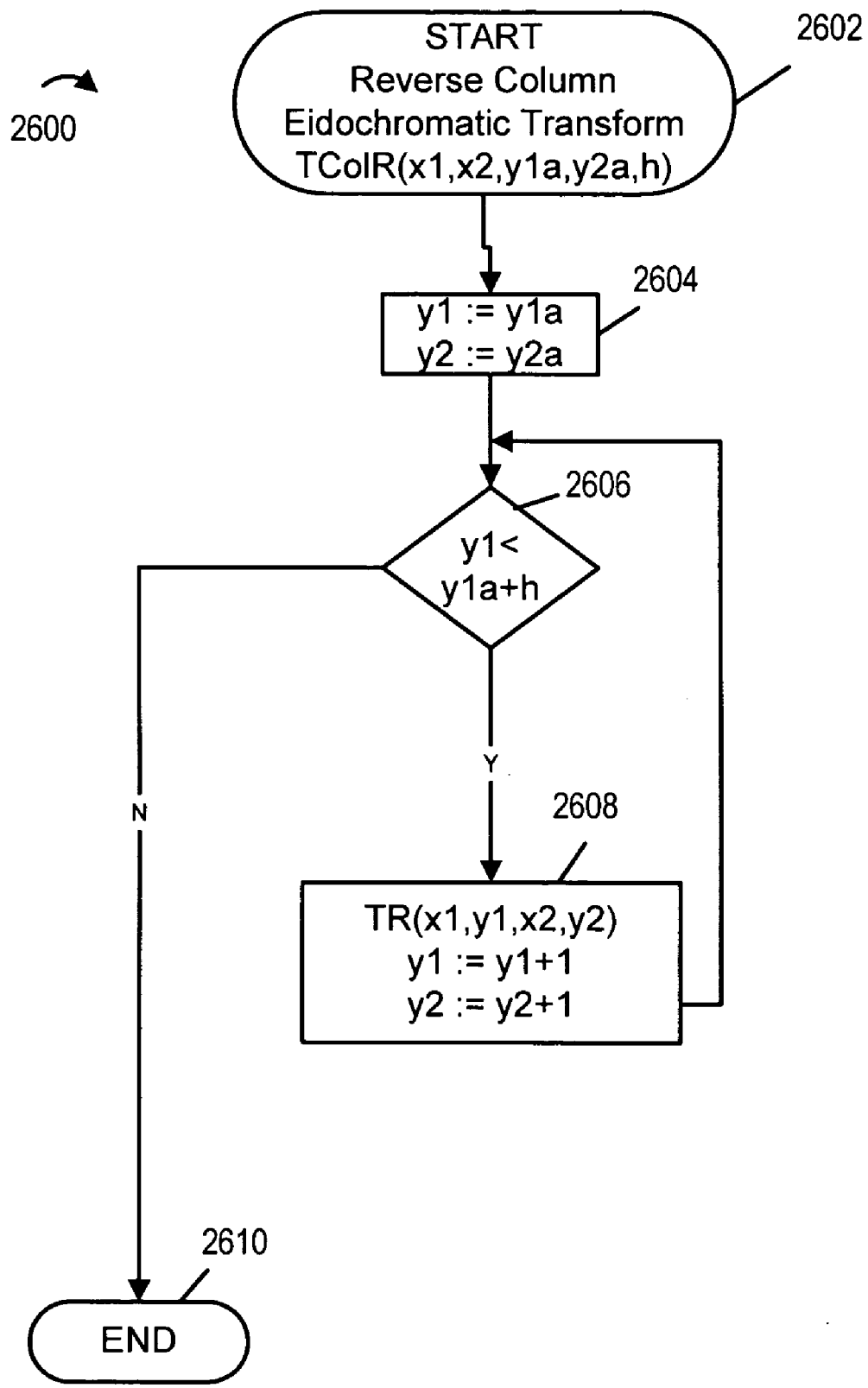

FIG. 26 shows an exemplary Reverse Column Eidochromatic Transform (TColR) routine implemented in accordance with the invention. This routine applies the Reverse Elementary Eidochromatic Transform to pairs of locations taken from two identical-height columns within the matrix of wavelet coefficients, and is called by THR (routine 2800). Control values for the transform are located in the matrix L and storage buffer Lb, generated by a previous call to TColP (routine 2000). Here (x1,y1a) and (x2,y2a) are the starting positions of the two columns and h is the column height.

The routine 2600 starts in step 2602. From start step 2602, where the routine begins execution, operation proceeds to step 2604, wherein the indices y1 and y2 are set to the top positions y1a and y2a of the two columns.

From step 2604, operation proceeds to step 2606, which is the top of a loop over the column positions. In step 2606, the value of y1 is compared to y1 a+h. If the value of y1 is less than that of y1a+h, operation proceeds to the body 2608 of the loop. Otherwise, operation proceeds to the end 2610 of the routine.

In step 2608, the Reverse Elementary Eidochromatic Transform TR is applied to locations (x1,y1) and (x2,y2). The values of y1 and y2 are then incremented by 1 and operation proceeds to the top step 2606 of the loop.

For example, the Reverse Column Eidochromatic Transform, applied to the columns starting at locations (1,2) and (2,2) and with height 5 of the exemplary matrices of Cb and Cr coefficients from FIG. 39, controlled by the exemplary matrices of L and Lb coefficients from FIG. 47, recovers the original exemplary matrices of L, Cb, and Cr coefficients from FIG. 37.

Figure 27:
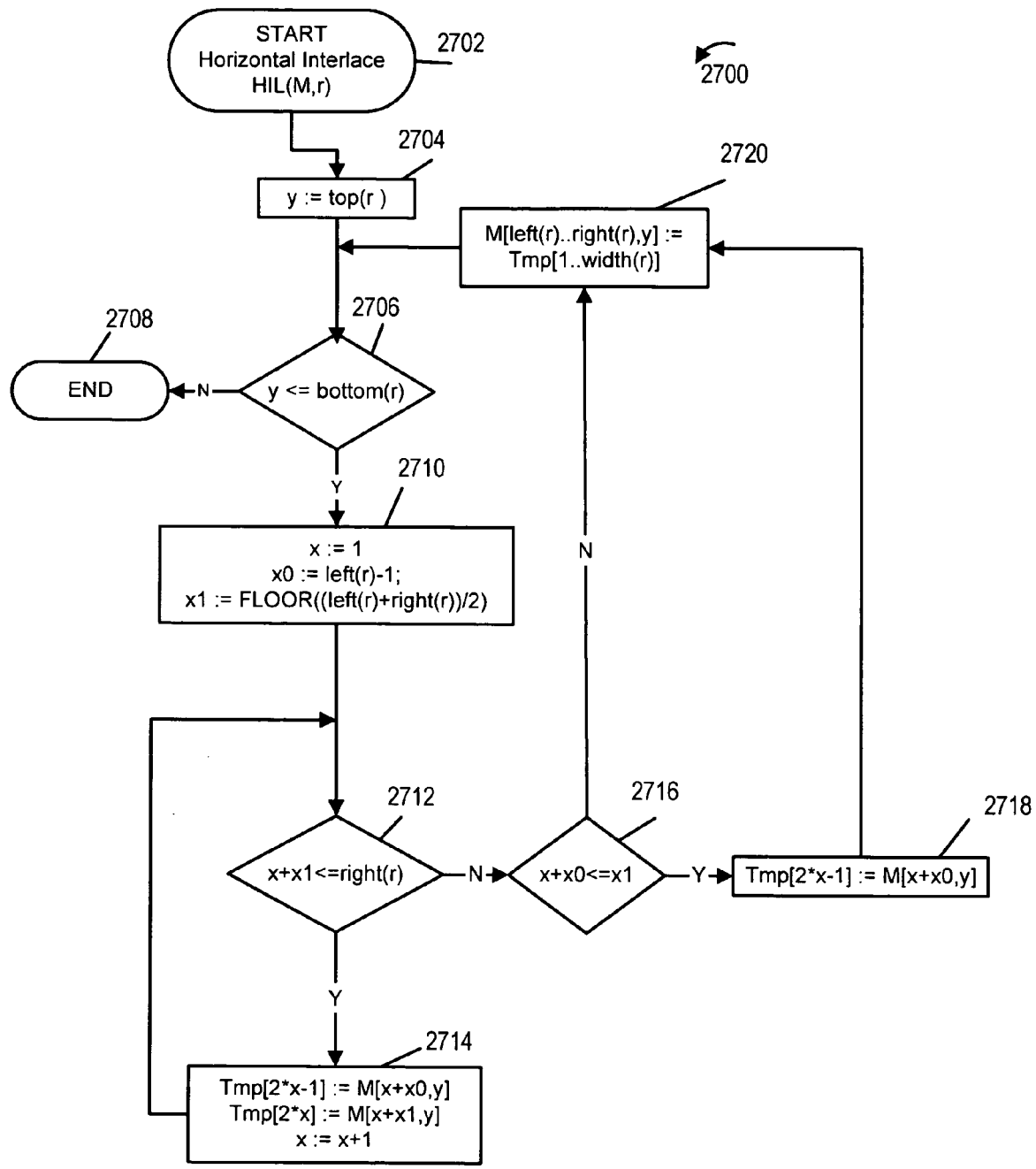

FIG. 27 shows an exemplary Horizontal Interlace operation (HIL) routine implemented in accordance with the invention. This routine rearranges the coefficient values of a rectangle of coefficients by creating horizontal pairs, each pair consisting of a coefficient on the left originally located in the left half of the rectangle and a coefficient on the right originally located in the right half of the rectangle. This routine is called by THR (routine 2800). Here M is a two-dimensional matrix of coefficients, r is a rectangle defined within M, and Tmp is a temporary working buffer large enough to hold a single row of M.

The routine 2700 starts in step 2702. From start step 2702, operation proceeds to step 2704, wherein the index value y is initialized to the top position of the rectangle r. Operation then proceeds to step 2706.

Step 2706 is the top of a loop over all rows of the rectangle r. In step 2706, the index value y is compared to the bottom position of the rectangle r. If the value of y does not exceed the bottom position of r, operation proceeds to the body 2710 of the loop. Otherwise, operation proceeds to the end 2708 of the routine.

In step 2710, the values of the indices x, x0, and x1 are initialized as follows. x is initialized to 1, x0 is initialized to one less than the left edge position of the rectangle r, and x1 is initialized to FLOOR((left(r)+right(r))/2) (roughly the center position of the rectangle r). Operation then proceeds to step 2712.

Step 2712 is the top of a loop over pairs of coefficients within the working buffer Tmp. In step 2712, the value of x+x1 is compared to the right edge position of the rectangle r. If x+x1 does not exceed the right edge position of r, then operation proceeds to the body 2714 of the loop. Otherwise operation proceeds to step 2716.

Step 2714 interlaces a single pair of coefficients, moving them from the matrix M to the working buffer Tmp. The coefficient at location (x+x0,y) of M (in the left half of the rectangle r) is moved to location 2*x−1 of Tmp and the coefficient at location (x+x1,y) of M (in the right half of the rectangle r) is moved to location 2*x. Operation then proceeds to the loop test 2712.

Step 2716 compares the value of x+x0 to x1 . If the value of x+x0 exceeds x1 (which occurs if and only if the original rectangle r contains an odd number of columns), then operation proceeds to step 2718. Otherwise operation proceeds to step 2720.

Step 2718 is executed only in the case where the original rectangle contains an odd number of columns. In this case a lone space in the working buffer remains empty after all horizontal pairs have been filled from the left and right halves of the rectangle r. Step 2718 fills this lone remaining space with the element at position (x+x0,y) of M (on the borderline between the left and right halves of r). Operation then proceeds to step 2720.

Step 2720 copies the contents of the working buffer Tmp to the row in position y of the matrix M. The row counter y is then incremented by 1 prior to the next passage through the row loop. Operation then proceeds to step 2706.

For example, the Horizontal Interlace Routine, applied to the entire exemplary matrix of coefficients from FIG. 40, recovers the original exemplary matrix of L coefficients from FIG. 37.

Figure 28:
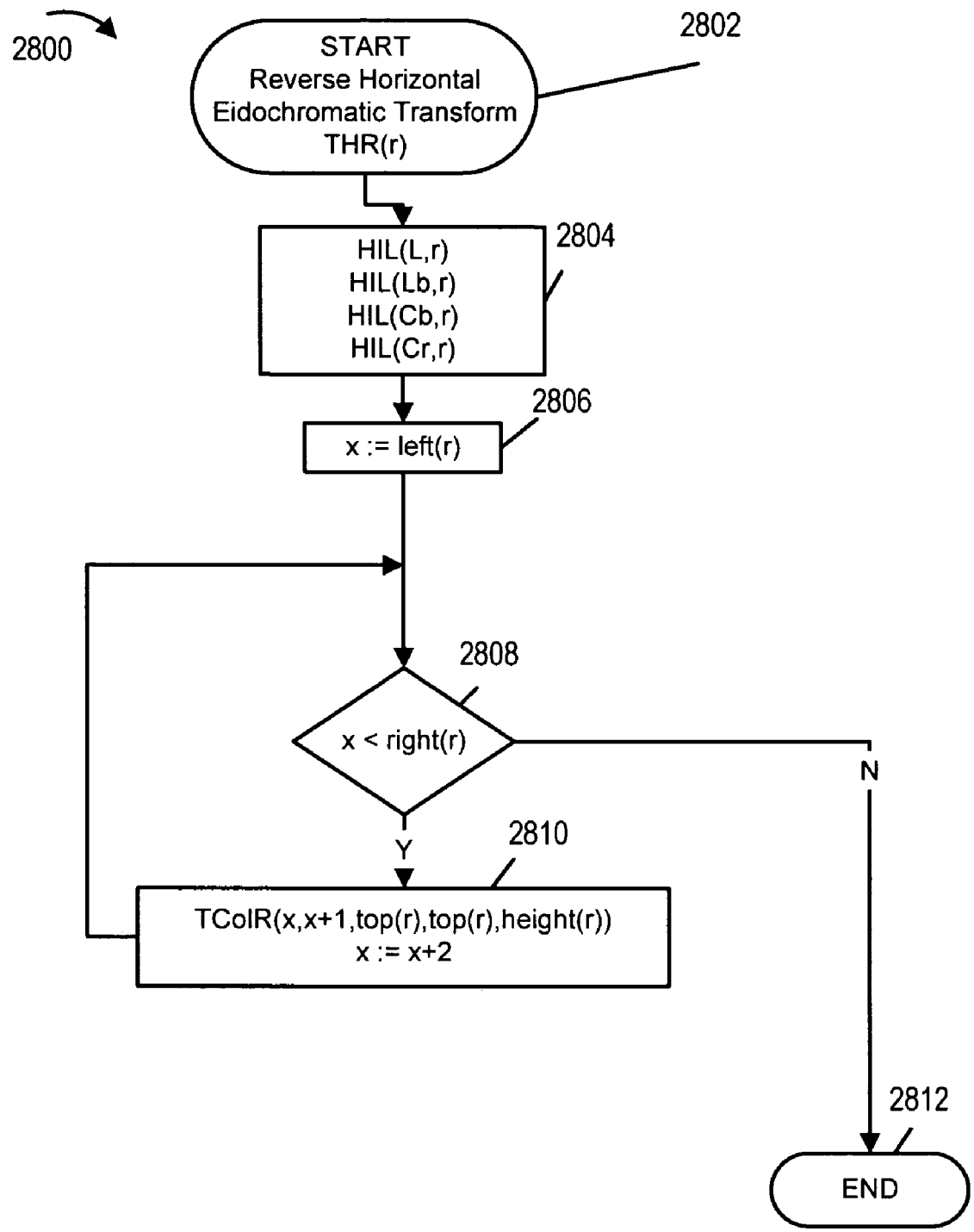

FIG. 28 shows an exemplary Reverse Horizontal Eidochromatic Transform operation (THR) routine implemented in accordance with the invention. This routine performs the reverse eidochromatic transform on S-values and E-values in horizontally adjacent input rectangles, generating horizontal pairs of coefficients in a specified rectangle r. Control values for the transform are located in the matrix L and storage buffer Lb, generated by a previous call to THP (routine 2100). This routine is called by the Reverse Global Eidochromatic Transform (routine 3400 or 3600).

The routine 2800 starts in step 2802. From here operation proceeds to step 2804, wherein the routine HIL is used to horizontally interlace the subrectangle r of the coefficient matrices L, Cb, Cr, and Lb. Operation then proceeds to step 2806.

In step 2806, the value of the column index x is initialized to the left edge value of the rectangle r. Operation then proceeds to the beginning 2808 of a loop over columns.

In step 2808, the value of x is compared to the right edge position right(r) of the rectangle r. If x is less or equal to than right(r), then operation proceeds to the body 2810 of the loop. Otherwise operation proceeds to the end 2812 of the routine.

In step 2810, the Reverse Column Eidochromatic Transform TColR is applied to the pair of columns running from the top to bottom of the rectangle r at positions x and x+1. The value of the column index is then incremented by 2 to access the next pair of columns. Operation then proceeds to the top 2808 of the loop.

For example, the Reverse Horizontal Eidochromatic Transform, applied to the subrectangle r with top(r)=1, bottom(r)=4, left(r)=1, and right(r)=5 of the exemplary matrices of Cb and Cr coefficients from FIG. 41, controlled by the exemplary matrices of L and Lb coefficients from FIG. 48, recovers the original exemplary matrices of L, Cb, and Cr coefficients from FIG. 37.

Figure 29:
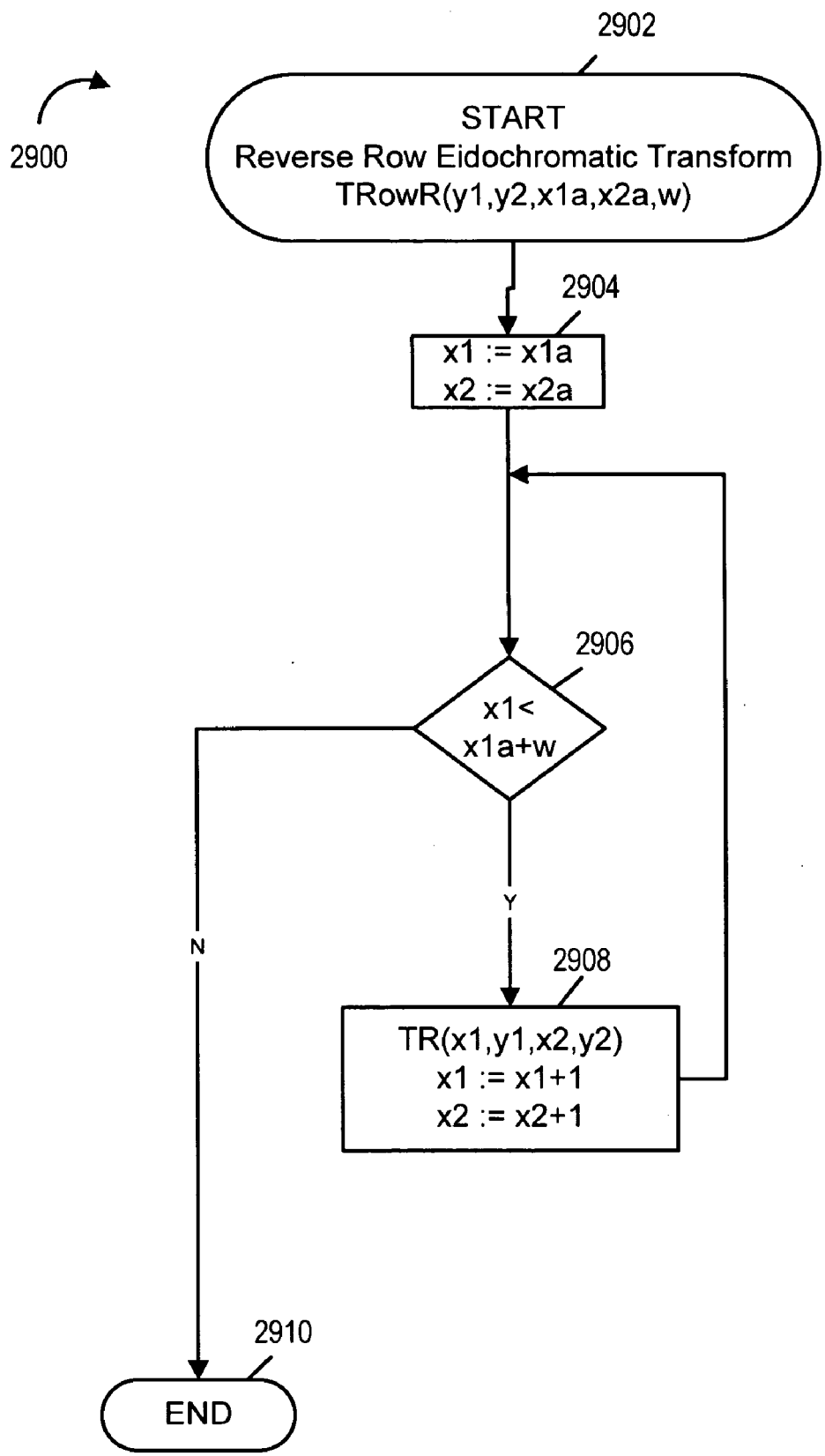

FIG. 29 shows an exemplary Reverse Row Eidochromatic Transform (TRowR) routine implemented in accordance with the invention. This routine applies the Reverse Elementary Eidochromatic Transform to pairs of locations taken from two identical-width rows within the matrix of wavelet coefficients, and is called by TVR (routine 3100) and TDR (routine 3200). Control values for the transform are located in the matrix L and storage buffer Lb, generated by a previous call to TRowP (routine 2200). Here (x1a,y1) and (x2a,y2) are the starting positions of the two rows and w is the column width.

The TRowR routine is in all respects parallel to the TColR routine (routine 2600), except for interchanging the roles of horizontal and vertical.

The routine 2900 starts in step 2902. From start step 2902, where the routine begins execution, operation proceeds to step 2904, wherein the indices x1 and x2 are set to the left positions x1a and x2a of the two rows.

From step 2904, operation proceeds to step 2906, which is the top of a loop over the row positions. In step 2906, the value of x1 is compared to x1 a+w. If the value of x1 is less than that of x1 a+w, operation proceeds to the body 2908 of the loop. Otherwise, operation proceeds to the end 2910 of the routine.

In step 2908, the Reverse Elementary Eidochromatic Transform TR is applied to locations (x1,y1) and (x2,y2). The values of x1 and x2 are then incremented by 1 and operation proceeds to the top step 2906 of the loop.

Figure 30:
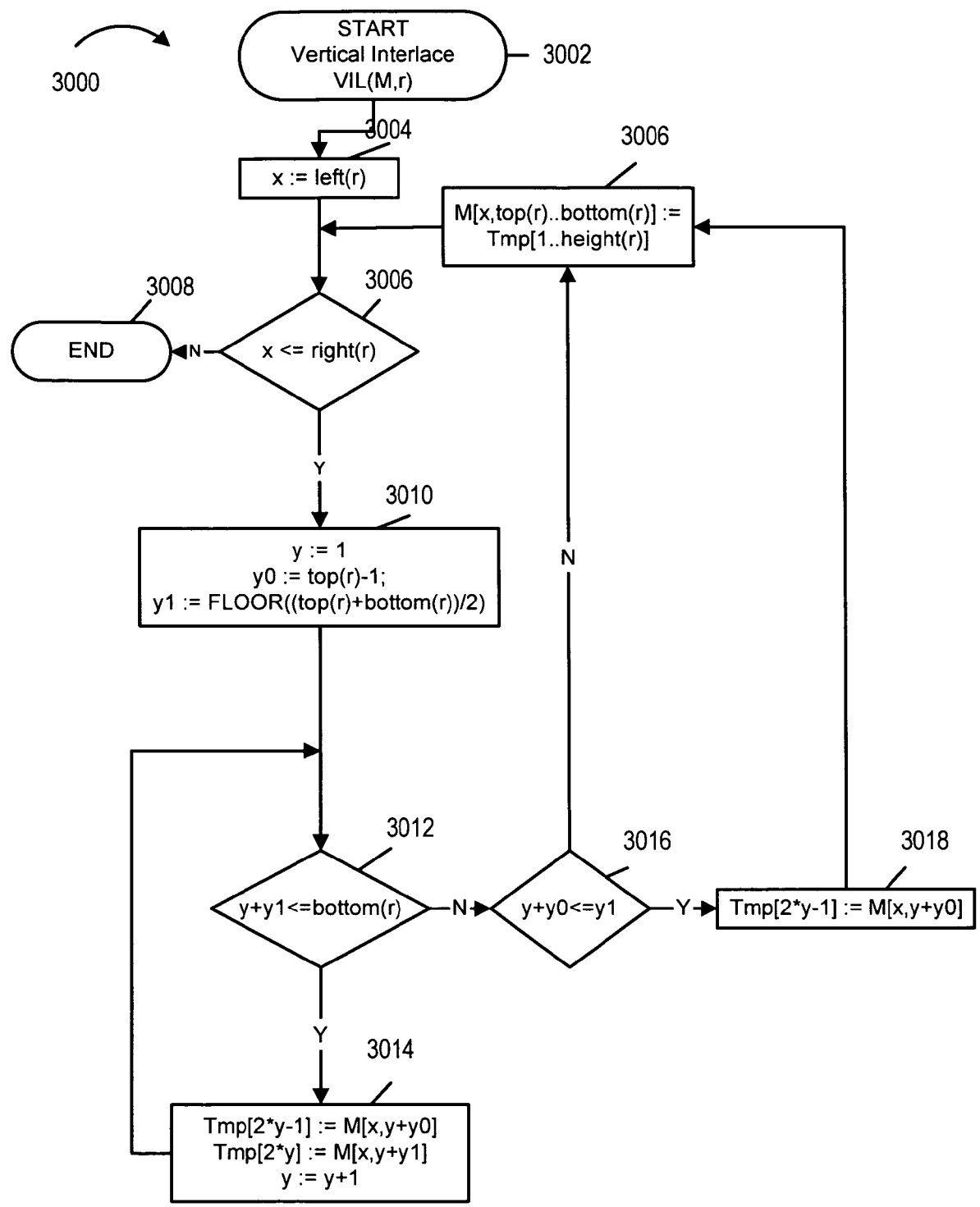

FIG. 30 shows an exemplary Vertical Interlace operation (VIL) routine implemented in accordance with the invention. This routine rearranges the coefficient values of a rectangle of coefficients by creating vertical pairs, each pair consisting of a coefficient on the top originally located in the top half of the rectangle and a coefficient on the bottom originally located in the bottom half of the rectangle. This routine is called by TVR (routine 3100). Here M is a two-dimensional matrix of coefficients, r is a rectangle defined within M, and Tmp is a temporary working buffer large enough to hold a single column of M.

The routine 3000 starts in step 3002. From start step 3002, operation proceeds to step 3004, wherein the index value x is initialized to the left position of the rectangle r. Operation then proceeds to step 3006.

Step 3006 is the top of a loop over all columns of the rectangle r. In step 3006, the index value x is compared to the right position of the rectangle r. If the value of x does not exceed the right position of r, operation proceeds to the body 3010 of the loop. Otherwise, operation proceeds to the end 3008 of the routine.

In step 3010, the values of the indices y, y0, and y1 are initialized as follows. y is initialized to 1, y0 is initialized to one less than the top edge position of the rectangle r, and y1 is initialized to FLOOR((top(r)+bottom(r))/2) (roughly the center position of the rectangle r). Operation then proceeds to step 3012.

Step 3012 is the top of a loop over pairs of coefficients within the working buffer Tmp. In step 3012, the value of y+y1 is compared to the bottom edge position of the rectangle r. If y+y1 does not exceed the bottom edge position of r, then operation proceeds to the body 3014 of the loop. Otherwise operation proceeds to step 3016.

Step 3014 interlaces a single pair of coefficients, moving them from the matrix M to the working buffer Tmp. The coefficient at location (x,y+y0) of M (in the top half of the rectangle r) is moved to location 2*y−1 of Tmp and the coefficient at location (x,y+y1) of M (in the bottom half of the rectangle r) is moved to location 2*y. Operation then proceeds to the loop test 3012.

Step 3016 compares the value of y+y0 to y1. If the value of y+y0 exceeds y1 (which occurs if and only if the original rectangle r contains an odd number of rows), then operation proceeds to step 3018. Otherwise operation proceeds to step 3020.

Step 3018 is executed only in the case where the original rectangle contains an odd number of rows. In this case a lone space in the working buffer remains empty after all vertical pairs have been filled from the top and bottom halves of the rectangle r. Step 3018 fills this lone remaining space with the element at position (x,y+y0) of M (on the borderline between the top and bottom halves of r). Operation then proceeds to step 3020.

Step 3020 copies the contents of the working buffer Tmp to the column in position x of the matrix M. The column counter x is then incremented by 1 prior to the next passage through the row column. Operation then proceeds to step 3006.

Figure 31:
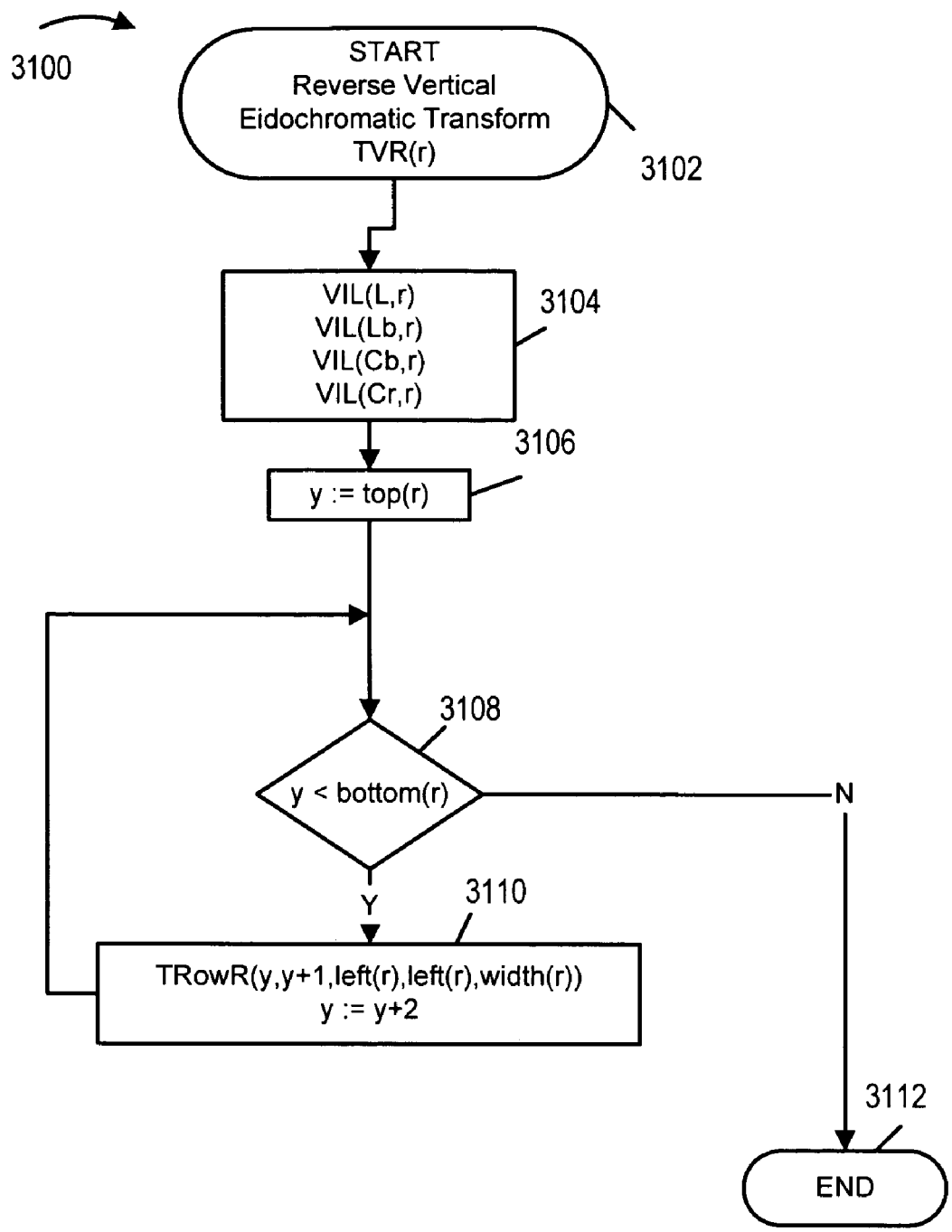

FIG. 31 shows an exemplary Reverse Vertical Eidochromatic Transform operation (TVR) routine implemented in accordance with the invention. This routine performs the reverse eidochromatic transform on S-values and E-values in vertically adjacent input rectangles, generating vertical pairs of coefficients in a specified rectangle r. Control values for the transform are located in the matrix L and storage buffer Lb, generated by a previous call to TVP (routine 2300). This routine is called by the Reverse Global Eidochromatic Transform (routine 3400 or 3600).

The TVR routine is in all respects parallel to the THR routine (routine 3100), except for interchanging the roles of vertical and horizontal.

The routine 3100 starts in step 3102. From here operation proceeds to step 3104, wherein the routine VIL is used to vertically interlace the subrectangle r of the coefficient matrices L, Cb, Cr, and Lb. Operation then proceeds to step 3106.

In step 3106, the value of the row index y is initialized to the top edge value of the rectangle r. Operation then proceeds to the beginning 3108 of a loop over rows.

In step 3108, the value of y is compared to the bottom edge position bottom(r) of the rectangle r. If y is less or equal to than bottom(r), then operation proceeds to the body 3110 of the loop. Otherwise operation proceeds to the end 3112 of the routine.

In step 3110, the Reverse Row Eidochromatic Transform TRowR is applied to the pair of rows running from the left to right of the rectangle r at positions y and y+1. The value of the row index is then incremented by 2 to access the next pair of rows. Operation then proceeds to the top 3108 of the loop.

Figure 32:
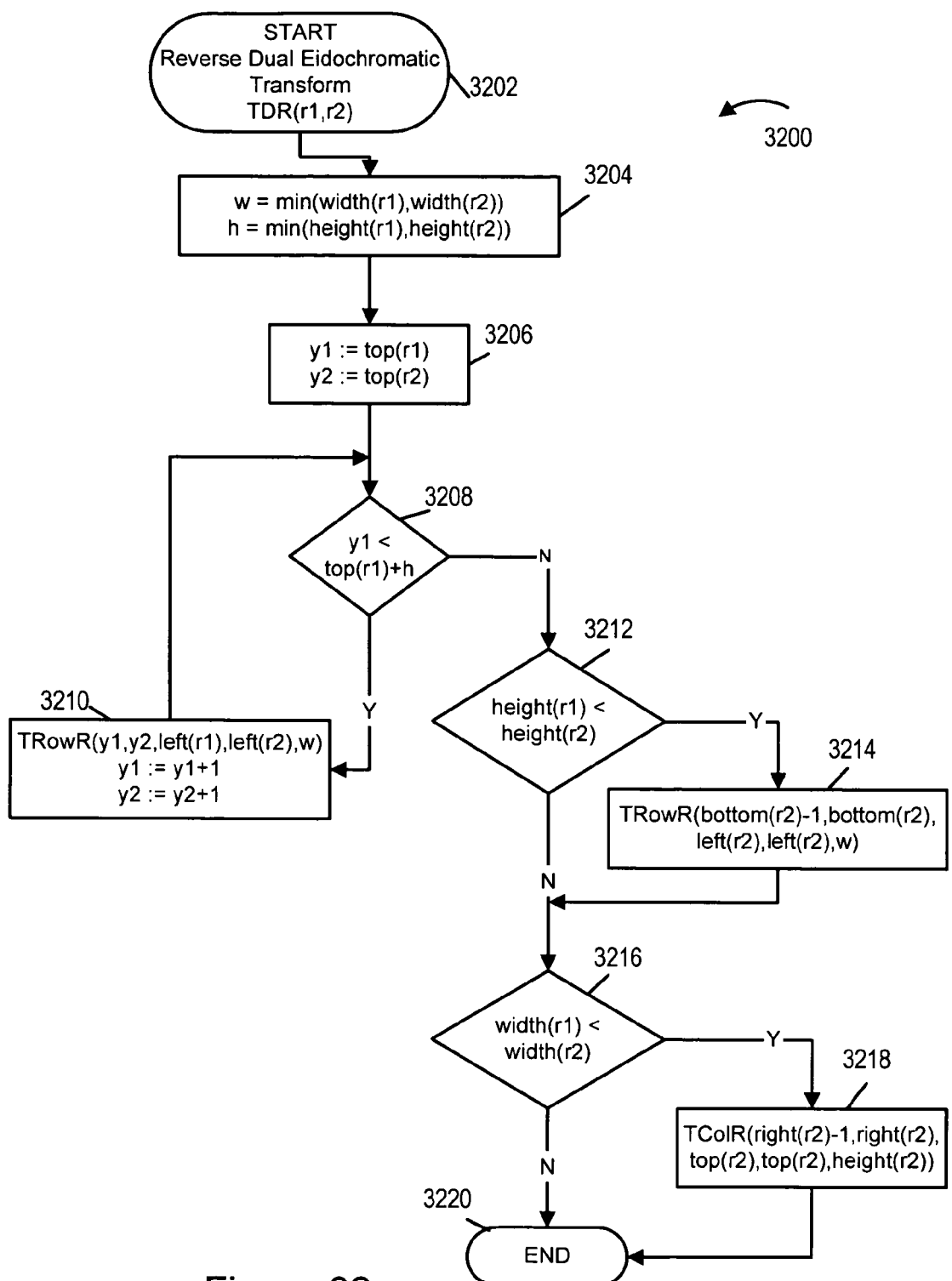

FIG. 32 shows an exemplary Reverse Dual Eidochromatic Transform operation (TDR) routine implemented in accordance with the invention. This routine performs the reverse eidochromatic transform on pairs of coefficient locations at corresponding positions within two input rectangles r1 and r2, generating S-values and E-values in output rectangles s and e, respectively. Control values for the transform are located in the matrix L and storage buffer Lb, generated by a previous call to TDP (routine 2400). Rectangles r1 and r2 are allowed to differ in width or height by at most 1. This routine is called by the Reverse Global Eidochromatic Transform (routine 3500 or 3600).

The routine 3200 starts in step 3202. From here operation proceeds to step 3204, wherein the variables w and h are initialized to the minimum width and height, respectively, of the two input rectangles. Operation then proceeds to step 3206.

Step 3206 is the top of a loop over rows of rectangles r1 and r2. This loop is executed h times (the smaller of the height of r1 and r2). Either r1 or r2 (but not both) may contain 1 additional row. Any additional row of r2 will be handled in step 3214. An additional row of r1 can be ignored. The loop is initialized by setting y1 and y2 to the top row positions of rectangles r1 and r2, respectively. Operation then proceeds to step 3208.

Step 3208 tests whether y1 is less than h plus the top row position of rectangle r1. If y1 is less than h plus the top row position of rectangle r1, then operation proceeds to the body 3210 of the loop. Otherwise the loop is exited and operation proceeds to step 3212.

In Step 3210, the routine TRowR is used to reverse-transform a row at position y1 of rectangle r1 and a row at position y2 of rectangle r2. The row positions y1 and y2 are then each incremented by 1. Operation then proceeds to step 3208.

Step 3212 compares the heights of the two input rectangles, as special handling is required in the case where rectangle r2 exceeds rectangle r1 in height. If the height of rectangle r2 does exceed that of rectangle r1, operation proceeds to step 3214; otherwise operation proceeds to step 3216.

Step 3214 is executed only in the case where rectangle r2 exceeds rectangle r1 in height. In this step the bottommost row of rectangle r2 is "unfolded out" from the next bottommost row by calling TRowR with these two rows. Operation then proceeds to step 3216.

Step 3216 compares the widths of the two input rectangles, as special handling is required in the case where rectangle r2 exceeds rectangle r1 in width. If the width of rectangle r2 does exceed that of rectangle r1, operation proceeds to step 3218; otherwise operation proceeds to the end 3220 of the routine.

Step 3218 is executed only in the case where rectangle r2 exceeds rectangle r1 in width. In this step the rightmost column of rectangle r2 is "unfolded out" from the next rightmost column by calling TColR with these two columns. Operation then proceeds to the end 3220 of the routine.

For example, the Reverse Dual Eidochromatic Transform, applied to the subrectangle r1 with top(r1)=1, bottom(r1)=4, left(r1)=1, and right(r1)=2 and subrectangle r2 bottom(r2)=5, left(r2)=3, and right(r2)=5 of the exemplary matrices of Cb and Cr coefficients from FIG. 42, controlled by the exemplary matrices of L and Lb coefficients from FIG. 49, recovers the original exemplary matrices of L, Cb, and Cr coefficients from FIG. 37.

Figure 33:
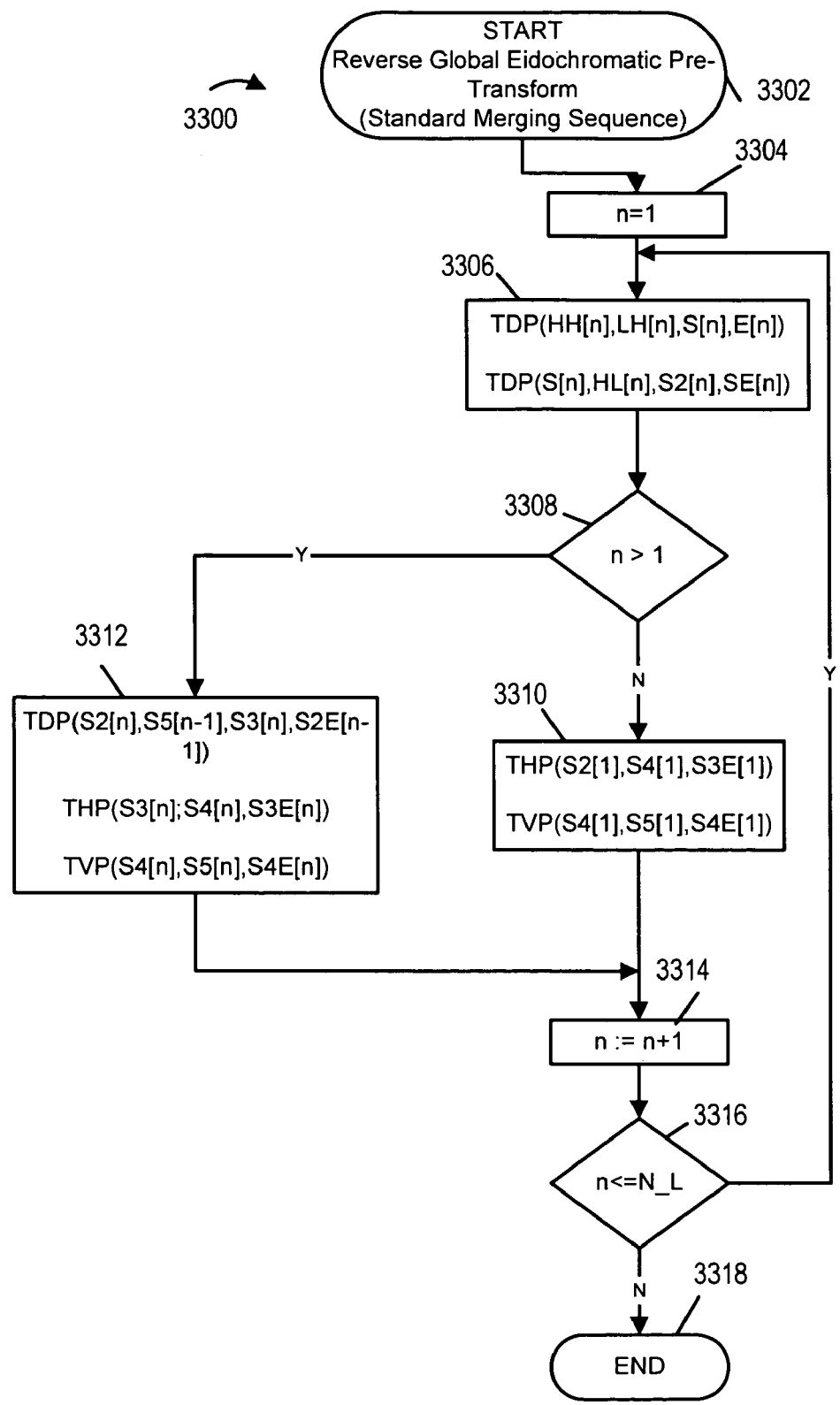

FIG. 33 shows an exemplary Reverse Global Eidochromatic Pre-Transform (Standard merging sequence) routine implemented in accordance with the invention. This routine calculates control values for all coefficient locations of an entire image which has previously been wavelet-transformed, and whose Cb and Cr components have been transformed by the Forward Global Eidochromatic transform (routine 1700), in preparation for the Reverse Global Eidochromatic Transform (routine 3400). It is assumed that the wavelet transform has created a standard wavelet sub-band structure consisting of sub-bands HH[1], HL[1], LH[1], HH[2], HL[2], LH[2], HH[3], . . . , HH[N_L], HL[N_L], LH[N_L], LL[N_L], where N_is the number of wavelet transform levels. FIG. 43 shows such a standard wavelet sub-band structure for N_L=3.

The routine 3300 starts in step 3302. From here operation proceeds to step 3304, which initializes the value of n to 1, n being a counter for a loop over all wavelet transform levels. Operation then proceeds to step 3306.

Step 3306 is the top of a loop over all wavelet transform levels. First the routine TDP (routine 2400) is applied to wavelet sub-bands HH[n] and LH[n], generating a new sub-band S[n] of control coefficients in matrix L and storing the previous values in sub-band SE[n] of matrix Lb. Then the routine TDP is again applied to sub-bands S[n] and HL[n], generating a new sub-band S2[n] of control coefficients in matrix L and storing the previous values in sub-band SE[n] of matrix Lb. Operation proceeds to step 3308.

Step 3308 makes a decision whether the current wavelet level n exceeds 1. If the current wavelet level n exceeds 1, operation proceeds to step 3312. Otherwise operation proceeds to step 3310.

Step 3310 is executed only when the current wavelet level value n equals 1. First the routine THP (routine 2100) is applied to the sub-band S2[1], generating a new sub-band S4[1] of control coefficients in matrix L and storing the previous values in sub-band S3E[n] of matrix Lb. Then the routine TVP (routine 2300) is applied to the sub-band S4[1], generating a new sub-bands S5[1] of control coefficients in matrix L and storing the previous values in sub-band S4E[n] of matrix Lb. Operation then proceeds to step 3314.

Step 3312 is executed only when the current wavelet value n exceeds 1. First the routine TDP (routine 2400) is applied to sub-bands S2[n] and S5[n-1] (created on the previous iteration of the loop), generating a new sub-band S3[n] of control coefficients in matrix L and storing the previous values in sub-band S2E[n] of matrix Lb. Then the routine THP (routine 2100) is applied to the sub-band S3[n], generating a new sub-band S4[n] of control coefficients in matrix L and storing the previous values in sub-band S3E[n] of matrix Lb. Then the routine TVP (routine 2300) is applied to the sub-band S4[n], generating a new sub-band S5[n] of control coefficients in matrix L and storing the previous values in sub-band S4E[n] of matrix Lb. Operation then proceeds to step 3314.

Step 3314 increments the value of the loop counter n by 1 in preparation for the next trip through the loop. Operation then proceeds to step 3316.

Step 3316 compares the value of the current wavelet level n to the total number N_L of wavelet levels. If n does not exceed N_L, operation proceeds to the top 3306 of the loop. Otherwise operation proceeds to the end 3318 of the routine.

Figure 34:
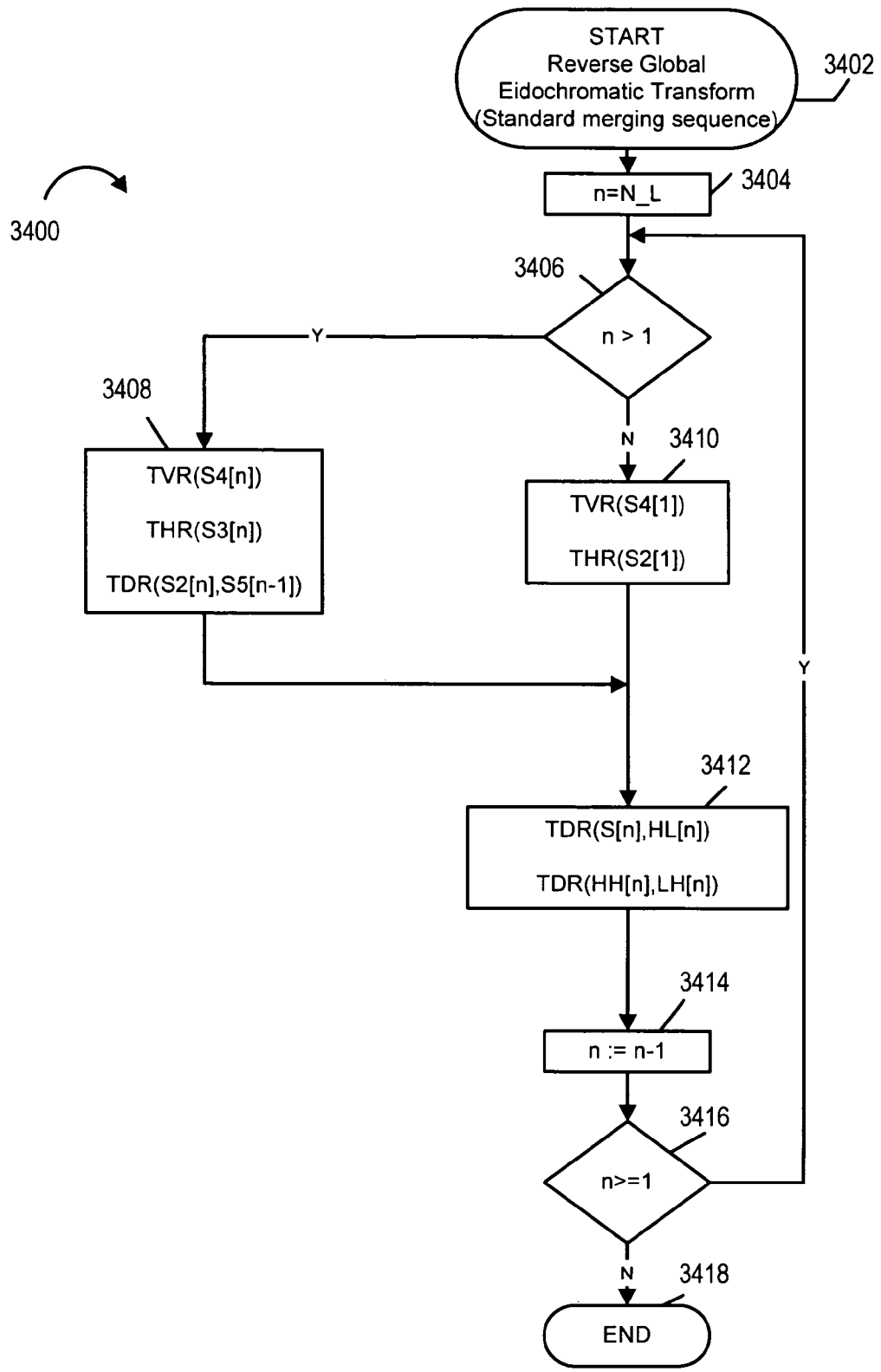

FIG. 34 shows an exemplary Reverse Global Eidochromatic Transform (Standard merging sequence) routine implemented in accordance with the invention. This routine performs the reverse eidochromatic transform on all coefficient locations of an entire image which has previously been wavelet-transformed, and whose Cb and Cr components have been transformed by the Forward Global Eidochromatic transform (routine 1700), and with matrices L and Lb of control values created by the Reverse Global Eidochromatic Pre-Transform (routine 3300). It is assumed that the Forward Global Eidochromatic Transform has created an eidochromatic sub-band structure on components Cb and Cr consisting of sub-bands E[1], SE[1], S2E[1], S3E[1], S4E [1], E[2], SE[2], S2E[2], S3E[2], S4E[2], . . . , E[N_L], SE[N_L], S3E[N_L], S4E[N_L], S5E[N_L], and LL[N_L] (where N_L is the number of wavelet transform levels) and the Reverse Global Eidochromatic Pre-Transform has created a parallel sub-band structure of control coefficients. FIG. 44 shows such a sub-band structure for N_L=3.

The routine 3400 starts in step 3402. From here operation proceeds to step 3404, which initializes the value of n to N_L, n being a counter for a loop over all wavelet transform levels. Operation then proceeds to step 3406.

Step 3406 makes a decision whether the current wavelet level n exceeds 1. If the current wavelet level n exceeds 1, operation proceeds to step 3408. Otherwise operation proceeds to step 3410.

Step 3408 is executed when the current wavelet value n exceeds 1. First the routine TVR (routine 3100) is applied to recreate sub-band S4[n] from sub-bands S5[n] and S4E[n]. Then the routine THR (routine 2800) is applied to recreate sub-band S3[n] from sub-bands S4[n] and S3E[n]. Then the routine TDR (routine 3200) is applied to recreate sub-bands S2[n] and S5[n-1] from sub-bands S3[n] and S2E[n-1]. Operation then proceeds to step 3412.

Step 3410 is executed when the current wavelet level value n equals 1. First the routine TVR (routine 3100) is applied to recreate sub-band S4[1] from sub-bands S5[1] and S4E[1]. Then the routine THR (routine 2800) is applied to recreate sub-band S2[1], from sub-bands S4[1] and S3E [1]. Operation then proceeds to step 3412.

Step 3406 first applies the routine TDF (routine 1600) to recreate sub-bands S[n] and HL[n] from sub-bands S2[n] and SE[n]. Then the routine TDF is applied to recreate sub-bands HH[n] and LH[n] from sub-bands S[n] and E[n]. Operation then proceeds to step 3414.

Step 3414 decrements the value of the loop counter n by 1 in preparation for the next trip through the loop. Operation then proceeds to step 3416.

Step 3416 compares the value of the current wavelet level n to 1. If the value of n is at least 1, operation proceeds to the top 3406 of the loop. Otherwise operation proceeds to the end 3418 of the routine.

FIG. 35 shows an exemplary Reverse Global Eidochromatic Pre-Transform (Scalable merging sequence) routine implemented in accordance with the invention. This routine is an alternative to routine 3300. This routine calculates control values for all coefficient locations of an entire image which has previously been wavelet-transformed, and whose Cb and Cr components have been transformed by the Forward Global Eidochromatic transform (routine 1800), in preparation for the Reverse Global Eidochromatic Transform (routine 3600). It is assumed that the wavelet transform has created a standard wavelet sub-band structure having sub-bands HH[1], HL[1], LH[1], HH[2], HL[2], LH[2], HH[3], ..., HH[N_L], HL[N_L], LH[N_L], LL[N_L], where N_L is the number of wavelet transform levels. FIG. 43 shows such a standard wavelet sub-band structure for N_L=3. An additional sequence of parameters kmax[1], kmax[2], ..., kmax[N_L] specifies how many times the reverse eidochromatic pre-transform will be applied to each wavelet level.

The routine 3500 starts in step 3502. From here operation proceeds to step 3504, which initializes the value of n to 1, n being a counter for a loop over all wavelet transform levels. Operation then proceeds to step 3506.

Step 3506 applies the routine TDP (routine 2400) to sub-bands HH[n] and LH[n], generating a new sub-band S[n][1] of control coefficients in matrix L and storing the previous values in sub-band E[n][1] of matrix Lb. Then the routine TDP is again applied to sub-bands S[n][1] and HL[n], generating a new sub-band S[n][2] of control coefficients in matrix L and storing the previous values in sub-band E[n] [2] of matrix Lb. Operation then proceeds to step 3508.

Step 3508 initializes the value of the loop counter k which counts the number of eidochromatic transform steps performed on the current wavelet resolution level. The value of k is set to three (two transform steps already having been performed on the current wavelet resolution level). Operation then proceeds to step 3510.

Step 3510 first applies the routine THP (routine 2100) to sub-band S[n][k−1], generating a new sub-bands S[n][k] of control coefficients in matrix L and storing the previous values in sub-band E[n][k] of matrix Lb. Then the routine TVF (routine 2300) is applied to sub-band S[n][k], generating a new sub-band S[n][k+1] of control coefficients in matrix L and storing the previous values in sub-band E[n][k+1] of matrix Lb. Operation then proceeds to step 3512.

Step 3512 compares the value of the loop counter k to the parameter kmax[n]. If the value of k does not exceed kmax[n], then operation proceeds back to the body 3510 of the loop. Otherwise the loop is exited and operation proceeds to step 3514.

Step 3514 increments the value of the current wavelet level n by 1. Operation then proceeds to step 3516.

Step 3516 compares the value of the current wavelet level n to the total number N_L of wavelet levels. If the value of n does not exceed N_L, then operation proceeds back to the top 3506 of the wavelet-level loop. Otherwise the loop is exited and operation proceeds to the end 3518 of the routine.

FIG. 36 shows an exemplary Reverse Global Eidochromatic Transform (Scalable merging sequence) routine implemented in accordance with the invention. This routine is an alternative to routine 3400. This routine performs the reverse eidochromatic transform on all coefficient locations of an entire image which has previously been wavelet-transformed, and whose Cb and Cr components have been transformed by the Forward Global Eidochromatic transform (routine 1700), and with matrices L and Lb of control values created by the Reverse Global Eidochromatic Pre-Transform (routine 3300). It is assumed that the Forward Global Eidochromatic Transform has created an eidochromatic sub-band structure on components Cb and Cr consisting of sub-bands E[1][1], E[1][2], ..., E[1][kmax[1]],S[1][kmax[1]], E[2][1], E[2][2], ..., E[2][kmax[2]],S[2][kmax[2]], E[N_L][1], E[N_L][2], ..., E[N_L][kmax[N_L]],S[N_L][kmax[N_L]] (where N_L is the number of wavelet transform levels) and the Reverse Global Eidochromatic Pre-Transform has created a parallel sub-band structure of control coefficients. An additional sequence of parameters kmax[1], kmax[2], kmax[N_L] specifies how many times the eidochromatic transform has been applied to each wavelet level. FIG. 45 shows such a sub-band structure for N_L=3 with kmax[1]=6, kmax[2]=4, and kmax[3]=2.

The routine 3600 starts in step 3602. From here operation proceeds to step 3604, which initializes the value of n to N_L, n being a counter for a loop over all wavelet transform levels. Operation then proceeds to step 3606.

Step 3606 initializes the value of the loop counter k which counts the number of eidochromatic transform steps performed on the current wavelet resolution level. The value of k is set to kmax[n] (the total number eidochromatic transform steps previously performed on the current wavelet resolution level). Operation then proceeds to step 3608.

Step 3610 first applies the routine TVR (routine 3100) to recreate sub-band S[n][k] from sub-bands S[n][k+1] and E[n][k+1]. Then the routine THR (routine 2800) is applied to recreate sub-band S[n] [k−1] from sub-bands S[n][k] and E[n][k]. Operation then proceeds to step 3610.

Step 3610 compares the value of the loop counter k to 3. If the value of k is greater than or equal to 3, then operation proceeds back to the body 3608 of the loop. Otherwise the loop is exited and operation proceeds to step 3612.

Step 3606 applies the routine TDR (routine 1600) to recreate sub-bands S[n][1] and HL[n] from sub-bands S[n][2] and E[n][2]. Then the routine TDR is again applied to recreate sub-bands HH[n] and LH[n] from sub-bands S[n][1] and E[n][1]. Operation then proceeds to step 3614.

Step 3614 decrements the value of the current wavelet level n by 1. Operation then proceeds to step 3616.

Step 3616 compares the value of the current wavelet level n to 1. If the value of n is greater than or equal to 1, then operation proceeds back to the top 3606 of the wavelet-level loop. Otherwise the loop is exited and operation proceeds to the end 3618 of the routine.

While described as separate encoding and decoding systems, it is very common for encoders and decoders to be implemented in the same system. Accordingly, some embodiments include the encoder and decoder functionally in a single system, e.g., a single computer or dedicated video encoding/decoding system.

While described as being implemented using modules, it should be appreciated that the modules used in the various described embodiments may be implemented in hardware, software or a combination of hardware and software. Furthermore, it should be appreciated, particularly in the case of software embodiments, that the present invention is directed to, among other things, a machine readable medium including computer instructions, e.g., software modules, used to control a computer or other device to perform one or more encoding and/or decoding operations in accordance with the invention.

Numerous variations may be made on the above described embodiments and examples while remaining within the scope of the invention.

What is claimed is:

1. A method of processing luminance information corresponding to a luminance component of an image and first chrominance information corresponding to a first chrominance component of said image, the method comprising:
    performing a spatial transform operation to generate from said first chrominance information a first set of chrominance coefficients corresponding to said first portion of said image; and
    performing a first forward transform operation on chrominance coefficients included in said first set of chrominance coefficients using a set of chrominance transform control coefficients which are a function of said luminance information to control the first forward transform operation, said first forward transform operation generating at most one output chrominance coefficient for each input chrominance coefficient, a set of output chrominance coefficients generated by said first forward transform operation forming a second set of chrominance coefficients corresponding to the same portion of said image as said first set of chrominance coefficients.

2. The method of claim 1, further comprising:
    prior to performing said first forward transform operation:
        generating from said luminance information said set of chrominance transform control coefficients.

3. The method of claim 1, wherein said first forward transform operation generates first and second output chrominance coefficients from first and second input chrominance coefficients as a function of first and second chrominance transform control coefficients.

4. The method of claim 3, wherein the first and second transform control coefficients are included in a block of transform control coefficients, wherein said first and second input chrominance coefficients are included in included in a first block of chrominance coefficients corresponding to a first chrominance component of said image, the locations of said first and second chrominance coefficients within said first block of chrominance coefficients matching the location of said first and second transform control coefficients in said block of transform control coefficients, respectively.

5. The method of claim 4, wherein said first forward transform operation generates said first output chrominance coefficient according to the equation:

$$C_1' = ((L_1 \times C_1) + (L_2 \times C_2))/\mathrm{SQRT}(L_1^2 + L_2^2);$$

where $L_1$ is the first chrominance transform coefficient;
where $L_2$ is the second chrominance transform coefficient;
where $C_1$ is the first input chrominance coefficient;
where $C_2$ is the second input chrominance coefficient; and
$C_1'$ is the first output chrominance coefficient.

6. The method of claim 5, wherein said first forward transform operation generates said second output chrominance coefficient according to the equation:

$$C_2' = ((L_2 \times C_1) - (L_1 \times C_2))/\mathrm{SQRT}(L_1^2 + L_2^2); \text{ and}$$

where $C_2'$ is the second output chrominance coefficient.

7. The method of claim 3, wherein said method is further directed to processing second chrominance information corresponding to a second chrominance component of said image, the method further comprising:
    performing another spatial transform operation to generate from said second chrominance information a third set of chrominance coefficients corresponding to said first portion of said image; and
    performing a second forward transform on chrominance coefficients included in said second set of chrominance coefficients, the second forward transform using said set of chrominance transform control coefficients used to control said first forward transform operation to control said second forward transform operation, said second forward transform generating at most one output chrominance coefficient for each input chrominance coefficient, chrominance coefficients output by said second forward transform operation forming a fourth set of chrominance coefficients corresponding to said second chrominance component of said image.

8. The method of claim 7, wherein said second forward transform operation generates said third output chrominance coefficient according to the equation:

$$C_3' = ((L_1 \times C_3) + (L_2 \times C_4))/\mathrm{SQRT}(L_1^2 + L_2^2);$$

where $L_1$ is the first chrominance transform coefficient;
where $L_2$ is the second chrominance transform coefficient;
where $C_3$ is the third input chrominance coefficient;
where $C_4$ is the second input chrominance coefficient; and
$C_3'$ is the third output chrominance coefficient.

9. The method of claim 8, wherein said second forward transform operation generates said fourth output chrominance coefficient according to the equation:

$$C_4' = ((L_2 \times C_3) - (L_1 \times C_4))/\mathrm{SQRT}(L_1^2 + L_2^2); \text{ and}$$

where $C_4'$ is the fourth output chrominance coefficient.

10. The method of claim 7, further comprising:
    combining the set of luminance coefficients with said second and fourth sets of chrominance coefficients to generate a set of encoded image data representing said image.

11. The method of claim 2,
    wherein said first forward transform generates a single output chrominance coefficient for each input chrominance coefficient; and
    wherein said spatial transform operation includes performing at least one of a discrete cosine transform operation and a forward wavelet transform operation.

12. The method of claim 11, wherein generating said chrominance transform control coefficients includes performing a gray scale operation on said luminance information to generate a set of luminance coefficients.

13. The method of claim 10,
    wherein said gray scale operation includes both a forward spatial transform operation and a modeling and entropy coding operation; and
    wherein generating said chrominance transform control coefficients further includes performing a modeling and entropy decoding operation on said set of luminance coefficients to generate said chrominance transform control coefficients.

14. The method of claim 10, further comprising:
combining the set of luminance coefficients with said second set of chrominance coefficients to generate a set of encoded image data including said luminance coefficients and said second set of chrominance coefficients, said set of encoded image data representing said image.

15. An encoder for encoding an image including luminance information and chrominance information, said encoder comprising:
a spatial transform module for generating from chrominance information a first set of chrominance coefficients corresponding to said image; and
means for performing a first forward transform operation on chrominance coefficients included in said first set of chrominance coefficients using a set of chrominance transform control coefficients which are a function of said luminance information to control the first forward transform operation, said first forward transform operation generating at most one output chrominance coefficient for each input chrominance coefficient, a set of output chrominance coefficients generated by said first forward transform operation forming a second set of chrominance coefficients corresponding to the same portion of said image as said first set of chrominance coefficients.

16. The encoder of claim 15, further comprising:
means for generating from said luminance information, prior to performing said first forward transform operation, said set of chrominance transform control coefficients.

17. The encoder of claim 16, wherein said first forward transform generates a single output chrominance coefficient for each input chrominance coefficient.

18. The encoder of claim 17, wherein said spatial transform module includes means for performing at least one of a discrete cosine transform operation and means for performing a forward wavelet transform operation.

19. The encoder of claim 18, wherein said means for generating said chrominance transform control coefficients includes:
a gray scale processing module for performing a gray scale operation on said luminance information to generate a set of luminance coefficients.

20. The encoder of claim 17,
wherein said gray scale processing module includes both a forward spatial transform module and a modeling and entropy coding module; and
wherein generating said chrominance transform control coefficients further includes performing a modeling and entropy decoding operation on said set of luminance coefficients to generate said chrominance transform control coefficients.

21. The encoder of claim 17, further comprising:
means for combining the set of luminance coefficients with said second set of chrominance coefficients to generate a set of encoded image data including said luminance coefficients and said second set of chrominance coefficients, said set of encoded image data representing said image.

22. The encoder of claim 15, wherein said encoder processes second chrominance information corresponding to a second chrominance component of said image, the encoder further comprising:
means for performing another spatial transform operation to generate from said second chrominance information a third set of chrominance coefficients corresponding to said first portion of said image; and
means for performing a second forward transform on chrominance coefficients included in said second set of chrominance coefficients using said set of chrominance transform control coefficients to control the second forward transform operation, said second forward transform generating at most one output chrominance coefficient for each input chrominance coefficient, chrominance coefficients output by said second forward transform operation forming a fourth set of chrominance coefficients corresponding to the same portion of said image as said first set of chrominance coefficients.

23. The encoder of claim 15, wherein said first forward transform operation generates first and second output chrominance coefficients from first and second input chrominance coefficients as a function of first and second chrominance transform control coefficients.

24. The encoder of claim 23, wherein the first and second transform control coefficients are functions of luminance information corresponding to the same image locations to which said first and second input chrominance coefficients correspond, respectively.

25. The encoder of claim 24, wherein said means for performing a first forward transform operation generates said first output chrominance coefficient according to the equation:

$$C_1' = ((L_1 \times C_1) + (L_2 \times C_2)) / \mathrm{SQRT}(L_1^2 + L_2^2);$$

where $L_1$ is the first chrominance transform coefficient;
where $L_2$ is the second chrominance transform coefficient;
where $C_1$ is the first input chrominance coefficient;
where $C_2$ is the second input chrominance coefficient; and
$C_1'$ is the first output chrominance coefficient.

26. The encoder of claim 25, wherein said means for performing a first forward transform operation generates said second output chrominance coefficient according to the equation:

$$C_2' = ((L_2 \times C_1) + (L_1 \times C_2)) / \mathrm{SQRT}(L_1^2 + L_2^2);$$

where $C_2'$ is the second output chrominance coefficient.

27. A method of decoding encoded image data representing an image, the encoded image data including a set of encoded luminance coefficients corresponding to a luminance component of said image and a first set of encoded chrominance coefficients corresponding to a first chrominance component of said image, the method comprising:
processing the encoded luminance coefficients to generate a set of reverse transform control coefficients; and
performing a first reverse transform operation on a first set of encoded chrominance coefficients using corresponding reverse transform control coefficients to control said first reverse transform operation, said reverse transform operation generating at most a single chrominance coefficient corresponding to each encoded chrominance coefficient subject to said reverse transform operation.

28. The method of claim 27, wherein a single chrominance coefficient is generated by said first reverse transform operation for each encoded chrominance coefficient on which said reverse transform operation is performed.

29. The method of claim 28, wherein said reverse transform control coefficients are included in a block of transform control coefficients and said first set of encoded chrominance coefficients is included in a first block of encoded chrominance coefficients, the step of performing a first reverse transform operation including processing a first encoded chrominance coefficient and processing a second encoded chrominance coefficient from said first block as a function of a first transform control coefficient and a second transform control coefficient located in said block of transform control coefficients at the same position said first and second chrominance coefficients are located in said first block of chrominance coefficients.

30. The method of claim 29, wherein said first chrominance coefficient generated by said first reverse transform operation processing said first and second encoded chrominance coefficients is generated by processing the first and second encoded chrominance coefficients as follows:

$$C1=(L1'*C1'+L2'*C2')/LP$$

where C1' is the first encoded chrominance coefficient;
C2' is the second encoded chrominance coefficient.
L1' is the first transform control coefficient;
L2' is the second transform control coefficient; and
LP is a value which is a function of L1' and L2'.

31. The method of claim 30, wherein said second chrominance coefficient generated by said reverse transform operation processing said first and second encoded chrominance coefficients is generated by processing the first and second encoded chrominance coefficients as follows:

$$C2=(L2'*C1'-L1'*C2')/LP.$$

32. The method of claim 30, where said method further comprises calculating the value LP according to the following equation:

$$LP=\mathrm{sqrt}(L1'*L1'+L2'*L2').$$

33. The method of claim 30, further comprising performing a second reverse transform operation on a second set of encoded chrominance coefficients corresponding to a second chrominance component of said image, said second reverse transform operation being performed using said reverse transform control coefficients used to control said first reverse transform operation, said second reverse transform operation generating at most a single chrominance coefficient corresponding to each encoded chrominance coefficient corresponding to said second chrominance component.

34. The method of claim 33, wherein said second reverse transform operation generates the third and fourth chrominance coefficients corresponding to the second chrominance component by processing third and fourth encoded chrominance coefficients as follows:

$$C3=(L1'*C3'+L2'*C4')/LP$$

$$C4=(L2'*C3'-L1'*C4')/LP$$

where C3' is a third encoded chrominance coefficient positioned within a block of encoded chrominance coefficients corresponding to the second chrominance component at the same position said first encoded chrominance coefficient is positioned with the block of chrominance coefficients corresponding to the first chrominance component; and
C4' is a fourth encoded chrominance coefficient positioned within the block of encoded chrominance coefficients corresponding to the second chrominance component at the same position said second encoded chrominance coefficient is positioned with the block of chrominance coefficients corresponding to the first chrominance component.

35. The method of claim 29, wherein processing the encoded luminance coefficients to generate a set of reverse transform control coefficients includes:
performing a modeling and entropy decoding operation on said encoded luminance coefficients to produce decoded luminance coefficients; and
processing said decoded luminance coefficients to generate a set of control coefficients matching the transform control coefficients used to generate said encoded chrominance coefficients.

36. A decoder for decoding encoded image data representing an image, the encoded image data including a set of encoded luminance coefficients corresponding to a luminance component of said image and a first set of encoded chrominance coefficients corresponding to a first chrominance component of said image, the method comprising:
means for processing the encoded luminance coefficients to generate a set of reverse transform control coefficients; and
means for performing a first reverse transform operation on a first set of encoded chrominance coefficients using corresponding reverse transform control coefficients to control said first reverse transform operation, said reverse transform operation generating at most a single chrominance coefficient corresponding to each encoded chrominance coefficient subject to said reverse transform operation.

37. The decoder of claim 36, wherein a single chrominance coefficient is generated by said first reverse transform operation for each encoded chrominance coefficient on which said reverse transform operation is performed.

38. The decoder of claim 37,
wherein said reverse transform control coefficients are included in a block of transform control coefficients and said first set of encoded chrominance coefficients is included in a first block of encoded chrominance coefficients; and
wherein said means for performing a first reverse transform operation includes a module for processing a first encoded chrominance coefficient and processing a second encoded chrominance coefficient from said first block of chrominance coefficients as a function of a first transform control coefficient and a second transform control coefficient located in said block of transform control coefficients at the same position said first and second chrominance coefficients are located in said first block of chrominance coefficients.

39. The decoder of claim 38,
wherein said means for performing a first reverse transform operation includes means for generating said first chrominance coefficient C1 by processing the first and second encoded chrominance coefficients as follows:

$$C1=(L1'*C1'+L2'*C2')/LP$$

where C1' is the first encoded chrominance coefficient;
C2' is the second encoded chrominance coefficient.
L1' is the first transform control coefficient;
L2' is the second transform control coefficient; and
LP is a value which is a function of L1' and L2'.

* * * * *